US012401152B2

(12) United States Patent
Isoda

(10) Patent No.: US 12,401,152 B2
(45) Date of Patent: Aug. 26, 2025

(54) CONNECTOR HAVING SHELL WITH LEGS, AND CONNECTION STRUCTURE OF CIRCUIT BOARD AND CONNECTOR

(71) Applicant: HOSIDEN CORPORATION, Yao (JP)

(72) Inventor: Masaya Isoda, Yao (JP)

(73) Assignee: HOSIDEN CORPORATION, Yao (JP)

( * ) Notice: Subject to any disclaimer, the term of this patent is extended or adjusted under 35 U.S.C. 154(b) by 421 days.

(21) Appl. No.: 18/077,267

(22) Filed: Dec. 8, 2022

(65) Prior Publication Data

US 2023/0208070 A1 Jun. 29, 2023

(30) Foreign Application Priority Data

Dec. 28, 2021 (JP) ................................ 2021-214625

(51) Int. Cl.

| | |
|---|---|
| ***H01R 13/514*** | (2006.01) |
| ***H01R 12/57*** | (2011.01) |
| ***H01R 13/502*** | (2006.01) |
| ***H01R 13/506*** | (2006.01) |
| ***H01R 13/6581*** | (2011.01) |

(52) U.S. Cl.

CPC ........... *H01R 13/514* (2013.01); *H01R 12/57* (2013.01); *H01R 13/502* (2013.01); *H01R 13/506* (2013.01); *H01R 13/6581* (2013.01)

(58) Field of Classification Search

CPC ...................................................... H01R 12/57

See application file for complete search history.

(56) References Cited

U.S. PATENT DOCUMENTS

2005/0048839 A1* 3/2005 Zhang .................. H01R 12/716 439/607.56

2005/0112918 A1* 5/2005 Su ...................... H01R 13/6474 439/79

(Continued)

FOREIGN PATENT DOCUMENTS

| | | | |
|---|---|---|---|
| EP | 2369686 | A1 | 9/2011 |
| JP | 3150829 | U | 5/2009 |

(Continued)

OTHER PUBLICATIONS

Written Amendment filed May 21, 2020, with Japan Patent Office, for Japanese Patent Application No. JP2019-216124 A, with English language translation.

(Continued)

*Primary Examiner* — Oscar C Jimenez
(74) *Attorney, Agent, or Firm* — Kilyk & Bowersox, P.L.L.C.

(57) ABSTRACT

A connector including an insulating body, at least one terminal, and a shell. Each terminal of the at least one terminal includes a main body partly held at least by the body, a distal portion, and a mounting portion. The distal portion extends from the main body to the one side in the first direction. The mounting portion extends from the main body to the other side in the first direction or to the one side in the second direction, and is located outside the body. The shell includes a generally tubular shell body securely accommodating the body and accommodating the main body(s) and the distal portion(s) of the at least one terminal. The shell includes two legs, which are ridges elongated in the first direction, extend from the shell body to the one side in the second direction, and are disposed on one and the sides, respectively, in a third direction relative to the at least one terminal.

20 Claims, 47 Drawing Sheets

(56) References Cited

U.S. PATENT DOCUMENTS

| | | | | |
|---|---|---|---|---|
| 2010/0178803 | A1 | 7/2010 | Chang | |
| 2011/0143594 | A1 | 6/2011 | Nagata | |
| 2012/0149244 | A1 | 6/2012 | Zheng et al. | |
| 2017/0162976 | A1 * | 6/2017 | Zhao | H01R 12/716 |
| 2021/0167561 | A1 * | 6/2021 | Iwamoto | H01R 13/187 |
| 2022/0102891 | A1 * | 3/2022 | Akaike | H01R 24/86 |
| 2024/0305046 | A1 * | 9/2024 | Takeuchi | H01R 13/6594 |

FOREIGN PATENT DOCUMENTS

| | | | |
|---|---|---|---|
| JP | 2011-124147 | A | 6/2011 |
| JP | 2017-526137 | A | 9/2017 |
| JP | 201979620 | A | 5/2019 |
| JP | 2019-106675 | A | 6/2019 |
| JP | 2019-106681 | A | 6/2019 |
| JP | 2019-216124 | A | 12/2019 |
| WO | 2016030084 | A1 | 3/2016 |

OTHER PUBLICATIONS

Office action dated May 11, 2023, issued by the EPO, for European patent application No. 22214591.4 (8 pages).

Notification of Reasons for Refusal for Japanese Patent Application No. 2021-214625, from the Japan Patent Office, dated Apr. 1, 2025.

Notification of Reasons for Refusal for Japanese Patent Application No. 2021-214625, from the Japan Patent Office, dated Jun. 17, 2025.

* cited by examiner

CONNECTOR HAVING SHELL WITH LEGS, AND CONNECTION STRUCTURE OF CIRCUIT BOARD AND CONNECTOR

CROSS-REFERENCE TO RELATED APPLICATIONS

The present application claims priority under 35 U.S.C. § 119 of Japanese Patent Application No. 2021-214625 filed on Dec. 28, 2021, the disclosure of which is expressly incorporated by reference herein in its entirety.

BACKGROUND OF THE INVENTION

Technical Field

The invention relates to a connector, and a connection structure of a circuit board and the connector.

Background Art

JP 2019-216124 A describes a conventional coaxial connector. The coaxial connector includes a terminal (center contact) having electrical conductivity and including one and the other end portions, a body (insulator) having insulation properties and holding the terminal, and a shell (outer conductor) having electrical conductivity and holding the body. The shell includes a base generally of a U-shape in plan view, and a tubular external contact extending in the front-rear direction to removably receive a mating connector. The base and the external contact may be integrally formed in the front-rear direction, or may be separately formed and adapted to be joined together in the front-rear direction. The base includes a pair of front legs (mounting legs) and a pair of rear legs (mounting legs), each of these legs is generally cylindrical. The front legs extend downward from the bottom face of the base and are disposed obliquely rearward on the right and left sides relative to the other end portion of the terminal. The rear legs extend downward from the bottom face of the base and are located behind the front legs. When the base is mounted on a circuit board and the legs are received in through-hole electrodes of the circuit board and connected to a ground layer of the circuit board via the through-hole electrodes, the shell is electrically connected to the ground layer of the circuit board. The one end portion of the terminal is exposed inside the external contact of the shell for connection with a terminal of a mating coaxial connector, and the other end portion of the terminal is exposed from the shell. In a state where the base is mounted on the circuit board, the other end portion of the terminal is connected to a surface electrode of the circuit board.

SUMMARY OF INVENTION

When transmitting a high-speed signal using the conventional connector mounted on the circuit board, the high-speed signal may be reflected, e.g., in a portion of the terminal of the conventional connector where the shape of the terminal changes. The reflection of the high-speed signal will cause generation of noise to be radiated from the terminal to the shell. As the front and rear legs of the conventional connector are all located obliquely rearward relative to the other end portion of the terminal, these legs are at a distance from the terminal. Each of the front and rear legs of the shell is generally cylindrical and therefore has a small cross-sectional area in cross section along the front-rear and up-down directions. These are some factors that decrease the grounding strength of the conventional connector. As a result, during high-speed signal transmission, before noise radiated from the terminal to the shell flow to the ground layer of the circuit board via the front and rear legs of the shell, the noise may be re-radiated from an edge portion of the shell to the outside of the conventional connector, with the edge portion functioning as an antenna. Therefore, the conventional connector has poor electromagnetic interference (EMI) characteristics.

The invention provides a connector with improved EMI characteristics, and also provides a connection structure of a circuit board and the connector.

A connector according to an aspect of the invention includes a body having insulating properties, at least one terminal, and a shell having electrical conductivity. The or each terminal includes a main body partly held at least by the body, a distal portion, and a mounting portion. The main body includes a first end on one side in a first direction, a second end on the other side in the first direction, and a third end on one side in a second direction. The second direction is substantially orthogonal to the first direction. The distal portion extends from the first end of the main body to the one side in the first direction. The mounting portion of the or each terminal (1) may extend from the third end of the main body to the other side in the first direction and be located outside the body, or alternatively (2) may extend from the third end of the main body to the one side in the second direction and be located outside the body. The shell includes a shell body generally shaped like a tube extending in the first direction, a first leg, and a second leg. The shell body securely accommodates the body and accommodates the main body and the distal portion of the terminal or the main bodies and the distal portions of the terminals. The first direction is an axial direction of the shell body. The first leg is a ridge elongated in the first direction, extending from the shell body to the one side in the second direction, and being disposed on one side in a third direction relative to the at least one terminal. The third direction is substantially orthogonal to the first and second directions. The second leg is a ridge elongated in the first direction, extending from the shell body to the one side in the second direction, and being disposed on the other side in the third direction relative to the at least one terminal.

The connector of this aspect has improved EMI characteristics for the following reasons. since the first and second legs of the shell are ridges elongated in the first direction and are located on opposite sides in the third direction relative to the at least one terminal, the first and second legs of the shell are at a shorter distance to the at least one terminal, compared to the pair of front legs and the pair of rear legs located obliquely behind the mounting portion of the terminal of the above conventional connector. Moreover, the first and second legs of the shell, being ridges elongated in the first direction, each have a larger cross-sectional area in cross section along the first and second directions. As the first and second legs are grounded in use, even if signals transmitted to the at least one terminal are reflected on the at least one terminal to cause generation of noise to be radiated to the shell, the noise will easily flow through the first and/or second leg of the shell to the ground. Therefore, the connector of this aspect suppresses re-radiation of noise from an edge portion of the shell body.

The first leg may include a first end on the one side in the first direction and a second end on the other side in the first direction.

The distal portion of the or each terminal may include a first end on the one side in the first direction and a second end on the other side in the first direction. The first end of the first leg and the first end of the second leg may be located on the one side in the first direction relative to the first end of the distal portion of the or each terminal, and the second end of the first leg and the second end of the second leg may be located on the other side in the first direction relative to the second end of the distal portion of the or each terminal.

The mounting portion of the or each terminal may include a first end on the one side in the first direction and a second end on the other side in the first direction. The mounting portion of the or each terminal may further include a third end on the one side in the second direction. The mounting portion of the or each terminal may further include a fourth end on the other side in the second direction.

The second end of the first leg and the second end of the second leg may be located on the other side in the first direction relative to, or alternatively substantially coincident in the first direction with, the second end of the mounting portion of the or each terminal.

The first leg and the second leg may be disposed substantially symmetrically to each other in the third direction across a first imaginary line or a second imaginary line that serve as an axis of line symmetry. The first leg and the second leg may be shaped substantially symmetrically to each other in the third direction across a first imaginary line or a second imaginary line that serves as an axis of line symmetry.

Where the at least one terminal is a single terminal, the first imaginary line may extend in the first direction substantially through a center of the main body of the single terminal. Where the at least one terminal is a plurality of terminals, the second imaginary line may extend in the first direction substantially through a midpoint of a linear distance in the third direction from an end on the one side in the third direction of the main body of one of the terminals at an endmost position to the one side in the third direction to an end on the other side in the third direction of the main body of another one of the terminals at an endmost position to the other side in the third direction.

The first leg may further include a third end on the one side in the second direction. The second leg may further include a third end on the one side in the second direction. Where the mounting portion of the or each terminal has configuration (1) above, the third end of the first leg and the third end of the second leg may be located on the one or other side in the second direction relative to the third end of the mounting portion of the or each terminal. Where the mounting portion of the or each terminal has configuration (2) above, the third end of the first leg and the third end of the second leg may be located on the one or other side in the second direction relative to, or alternatively substantially coincident in the second direction with, the third end of the mounting portion of the or each terminal.

The shell may further include a third leg and a fourth leg. The third leg may be a ridge elongated in the first direction, extending from the shell body to the one side in the second direction, and being disposed on the other side in the first direction relative to the first leg and on the one side in the third direction relative to the mounting portion of the terminal or the mounting portions of the terminals. The fourth leg may be a ridge elongated in the first direction, extending from the shell body to the one side in the second direction, and being disposed on the other side in the first direction relative to the second leg and on the other side in the third direction relative to the mounting portion of the terminal or the mounting portions of the terminals.

The third leg may include a first end on the one side in the first direction, a second end on the other side in the first direction, and a third end on the one side in the second direction. The fourth leg may include a first end on the one side in the first direction, a second end on the other side in the first direction, and a third end on the one side in the second direction.

The second end of the third leg and the second end of the fourth leg may be substantially coincident in the first direction with, or alternatively located on the other side in the first direction relative to, the second end of the mounting portion of the or each terminal.

The first end of the third leg and the first end of the fourth leg may be substantially coincident in the first direction with, or alternatively located on the one side in the first direction relative to, the first end of the mounting portion of the or each terminal.

The third leg may further include a third end on the one side in the second direction, and the fourth leg may further include a third end on the one side in the second direction. The third end of the third leg and the third end of the fourth leg may be substantially coincident in the second direction with the third end of the mounting portion of the or each terminal.

The third leg may further include a fourth end on the one side in the second direction, and the fourth leg may further include a fourth end on the one side in the second direction. The fourth end of the third leg and the fourth end of the fourth leg may be substantially coincident in the second direction with, or alternatively located on the other side in the second direction relative to, the fourth end of the mounting portion of the or each terminal.

The third leg and the fourth leg may be disposed substantially symmetrically to each other in the third direction across the first imaginary line or the second imaginary line that serve as an axis of line symmetry. The third leg and the fourth leg may be shaped substantially symmetrically to each other in the third direction across the first imaginary line or the second imaginary line that serve as an axis of line symmetry.

The shell may further include a first wall and a second wall. The first wall may be a portion extending from the shell body to the other side in the first direction or alternatively a part of a wall on the one side in the third direction of the shell body, and the first wall may be located on the one side in the third direction relative to the mounting portion of the terminal or the mounting portions of the terminals. The second wall may be a portion extending from the shell body to the other side in the first direction or alternatively a part of a wall on the other side in the third direction of the shell body, and the second wall may be located on the other side in the third direction relative to the mounting portion of the terminal or the mounting portions of the terminals.

The first wall may include a first end on the one side in the first direction and a second end on the other side in the first direction. The second wall may include a first end on the one side in the first direction and a second end on the other side in the first direction.

The second end of the first wall and the second end of the second wall may be substantially coincident in the first direction with, or alternatively located on the other side in the first direction relative to, the second end of the mounting portion of the or each terminal.

The first wall may further include a third end on the one side in the second direction and a fourth end on the other side in the second direction. The second wall may further include a third end on the one side in the second direction and a fourth end on the other side in the second direction.

The third end of the first wall and the third end of the second wall may be substantially coincident in the second direction with the third end of the mounting portion of the or each terminal.

The fourth end of the first wall and the fourth end of the second wall may be substantially coincident in the second direction with, or alternatively located on the other side in the second direction relative to, the fourth end of the mounting portion of the or each terminal.

The shell may further include at least one protrusion. The at least one protrusion may extend from the shell body to the one side in the second direction. The or each protrusion may include a distal end on the one side in the second direction.

The connector according to an aspect of the invention may include a shield cover. The shield cover may include a covering portion and at least two engaging arms, and the covering portion may have electrical conductivity. The shell may include at least two engaging portions. The at least two engaging arms may be engaged with the at least two engaging portions, and the covering portion may close the other side in the first direction of an internal space of the shell.

A connection structure of a circuit board and a connector according to an aspect of the invention includes a circuit board and the connector according to any one of the above aspects.

The circuit board may include a board body, at least one ground layer, at least one signal electrode having electrical conductivity, a first ground electrode having electrical conductivity, and a second ground electrode having electrical conductivity. The board body may include a front face on the one side in the second direction and a back face on the other side in the second direction.

The at least one ground layer may include at least one of a first ground layer, a second ground layer, or at least one third ground layer. The first ground layer may have electrical conductivity and be provided on the front face of the board body, the second ground layer may have electrical conductivity and be provided on the back face of the board body, and the at least one third ground layer may have electrical conductivity and be provided inside the board body. Where the at least one ground layer is two or more ground layers, the two or more ground layers may be connected together via at least one bypass electrode.

The or each signal electrode may be a surface electrode provided on the front face of the board body, or alternatively a through-hole electrode extending through the board body in the second direction.

The first and second ground electrodes may be through-hole electrodes elongated in the first direction, extend through the board body in the second direction, be spaced from each other in the third direction, be electrically connected to the at least one ground layer, and have a same potential as the at least one ground layer.

Where the or each signal electrode is a surface electrode, the mounting portion of the or each terminal of the connector may have the configuration (1) above, and may be placed on, and electrically connected to, the or a corresponding signal electrode.

Where the or each signal electrode is a through-hole electrode, the mounting portion of the or each terminal of the connector may have configuration (2) above, and may be received in, and electrically connected to, the or a corresponding signal electrode.

The first leg of the connector may be received in, and electrically connected to, the first ground electrode. The second leg of the connector may be received in, and electrically connected to, the second ground electrode.

The circuit board may further include a third ground electrode and a fourth ground electrode.

The third and fourth ground electrodes may be surface electrodes provided on the front face of the board body, be electrically connected to the at least one ground layer, and have a same potential as the at least one ground layer.

The third ground electrode may be disposed in spaced relation to, and on the other side in the first direction relative to, the first ground electrode. The fourth ground electrode may be disposed in spaced relation to, and on the other side in the first direction relative to, the second ground electrode.

The third ground electrode may be disposed on the one side in the third direction relative to at least one signal electrode. The fourth ground electrode may be disposed on the other side in the third direction relative to the at least one signal electrode.

The third leg of the connector may be placed on, and electrically connected to, the third ground electrode. The fourth leg of the connector may be placed on, and electrically connected to, the fourth ground electrode.

The shell of the connector may further include at least one protrusion on the bottom face on the one side in the second direction of the shell body. A distal end of the or each protrusion may abut on the circuit board, and there may be a gap between the bottom face of the shell body of the shell of the connector and the circuit board.

At least one signal line may be provided. The or each signal line may be provided on the front face of the board body, on the back face of the board body, or inside the board body, and electrically connected to the or a corresponding signal electrode.

The at least one signal line and the at least one ground layer may constitute a microstrip line or a coplanar line. Where the at least one ground layer is two or more ground layers, the at least one signal line and the two or more ground layers may constitute a strip line.

The at least one ground layer may extend to the one side in the first direction beyond the first and second ground electrodes.

The board body may include a first end on the one side in the first direction. The first ground electrode and the second ground electrode may each include a first end on the one side. A linear distance in the first direction from each of the first end of the first ground electrode and the first end of the second ground electrode to the first end of the circuit board may be, but is not required to be, approximately 1 mm.

The circuit board may further include a resist having insulating properties and being provided on the front face of the board body. The resist may include a first opening, which is configured to expose at least a part of an end face on the other side in the second direction of the first ground electrode, and a second opening, which is configured to expose at least a part of an end face on the other side in the second direction of the second ground electrode. The first opening and the second opening may be separated from each other.

Where the third and fourth ground electrodes are provided, the resist may further include a third opening, which is configured to expose at least a part of an end face on the other side in the second direction of the third ground electrode, and a fourth opening, which is configured to expose at least a part of an end face on the other side in the second direction of the fourth ground electrode. The first, second, third, and fourth openings may be separated from each other.

Figure 1A:
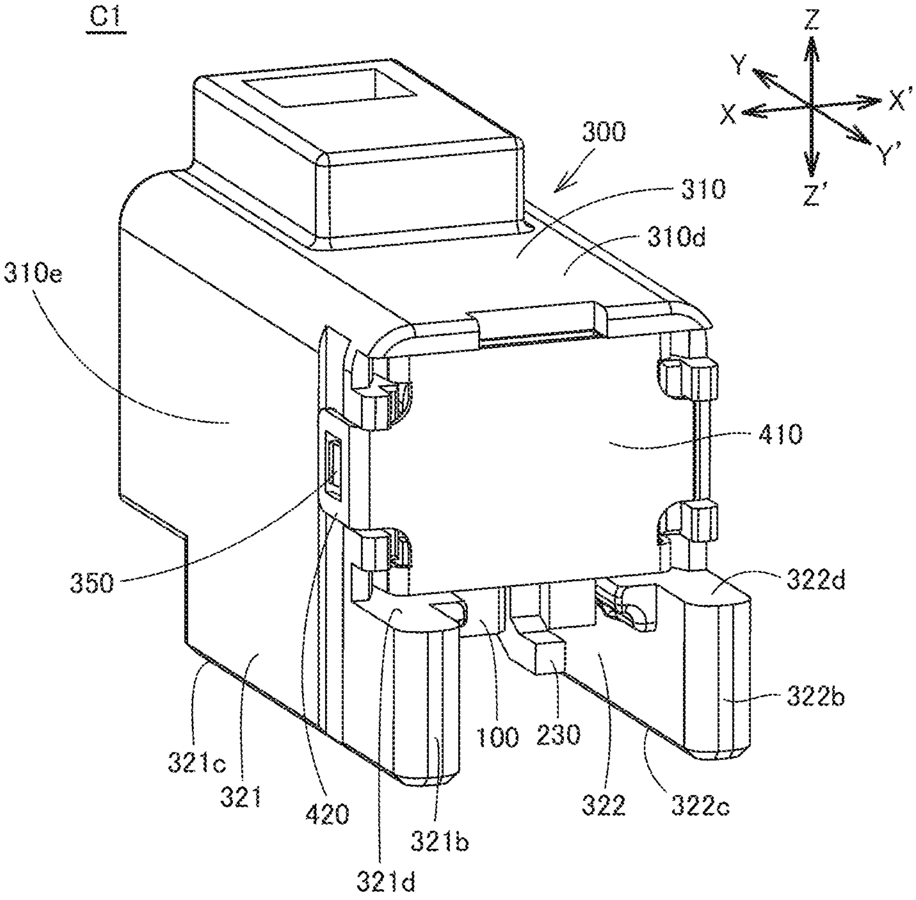
FIG. 1A is a rear, top, right side perspective view of a connector according to a first embodiment of the invention.

In the brief description of the drawings above and the description of embodiments which follows, relative spatial terms such as "upper", "lower", "top", "bottom", "left", "right", "front", "rear", etc., are used for the convenience of the skilled reader and refer to the orientation of the connector, and a connection structure of a circuit board and the connector, as well as their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

The following description describes connectors according to first to sixth embodiments of the invention and their modification examples, and then describes connection structures of a circuit board and the connector according to first to sixth embodiments of the invention and their modification examples. It should be noted that constituents of the embodiments and their modification examples to be described may be combined in any possible manner. Also, materials, shapes, dimensions, numbers, arrangements, etc. of the constituents of the various aspects of the embodiments and their modification examples will be discussed below as examples only and may be modified as long as they achieve similar functions.

Connector C1 According to a Plurality of Embodiments Including First Embodiment and its Modification Examples A connector C1 according to a plurality of embodiments, including a first embodiment of the invention and its modification examples, will be hereinafter described with reference to FIGS. 1A to 1E. FIGS. 1A to 1E illustrate the connector C1 of the first embodiment.

Figure 1B:
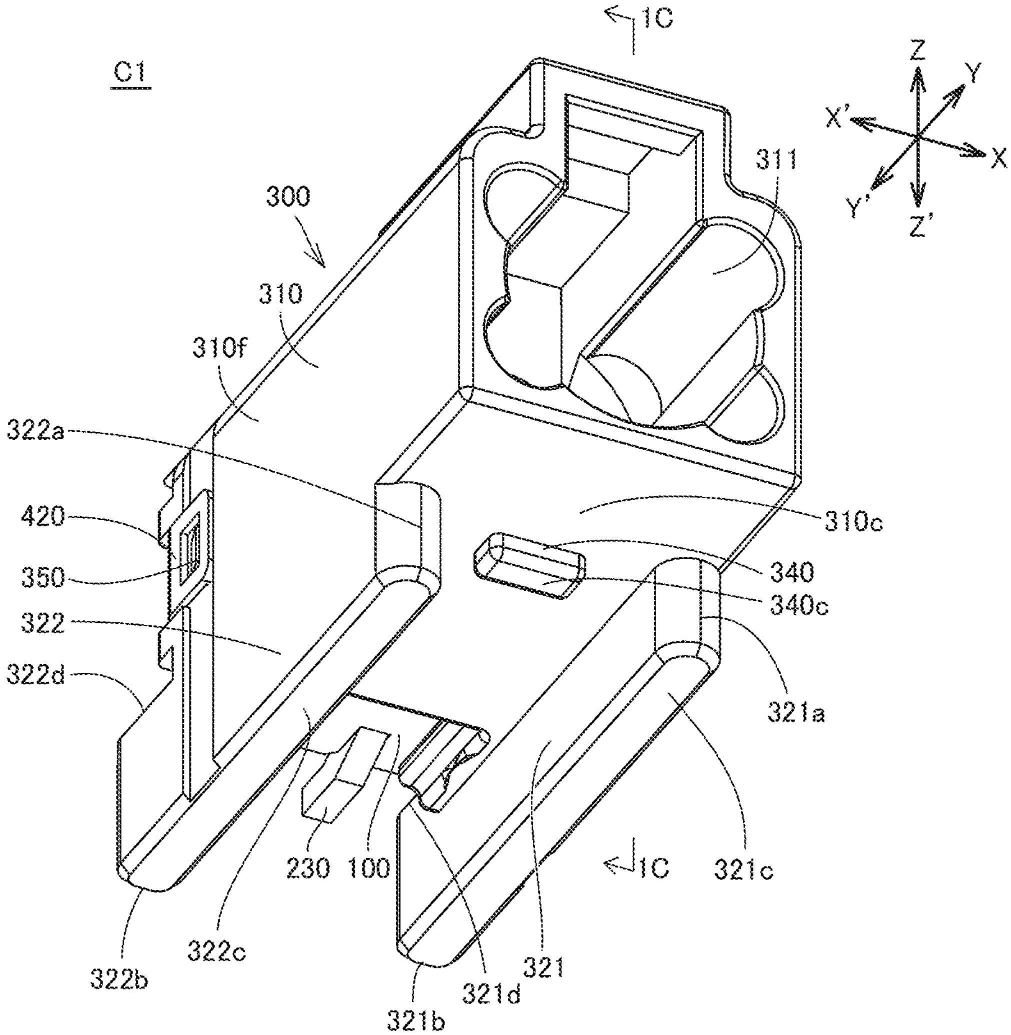
FIG. 1B is a front, bottom, left side perspective view of the connector according to the first embodiment.
Figure 1C:
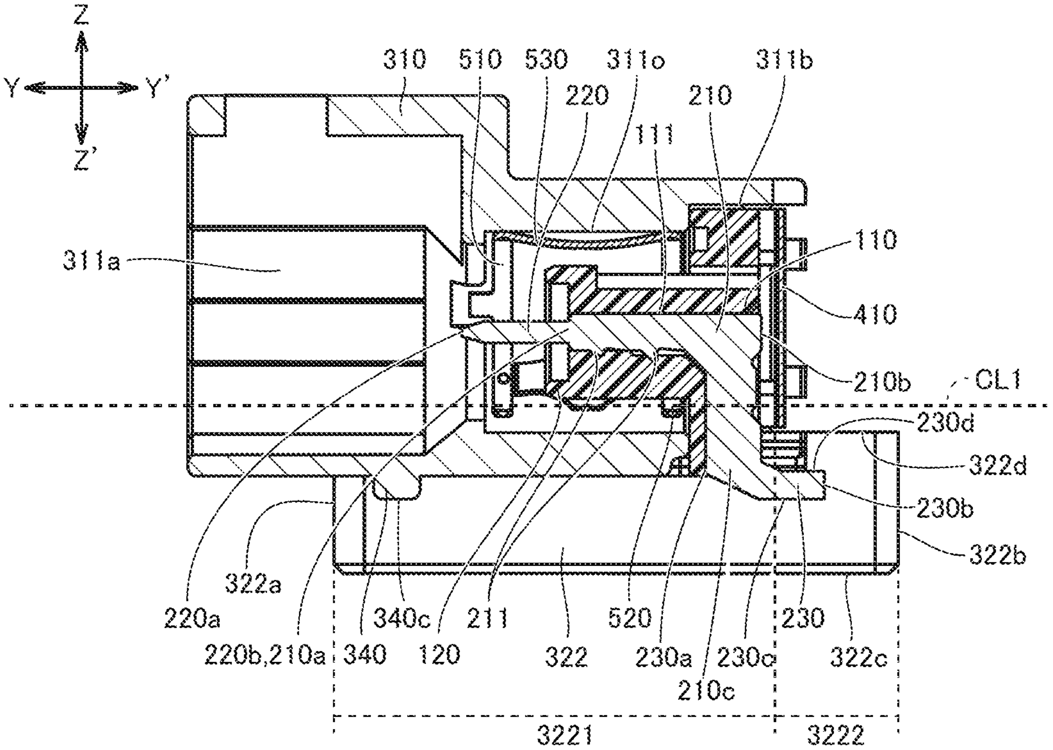
FIG. 1C is a cross-sectional view of the connector of the first embodiment, taken along line 1C-1C in FIG. 1B.
Figure 1D:
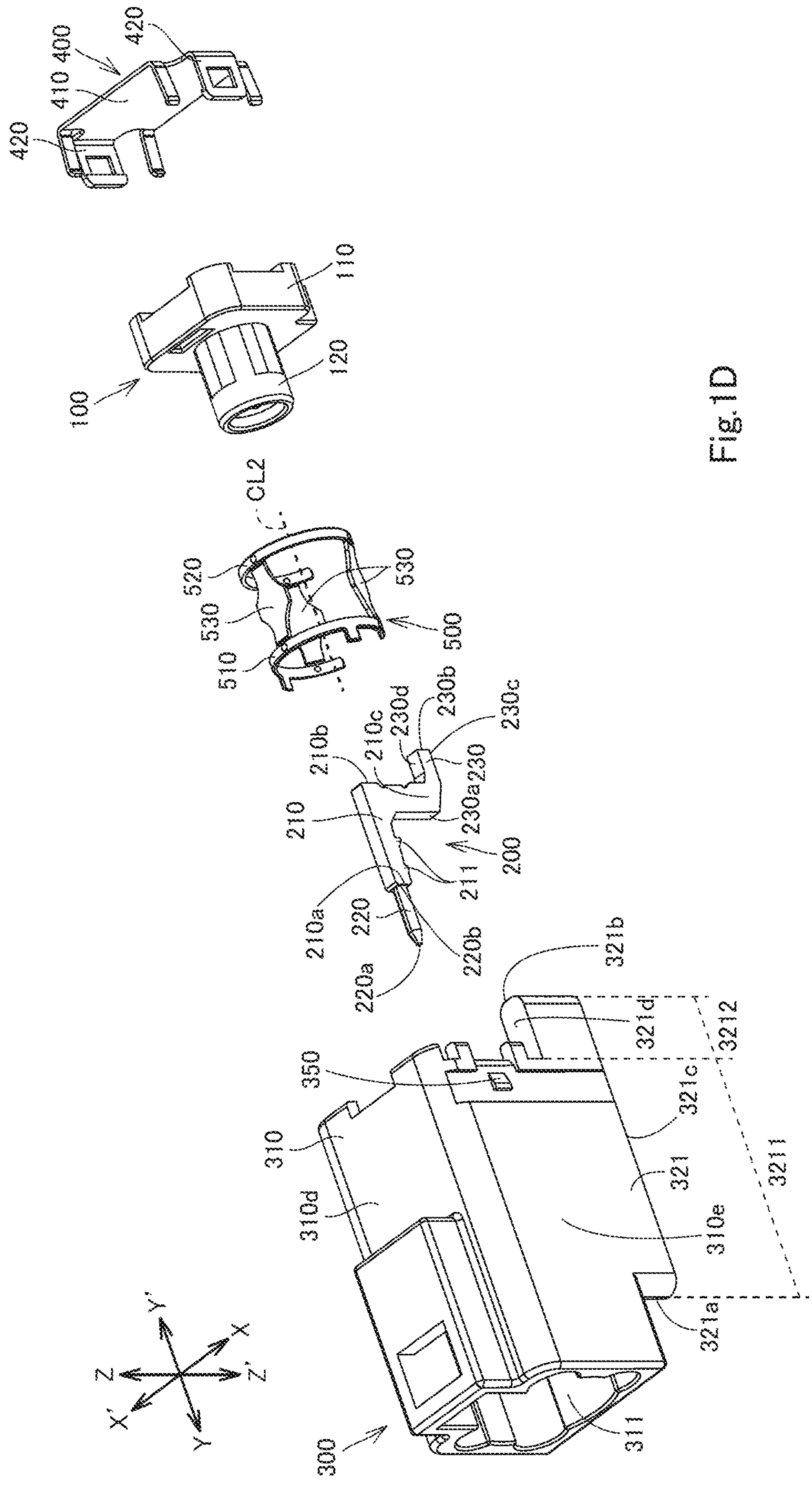
FIG. 1D is an exploded, front, top, right side perspective view of the connector according to the first embodiment.
Figure 1E:
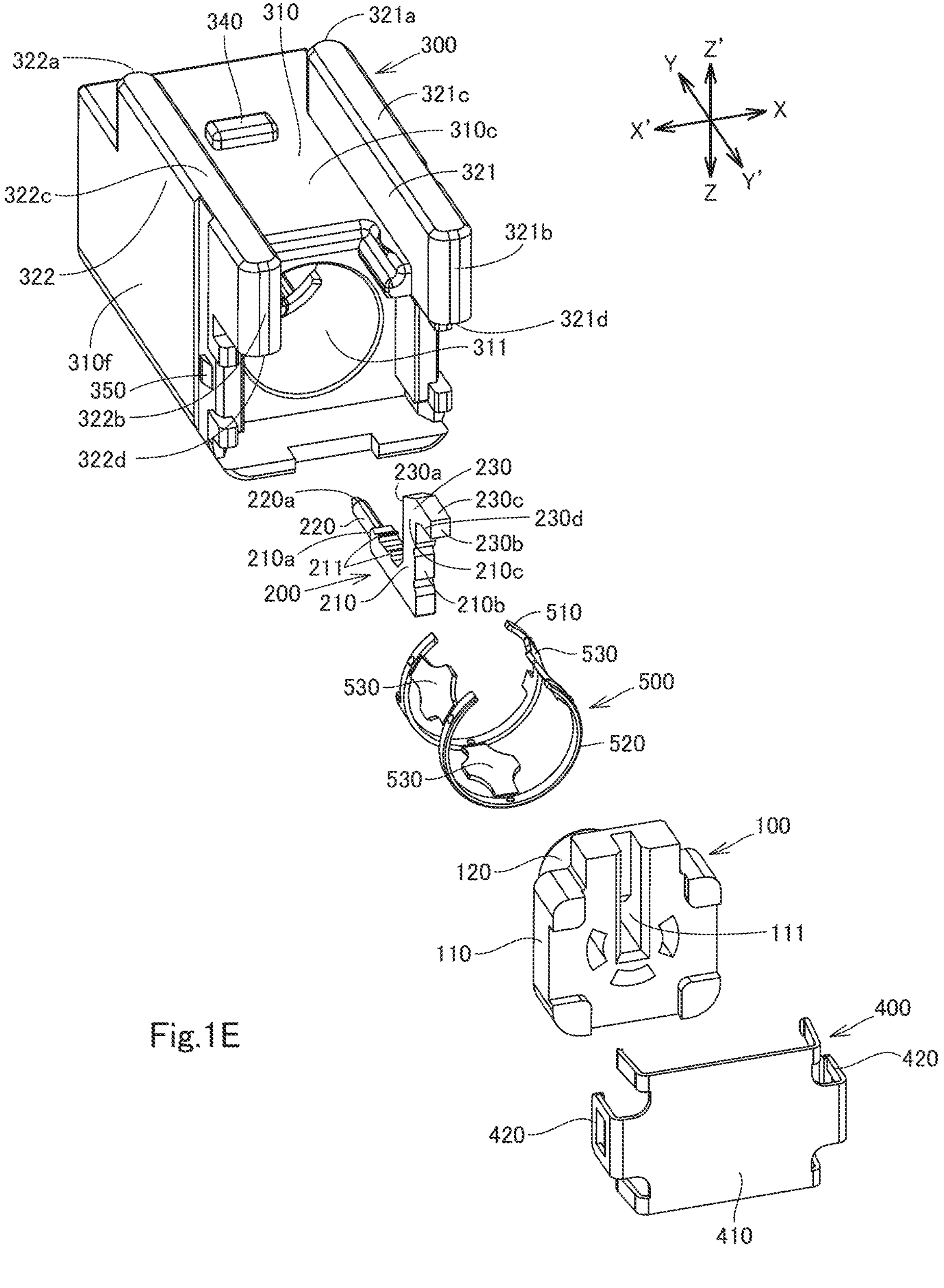
FIG. 1E is an exploded, rear, bottom, left side perspective view of the connector according to the first embodiment.

FIGS. 1A to 1C show a Y-Y' direction (first direction) and a Z-Z' direction (second direction). The Y-Y' direction includes a Y direction (one side in the first direction) and a Y' direction (the other side in the first direction). The Z-Z' direction is substantially orthogonal to the Y-Y' direction, and includes a Z' direction (one side in the second direction) and a Z direction (the other side in the second direction). FIGS. 1A, 1B, and 1C to 1E show an X-X' direction (third direction). The X-X' direction is substantially orthogonal to the Y-Y' and Z-Z' directions, and includes an X direction (one side in the third direction) and an X' direction (the other side in the third directions).

The connector C1 includes a body 100, which has insulating properties, and at least one terminal 200, which has electrical conductivity.

The body 100 is made of, for example, an insulating resin and holds the at least one terminal 200 partly. The body 100 may include one of the following configurations, for example: (a) the body 100 includes a basal portion 110 (not illustrated), or (b) the body 100 includes include a basal portion 110 and a projecting portion 120 extending in the Y direction from the basal portion 110 (see FIGS. 1A to 1E). The projecting portion 120 may be smaller in dimension in the Z-Z' direction and/or in dimension in the X-X' direction than the basal portion 110.

The at least one terminal 200 may be a single terminal (see FIGS. 1A to 1E) or a plurality of terminals (not illustrated). For convenience of description, the at least one terminal 200 may also be referred to as "the or each terminal 200". Where a single terminal 200 is provided, the terminal 200 of "the or each terminal 200" means the single terminal 200, and where a plurality of terminals 200 is provided, each terminal 200 of "the or each terminal 200" means each of the terminals 200. The or each terminal 200 is a plate of metal or other material having electrical conductivity, and includes a main body 210, a distal portion 220, and a mounting portion 230.

The main body 210 of the or each terminal 200 is a portion between the distal portion 220 and the mounting portion 230. For example, the main body 210 is constituted by a generally L-shaped rod, a flat plate, a generally tubular plate, or the like, in a cross-sectional view in the Y-Y' and Z-Z' directions. The main body 210 includes a first portion, which extends in the Y-Y' direction, and a second portion. The second portion extends in the Z' direction, or alternatively in an oblique direction including components of the Z' and Y' directions, from an end on the Y'-direction side of the first portion. The main body 210 includes a first end 210*a* on the Y-direction side, a second end 210*b* on the Y'-direction side, and a third end 210*c* on the Z'-direction side. The first end 210*a* is an end on the Y-direction side of the first portion of the main body 210, the second end 210*b* is an end on the Y'-direction side of the second portion of the main body 210, and the third end 210*c* is an end on the Z'-direction side of the second portion of the main body 210. The first portion of the main body 210 may or may not be provided with one or more protrusions 211.

The main body 210 is at least partly held by the body 100. For example, a part or the whole of the main body 210 may be pressed or otherwise securely received in a holding hole (not illustrated), which may be provided in the basal portion 110 of the body 100 of configuration (a) above or may be provided in the basal portion 110 and the projecting portion 120 of the body 100 of configuration (b) above. Alternatively, a part or the whole of the main body 210 may be insert-molded or otherwise securely embedded in the basal portion 110 of the body 100 of configuration (a) above, or alternatively in the basal portion 110 and the projecting portion 120 of the body 100 of configuration (b) above.

The distal portion 220 is constituted by a rod, a flat plate, a tube, a pair of beams, or the like and extends in the Y direction from the first end 210*a* of the main body 210. The distal portion 220 includes a first end 220*a* on the Y-direction side and a second end 220*b* on the Y'-direction side. The distal portion 220 has a dimension in the Z-Z' direction that is substantially the same as, or alternatively smaller than, that of the first portion of the main body 210. The distal portion 220 and the body 100 may include any of the following configurations.

The distal portion 220 may protrude in the Y direction from the projecting portion 120 of the body 100 of configuration (b) above (see FIG. 1C). Alternatively, the distal portion 220 may protrude in the Y direction from the basal portion 110 of the body 100 of configuration (a) above (not illustrated). Still alternatively, the distal portion 220 may be accommodated in an accommodation hole, which opens in the Y direction and is provided in the projecting portion 120 of the body 100 of configuration (b) above (not illustrated).

The mounting portion 230 is constituted by a rod, a flat plate, or the like and extends in the Y' direction from the third end 210*c* of the main body 210. A part of the mounting portion 230 may be accommodated in the basal portion 110 of the body 100 and the remaining part may be located outside the body 100 (see FIG. 1C). Alternatively, the entire mounting portion may be located outside the body 100 (not illustrated). The mounting portion 230 includes a first end 230*a* on the Y-direction side, a second end 230*b* on the Y'-direction side, a third end 230*c* on the Z'-direction side, and a fourth end 230*d* on the Z-direction side.

Where the at least one terminal 200 is a plurality of terminals, the main bodies 210 of the terminals 200 are held by the body 100 in one of manners described above, and are spaced from each other in the X-X' direction. The distal portions 220 of the plurality of terminals 200 protrude from the body 100 or are accommodated in the body 100 as described above, and are spaced from each other in the X-X' direction. The mounting portions 230 of the plurality of terminals 200 are spaced from each other in the X-X' direction. The plurality of terminals 200 thus arranged include a terminal 200 at an endmost position to the X-direction side and a terminal 200 at an endmost position to the X'-direction side.

The connector C1 further includes a shell 300 having electrical conductivity. The shell 300 includes a shell body 310. For example, the shell body 310 may be made of cast metal or may be made of metal formed with a 3D printer. The shell body 310 may alternatively be a molded-plastic shell body with its outer and/or inner face plated or vapor-deposited with a metal. In any of these cases, the shell body 310 is generally shaped like a tube (i.e., circular-section tube or polygonal-section tube) extending in the Y-Y' direction and has an internal space 311. The internal space 311 is a through hole extending through the shell 300 in the Y-Y' direction.

The internal space 311 of the shell body 310 securely accommodates the body 100 and accommodates the main body 210 and the distal portion 220 of the terminal 200 or the main bodies 210 and the distal portions 220 of the plurality of terminals 200. The internal space 311 of the shell body 310 may also accommodate a part of the mounting portion 230 of the terminal 200 or parts of the mounting portions 230 of the plurality of terminals 200, and the remaining part of the mounting portion 230 of the terminal 200 or the remaining parts of the mounting portions 230 of the plurality of terminals 200 may be located outside the shell body 310. Alternatively, the entire mounting portion 230 of the terminal 200 or the entire mounting portions 230 of the plurality of terminals 200 may be located outside the shell body 310.

The internal space 311 of the shell body 310 may include, for example, a central space 3110 and a first space 311*a* and/or a second space 311*b*. The first space 311*a* is located on the Y-direction side of the central space 3110, communicates with the central space 3110, and opens in the Y direction. The second space 311*b* is located on the Y'-direction side relative to the central space 3110, communicates with the central space 3110, and opens in the Y' direction. The second space 311*b* may open in the Z' direction (see FIGS. 1A to 1E), but is not limited thereto. The second space 311*b* has a cross section along the X-X' and Z-Z' directions of a shape and size that corresponds to the outer shape and size of the cross section along the X-X' and Z-Z' directions of the basal portion 110 of the body 100.

Where the body 100 has configuration (b) above, the basal portion 110 of the body 100 is securely accommodated in the second space 311*b*, and the projecting portion 120 of the body 100 is accommodated in the central space 3110. The distal portion 220 and the first portion of the main body 210 of the terminal 200, or alternatively the distal portions 220 and the first portions of the main bodies 210 of the plurality of terminals 200, are accommodated in the central space 311 together with the projecting portion 120 of the body 100, and the second portion of the main body) 210 of the terminal 200 or the second portions of the main bodies 210 of the plurality of terminals 200 are accommodated in the second space 311*b* together with the basal portion 110 (see FIG. 1C).

Where the body 100 has configuration (a) above, the basal portion 110 of the body 100 is securely accommodated in the second space 311*b*. The distal portion 220 of the terminal 200 or the distal portions 220 of the plurality of terminals 200 are accommodated in the central space 3110, and the main body 210 of the terminal 200 or the main bodies 210 of the plurality of terminals 200 are accommodated in the second space 311*b* together with the basal portion 110 of the body 100 (not illustrated).

The first space 311*a* is larger in cross-sectional dimensions in the X-X' and Z-Z' directions than the central space 3110. A perimeter face of the first space 311*a* of the shell body 310 may be provided with a plurality of key grooves and/or a lock hole may be provided on. The key grooves may extend in the Y-Y' direction on the perimeter face. The key grooves and/or the lock hole can be omitted. It is also possible to omit the first space 311*a* itself from the shell body 310.

The shell body 310 has a bottom face 310*c* on the Z'-direction side, a top face 310*d* on the Z-direction side, a first side face 310*e* on the X-direction side, and a second side face 310*f* on the X'-direction side.

The shell 300 further includes a first leg 321 and a second leg 322. The first leg 321 and the second leg 322 are ridges elongated in the Y-Y' direction and extend from the bottom face 310*c* of the shell body 310 in the Z' direction. The first leg 321 and the second leg 322 may be integrated with the shell body 310 (see FIGS. 1A to 1E) or alternatively provided separately from, and fixed to, the shell body 310 (not illustrated).

The first leg 321 has a side face on the X-direction side, which may be flush with the first side face 310*e* of the shell body 310 (see FIGS. 1A to 1E) or alternatively located on the X- or X'-direction side relative to the first side face 310*e* of the shell body 310 (not illustrated). The second leg 322 has a side face on the X'-direction side, which may be flush with the second side face 310*f* of the shell body 310 (see FIGS. 1A to 1E) or alternatively located on the X'- or X-direction side relative to the second side face 310*f* of the shell body 310 (not illustrated).

The first leg 321 is disposed on the X-direction side relative to the terminal 200 or the plurality of terminals 200. The second leg 322 is disposed on the X'-direction side relative to the terminal 200 or the plurality of terminals 200. In other words, the terminal 200 or the plurality of terminals 200 is located between the first leg 321 and the second leg 322 in the X-X' direction. The first leg 321 and the second leg 322 face each other in the X-X' direction.

The first leg 321 and the second leg 322 may be, but is not required to be, positioned substantially symmetrically to each other in the X-X' direction across a first imaginary line CL1 (see FIG. 1C) or a second imaginary line (not illustrated) that serves as an axis of line symmetry (see FIGS. 1A to 1E). Such positioning of the first leg 321 and the second leg 322 may be described simply as "symmetrically positioned" for convenience of description. The first leg 321 and the second leg 322 may be, but is not required to be, shaped substantially symmetrically to each other in the X-X' direction across the first imaginary line CL1 or the second imaginary line that serves as the axis of line symmetry (see FIGS. 1A to 1E). Such shaping of the first leg 321 and the second leg 322 may be described simply as "symmetrically shaped" for convenience of description. Where the at least one terminal 200 is a single terminal, the first imaginary line CL1 may extend in the Y-Y' direction through substantially a center of the main body 210 of the terminal 200 (see FIGS. 1A to 1E). Where the at least one terminal 200 is a plurality of terminals, the second imaginary line may extend in the Y-Y' direction through substantially through a midpoint of a linear distance in the X-X' direction from an end on the X-direction side of the main body 210 of the terminal 200 at the endmost position to the X-direction side to an end on the X'-direction side of the main body 210 of the terminal 200 at the endmost position to the X'-direction side (not illustrated). It should be noted the positioning and shaping of the first leg 321 and the second leg 322 are not required to be symmetrically positioned or symmetrically shaped as described above.

The first leg 321 is larger in dimension in the Y-Y' direction than in dimension in the X-X' direction. The second leg 322 is larger in dimension in the Y-Y' direction than in dimension in the X-X' direction. The first leg 321 and the second leg 322 may have substantially the same dimension in the Y-Y' direction (see FIGS. 1A to 1E), but may have different dimensions in the Y-Y' direction (not illustrated). The first leg 321 and the second leg 322 may have substantially the same dimension in the X-X' direction (see FIGS. 1A to 1E), but may have different dimensions in the X-X' direction (not illustrated).

The first leg 321 and the second leg 322 are each larger in dimension in the Y-Y' direction than the distal portion 220 of the or each terminal 200. The first leg 321 includes a first end 321*a* on the Y-direction side and a second end 321*b* on the Y'-direction side. The second leg 322 includes a first end 322*a* on the Y-direction side and a second end 322*b* on the Y'-direction side. The first end 321*a* of the first leg 321 and the first end 322*a* of the second leg 322 are each located on the Y-direction side relative to the first end 220*a* of the distal portion 220 of the or each terminal 200. The second end 321*b* of the first leg 321 and the second end 322*b* of the second leg 322 are each located on the Y'-direction side at least relative to the second end 220*b* of the distal portion 220 of the or each terminal 200.

The first leg 321 and the second leg 322 may each be larger in dimension in the Y-Y' direction than the or each terminal 200 (see FIGS. 1A to 1E). In this case, the first leg 321 and the second leg 322 may be configured as below. The first leg 321 includes a first portion 3211 extending in the Z' direction from the shell body 310 and a second portion 3212 extending in the Y' direction from the first portion 3211, and the second leg 322 includes a first portion 3221 extending in the Z' direction from the shell body 310 and a second portion 3222 extending in the Y' direction from the first portion 3221. The first portion 3211 of the first leg 321 is located on the X-direction side relative to the distal portion 220, the main body 210, and a portion on the Y-direction side of the mounting portion 230 of the terminal 200, or alternatively relative to the distal portions 220, the main bodies 210, and portions on the Y-direction side of the mounting portions 230 of the plurality of terminals 200. The second portion 3212 of the first leg 321 is located on the Y'-direction side relative to the shell body 310 and located on the X-direction side relative to a portion on the Y'-direction side of the mounting portion 230 of the terminal 200, or alternatively relative to portions on the Y'-direction side of the mounting portions 230 of the plurality of terminals 200. The first portion 3221 of the second leg 322 is located on the X'-direction side relative to the distal portion 220, the main body 210, and the portion on the Y-direction side of the mounting portion 230 of the terminal 200, or alternatively relative to the distal portions 220, the main bodies 210, and the portions on the Y-direction side of the mounting portions 230 of the plurality of terminals 200. The second portion 3222 of the second leg 322 is located on the Y'-direction side relative to the shell body 310 and located on the X'-direction side relative to the portion on the Y'-direction side of the mounting portion 230 of the terminal 200, or alternatively relative to the portions on the Y'-direction side of the mounting portions 230 of the plurality of terminals 200. The first end 321*a* of the first leg 321 and the first end 322*a* of the second leg 322 are located as described above. The second end 321*b* of the first leg 321 and the second end 322*b* of the second leg 322 are each substantially coincident in the Y-Y' direction with, or alternatively located on the Y'-direction side relative to, the second end 230*b* of the mounting portion 230 of the or each terminal 200.

The first leg 321 and the second leg 322 are each larger in dimension in the Z-Z' direction than the mounting portion 230 of the terminal 200 or than the mounting portions 230 of the terminals 200. The first leg 321 further includes a third end 321*c* on the Z'-direction side. The second leg 322 further includes a third end 322*c* on the Z'-direction side. The third end 321*c* of the first leg 321 and the third end 322*c* of the second leg 322 are each located on the Z'-direction side relative to the third end 230*c* of the mounting portion 230 of the or each terminal 200 (see FIGS. 1A to 1C).

Where the first leg 321 includes the first and second portions 3211, 3212 and the second leg 322 includes the first and second portions 3221, 3222, the first leg 321 further has a fourth end 321*d* on the Z-direction side, and the second leg 322 further has a fourth end 322*d* on the Z-direction side. The fourth end 321*d* of the first leg 321 is an end on the Z-direction side of the second portion 3212 of the first leg 321. The fourth end 322*d* of the second leg 322 is an end on the Z-direction side of the second portion 3222 of the second leg 322. The fourth end 321*d* of the first leg 321 and the fourth end 322*d* of the second leg 322 may be each substantially coincident in the Z-Z' direction with the fourth end 230*d* of the mounting portion 230 of the or each terminal 200 (not illustrated), or alternatively located on the Z-direction side relative to the fourth end 230*d* of the mounting portion 230 of the or each terminal 200 (see FIGS. 1A to 1C). In the latter case, the second portion 3212 of the first leg 321 and the second portion 3222 of the second leg 322 may extend in the Z direction such that the fourth end 321*d* of the first leg 321 and the fourth end 322*d* of the second leg 322 are each substantially coincident in the Z-Z' direction with the top face 310*d* of the shell body 310.

The shell 300 may further include a first coupling portion (not illustrated) located on the Z-direction side relative to the mounting portion 230 of the terminal 200 or relative to the mounting portions 230 of the plurality of terminals 200 so as to couple the second portion 3212 of the first leg 321 and the second portion 3222 of the second leg 322. The first coupling portion can be omitted (see FIGS. 1A to 1E).

The shell 300 of the connector C1 may further include at least one protrusion 340 (see FIGS. 1A to 1E). The at least one protrusion 340 extends in the Z' direction from the bottom face 310*c* of the shell body 310. The at least one protrusion 340 includes a distal end 340*c* on the Z'-direction side. The distal end 340*c* of the at least one protrusion 340 is substantially coincident in the Z-Z' direction with the third end 230*c* of the mounting portion 230 of the or each terminal 200. The at least one protrusion 340 may be a plurality of protrusions. The at least one protrusion 340 can be omitted, in which case the third end 230*c* of the mounting portion 230 of the or each terminal 200 is substantially coincident in the Z-Z' direction with the bottom face 310*c* of the shell body 310.

The connector C1 may further include a shield cover 400 (see FIGS. 1A to 1E). The shield cover 400 includes a covering portion 410 and at least two engaging arms 420. The covering portion 410, which is a plate having electrical conductivity (e.g., a metal plate), abuts the shell body 310 so as to close the internal space 311 of the shell body 310 of the shell 300 from the Y'-direction side. The at least two engaging arms 420 extend in the Y direction from the end on the X-direction side and the end on the X'-direction side of the covering portion 410. At least two engaging portions 350 are provided on two faces of the bottom face 310*c*, the top face 310*d*, the first side face 310*e*, and the second side face 310*f* of the shell body 310. Each of the at least two engaging arms 420 may be provided with an engaging projection, and each of the at least two engaging portions 350 may be provided with an engagement hole to fittingly receive a corresponding engaging projection. Alternatively, each of the at least two engaging portions 350 may be provided with an engaging projection, and each of the at least two engaging arms 420 may be provided with an engagement hole to fittingly receive a corresponding engaging projection. The shield cover 400 can be omitted.

The connector C1 may further include a ground terminal 500 (see FIGS. 1A to 1E). The ground terminal 500 includes a first ring 510, a second ring 520, and a plurality of contact springs 530. The first ring 510 and the second ring 520 are metal plates of C shaped or circular ring shape and are spaced from each other in the Y-Y' direction. The contact springs 530 are provided between the first ring 510 and the second ring 520 and are spaced from each other in the circumferential direction of the first ring 510. Each of the contact springs 530 curves in an arc shape such that an intermediate portion of each contact spring is convex toward a third imaginary line CL2 (see FIG. 1D) extending in the Y-Y' direction through the centers of the first ring 510 and the second ring 520. The ground terminal 500 is accommodated in the central space 3110 of the internal space 311 of the shell body 310. The contact springs 530 of the ground terminal 500 surround the distal portion 220 of the terminal 200 or the distal portions 220 of the plurality of terminals 200. The ground terminal 500 can be omitted.

The connector C1 as described above provides the following technical features and effects.

First technical features and effects: The connector C1 has improved electromagnetic interference (EMI) characteristics for the following reasons. The first leg 321 and the second leg 322 of the shell 300 of the connector C1 are ridges elongated in the Y-Y' direction and are located on the X- and X'-direction sides relative to the terminal 200 or the plurality of terminals 200. Therefore, the first leg 321 and the second leg 322 of the shell 300 of the connector C1 are each at a shorter distance to the terminal 200 or the plurality of terminals 200, compared to the distance from each of the front and rear legs to the terminal of the conventional connector described above. Moreover, being ridges elongated in the Y-Y' direction, the first leg 321 and the second leg 322 each have a larger cross-sectional area in cross section along the Y-Y' and Z-Z' directions than the cross-sectional area in the corresponding cross section of each of the front and rear legs of the conventional connector. With the first leg 321 and the second leg 322 grounded (in a manner described below) in use, the connector C1 has improved grounding strength. For this reason, in use, even if high-speed signals transmitted through the at least one terminal 200 are reflected on the at least one terminal 200 to cause generation of noise to be radiated to the shell body 310 of the shell 300, the noise will easily flow from the first leg 321 and/or the second leg 322 of the connector C1 to the ground. This suppresses the possibility that the noise radiated to the shell body 310 of the shell 300 is re-radiated from an edge portion or portions of the shell body 310. Especially in a case where the first end 321*a* of the first leg 321 and the first end 322*a* of the second leg 322 are each located on the Y-direction side relative to the first end 220*a* of the distal portion 220 of the or each terminal 200 and the second end 321*b* of the first leg 321 and the second end 322*b* of the second leg 322 are each located on the Y'-direction side relative to the second end 230*b* of the mounting portion 230 of the or each terminal 200, the first leg 321 and the second leg 322 are disposed on the X- and X'-direction sides relative to the terminal 200 or the terminals 200 over the entire length in the Y-Y' direction of the terminal or each of the terminals 200. In this case, even if high-speed signals are reflected on the at least one terminal 200 to cause generation of noise to be radiated to the shell body 310, the noise will more easily flow through the first leg 321 and/or the second leg 322 of the shell body 310 to the ground. This further suppresses the possibility that the noise is re-radiated from an edge portion of the shell body 310.

Second technical features and effects: The connector C1 has improved electromagnetic compatibility (EMC) characteristics for the following reason. Being ridges elongated in the Y-Y' direction, the first leg 321 and the second leg 322 of the connector C1 each have a larger cross-sectional area in cross section along the Y-Y' and Z-Z' directions. This reduces impedances of the first leg 321 and the second leg 322, strengthening the grounding of the connector C1. The connector C1 thus has improved EMC characteristics.

Third technical features and effects: Where the shield cover 400 of the connector C1 closes the internal space 311 of the tubular shell body 310 of the shell 300 from the Y'-direction side, such arrangement reduces the possibility that the second end 210*b* of the generally L-shaped main body 210 and/or the mounting portion 230 of the or each terminal 200 accommodated in the internal space 311 of the shell body 310 function as an antenna so as to cause radiation of noise to the outside of the shell body 310.

Figure 2A:
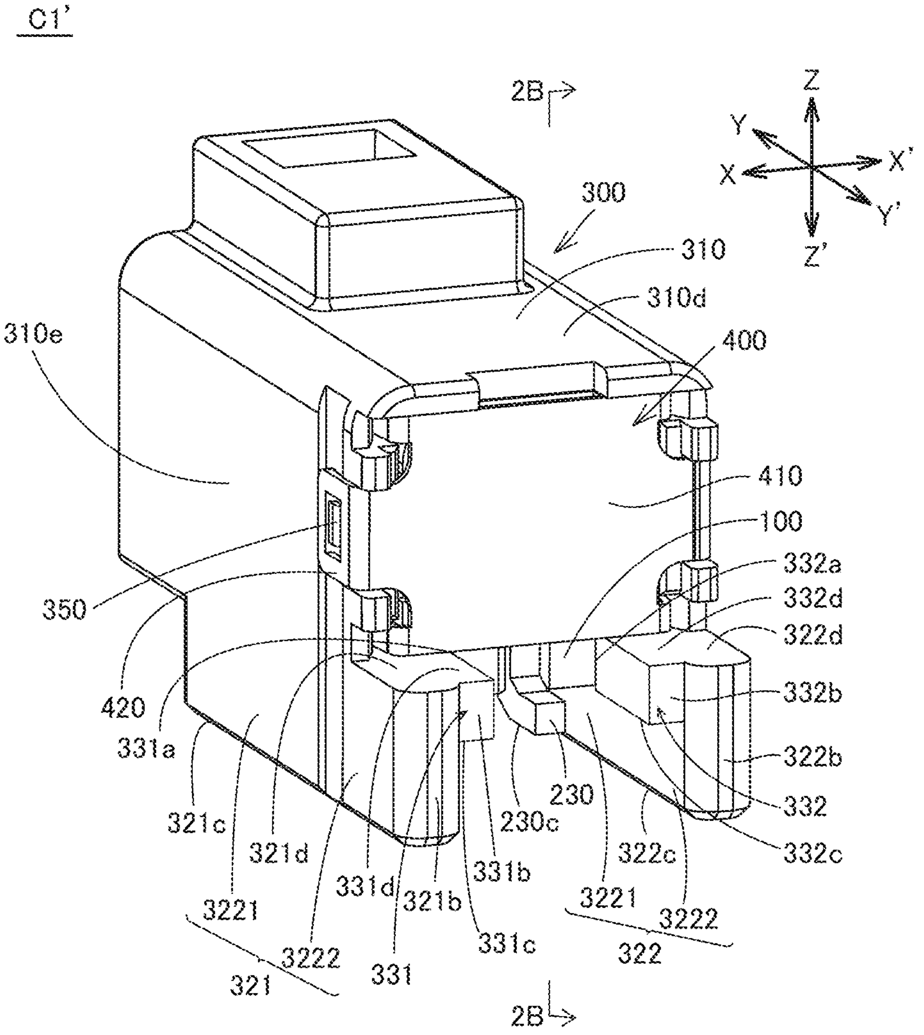
FIG. 2A is a rear, top, right side perspective view of a connector according to a second embodiment of the invention.
Figure 2B:
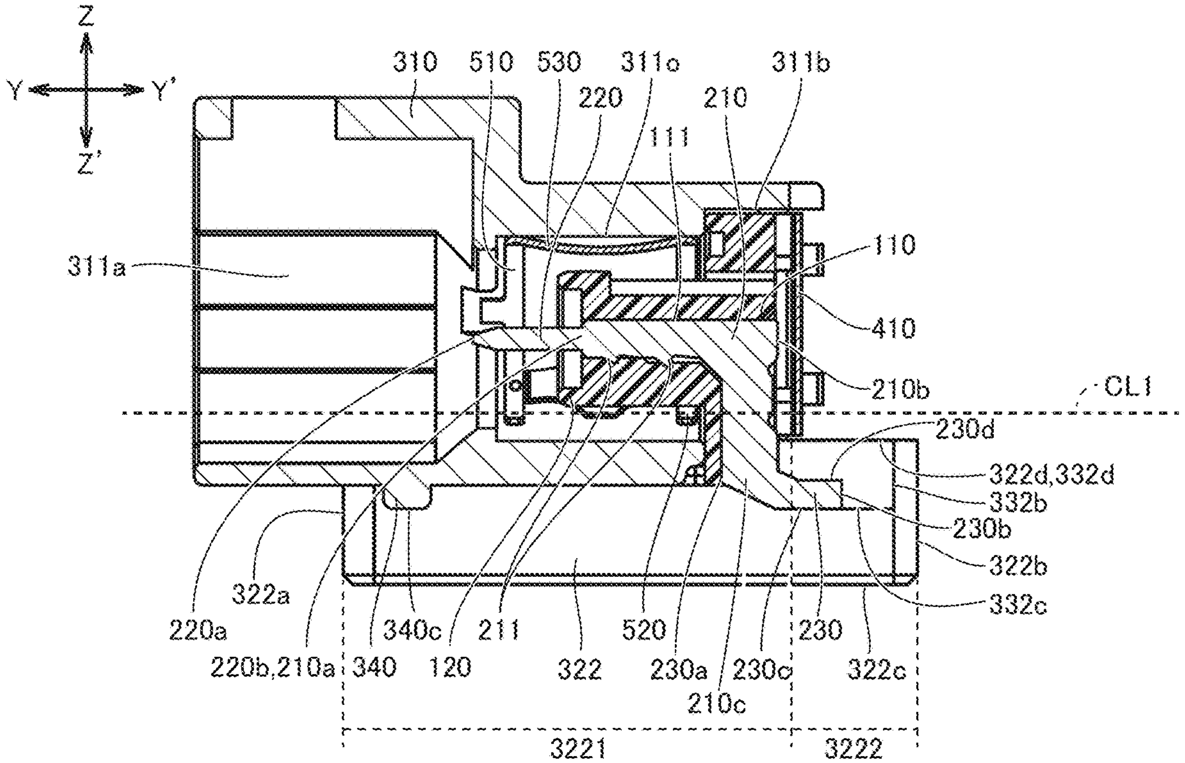
FIG. 2B is a cross-sectional view of the connector of the second embodiment, taken along line 2B-2B in FIG. 2A.
Figure 2C:
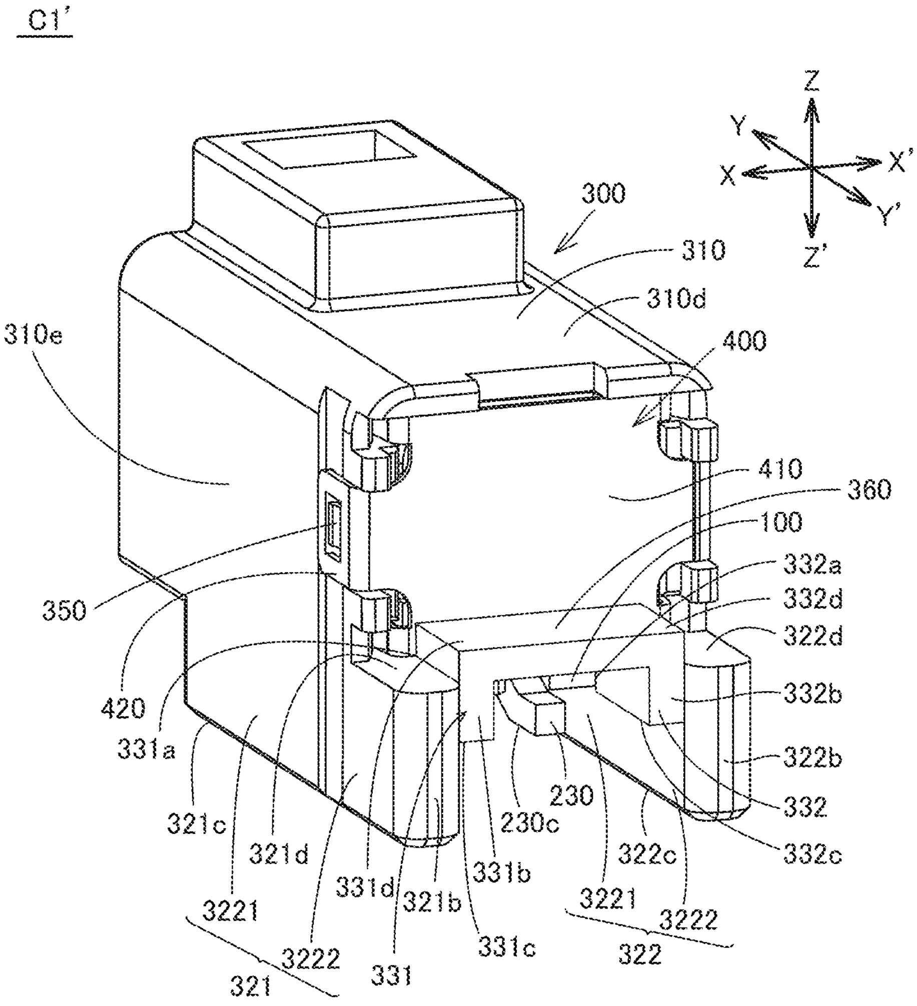
FIG. 2C is a rear, top, right side perspective view of a first variant of the connector according to the second embodiment.

Connector C1' According to a Plurality of Embodiments Including Second Embodiment and its Modification Examples A connector C1' according to a plurality of embodiments, including the second embodiment of the invention and its modification examples, will be hereinafter described with reference to FIGS. 2A to 2C. FIGS. 2A and 2B illustrate the connector C1' of the second embodiment. FIG. 2C illustrates a first variant of the connector C1' of the second embodiment. Similarly to FIG. 1A, FIGS. 2A and 2C show the Y-Y', Z-Z', and X-X' directions. Similarly to FIG. 1C, FIG. 2B shows the Y-Y' and Z-Z' directions.

The connector C1' has the same configuration as the connector C1, except that the shell 300 further includes a first wall 331 and a second wall 332. The connector C1' will be hereinafter described focusing on the differences from the connector C1 and omitting overlapping descriptions. Except the first wall 331 and the second wall 332 of the connector C1', components of the connector C1' will be referred to using the same reference numerals as those of the corresponding components of the connector C1.

The first wall 331 extends in the Y' direction from the shell body 310 and is spaced from, and located on the X-direction side relative to, the mounting portion 230 of the terminal 200 or the mounting portions 230 of the plurality of terminals 200. The second wall 332 extends in the Y' direction from the shell body 310 and is spaced from, and located on the X'-direction side relative to, the mounting portion 230 of the terminal 200 or the mounting portions 230 of the plurality of terminals 200.

Where the first leg 321 includes the first and second portions 3211, 3212 and the second leg 322 includes the first and second portions 3221, 3222, the first wall 331 is located, in the X-X' direction, between the mounting portion 230 of the terminal 200 or the mounting portions 230 of the plurality of terminals 200, and the second portion 3212 of the first leg 321, and the second wall 332 is located, in the X-X' direction, between the mounting portion 230 of the terminal 200 or the mounting portions 230 of the plurality of terminals 200, and the second portion 3222 of the second leg 322. The first wall 331 may be integrated with the first leg 321 (see FIG. 2A), or alternatively disposed with a gap from the first leg 321 in the X-X' direction (not illustrated). The second wall 332 may be integrated with the second leg 322 (see FIG. 2A), or alternatively disposed with a gap from the second leg 322 in the X-X' direction (not illustrated).

Where the second end 321*b* of the first leg 321 and the second end 322*b* of the second leg 322 are located on the Y-direction side relative to a first end 331*a* on the Y-direction side of the first wall 331 and a first end 332*a* on the Y-direction side of the second wall 332, the first leg 321 does not exist on the X-direction side relative to the first wall 331, and the second leg 322 does not exist on the X'-direction side relative to the second wall 332.

The first wall 331 includes the above-mentioned first end 331*a*, a second end 331*b* on the Y'-direction side, a third end 331*c* on the Z'-direction side, and a fourth end 331*d* on the Z-direction side. The second wall 332 includes the above-mentioned first end 332*a*, a second end 332*b* on the Y'-direction side, a third end 332*c* on the Z'-direction side, and a fourth end 332*d* on the Z-direction side.

The first end 331*a* of the first wall 331 and the first end 332*a* of the second wall 332 are each contiguous with the shell body 310. The second end 331*b* of the first wall 331 and the second end 332*b* of the second wall 332 may be each substantially coincident in the Y-Y' direction with the second end 230*b* of the mounting portion 230 of the or each terminal 200 (not illustrated), or alternatively located on the Y'-direction side relative to the second end 230*b* of the mounting portion 230 of the or each terminal 200 (see FIGS. 2A and 2B).

The third end 331*c* of the first wall 331 and the third end 332*c* of the second wall 332 are each substantially coincident in the Z-Z' direction with the third end 230*c* of the mounting portion 230 of the or each terminal 200 (see FIGS. 2A and 2B). The fourth end 331*d* of the first wall 331 and the fourth end 332*d* of the second wall 332 may be each substantially coincident in the Z-Z' direction with the fourth end 230*d* of the mounting portion 230 of the or each terminal 200 (not illustrated), or alternatively each located on the Z-direction side relative to the fourth end 230*d* of the mounting portion 230 of the or each terminal 200 (see FIGS. 2A and 2B). In the latter case, the first wall 331 and the second wall 332 may extend in the Z direction such that the fourth end 331*d* of the first wall 331 and the fourth end 332*d* of the second wall 332 are substantially coincident in the Z-Z' direction with, or alternatively on the Z-direction side relative to, the fourth end 321*d* of the first leg 321 and the fourth end 322*d* of the second leg 322, respectively. The first wall 331 and the second wall 332 may extend in the Z direction such that the fourth end 331*d* of the first wall 331 and the fourth end 332*d* of the second wall 332 are each substantially coincident with the top face 310*d* of the shell body 310 in the Z-Z' direction.

The shell 300 may further include a second coupling portion 360 (see FIG. 2C) located on the Z-direction side relative to the mounting portion 230 of the terminal 200 or relative to the mounting portions 230 of the plurality of terminals 200 so as to couple the first wall 331 and the second wall 332. The second coupling portion 360 can be omitted.

Where the wall on the X-direction side and the wall on the X'-direction side of the internal space 311 of the shell body 310 are located on the X-direction side and the X'-direction side, respectively, relative to the mounting portion 230 of the terminal 200 or the mounting portions 230 of the plurality of terminals 200, the first wall 331 may not extend in the Y' direction from the shell body 310, but may be part of the wall on the X-direction side of the internal space 311 of the shell body 310 and spaced from, and located on the X-direction side relative to, the mounting portion 230 of the terminal 200 or the mounting portions 230 of the plurality of terminals 200. Likewise, the second wall 332 may not extend in the Y' direction from the shell body 310, but may be part of the wall on the X'-direction side of the internal space 311 of the shell body 310 and spaced from, and located on the X'-direction side relative to, the mounting portion 230 of the terminal 200 or the mounting portions 230 of the plurality of terminals 200. Except for being formed as the parts of these walls, such first and second walls 331 332 may include any of the above-described configurations.

Similarly to the shell 300 of the connector C1, the bottom face 310*c* of the shell body 310 of the shell 300 of the connector C1' may or may not be provided with the one or more protrusions 340.

The connector C1' may or may not include the shield cover 400 and/or the ground terminal 500.

The connector C1' as described above provides the following technical features and effects.

The connector C1' provides substantially the same technical features and effects as the first technical features and effects of the connector C1. Moreover, the first wall 331 and the second wall 332 of the shell 300 of the connector C1' extend in the Y' direction from the shell body 310, and are disposed on the X- and X'-direction sides relative to the mounting portion 230 of the terminal 200 or the mounting portions 230 of the plurality of terminals 200. Where the first wall 331 and the second wall 332 are grounded in use, the connector C1' has improved grounding strength, resulting in that the connector C1' provides improved EMI characteristics.

The connector C1' provides substantially the same technical features and effects as the second and third technical features and effects of the connector C1.

Figure 3A:
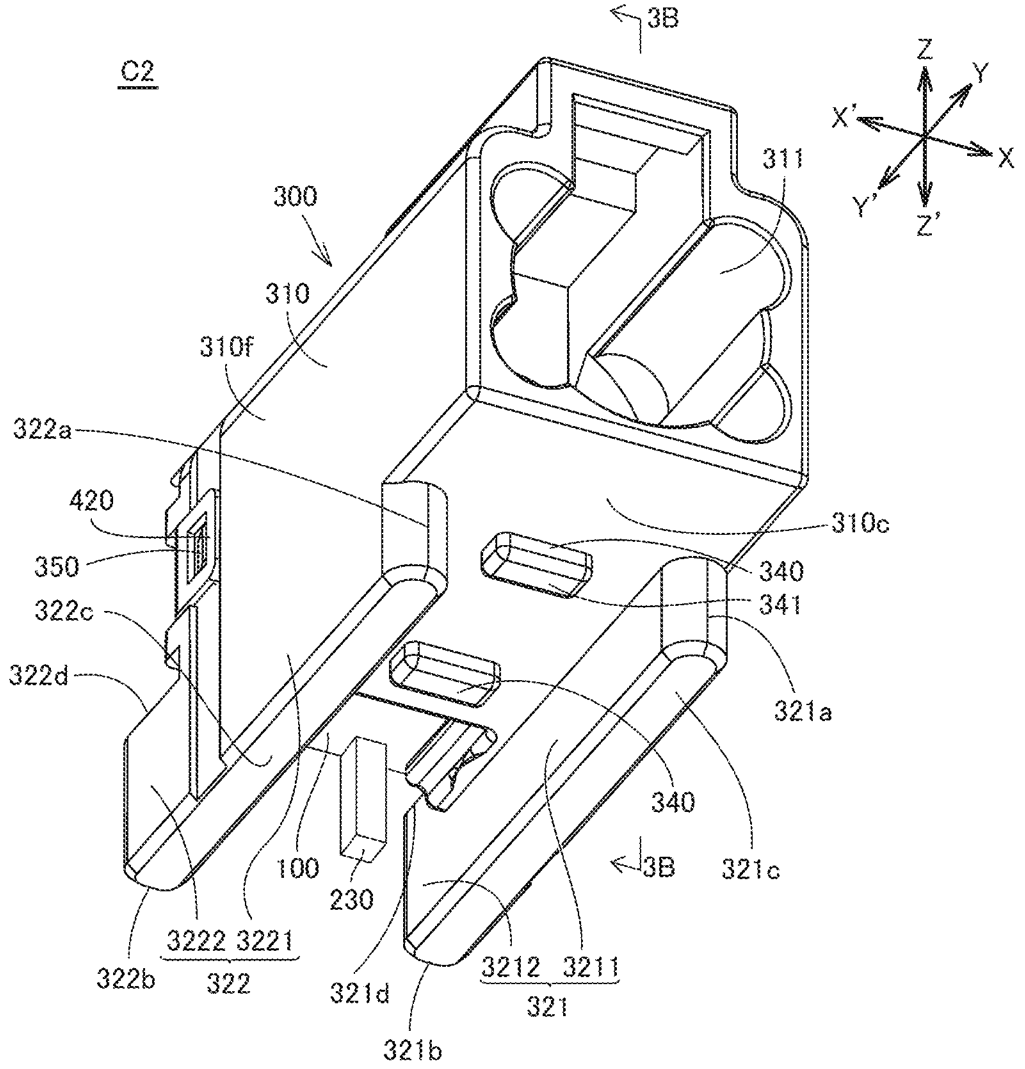
FIG. 3A is a front, bottom, left side perspective view of a connector according to a third embodiment of the invention.
Figure 3B:
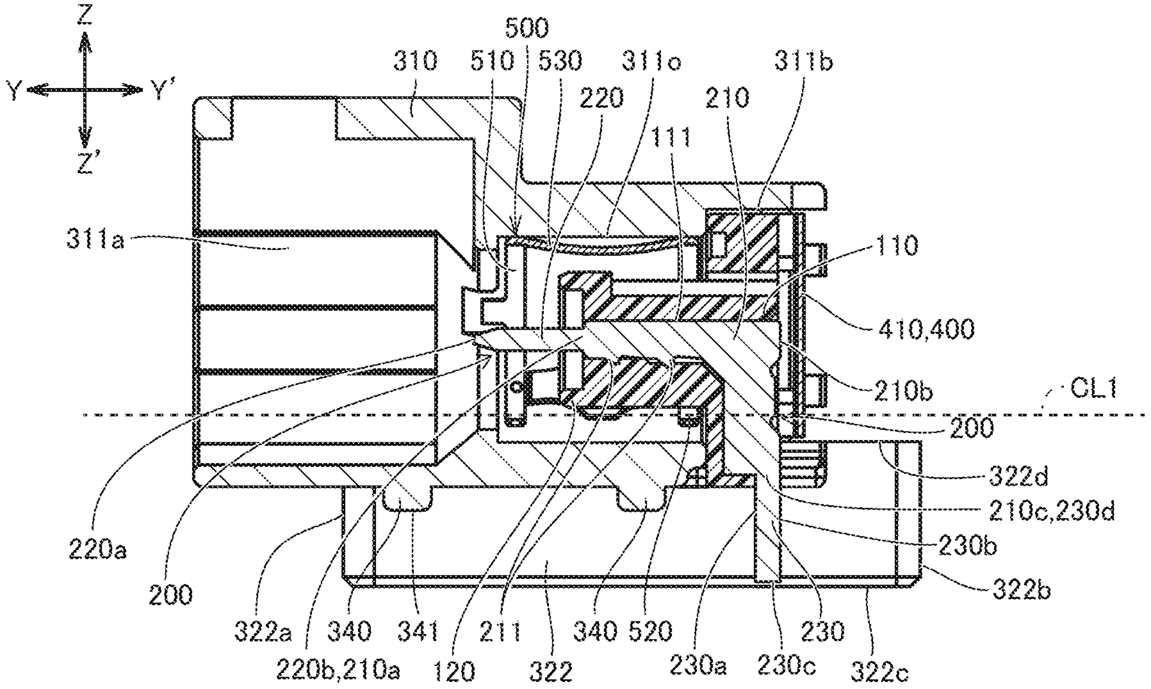
FIG. 3B is a cross-sectional view of the connector according to the third embodiment, taken along line 3B-3B in FIG. 3A.

Connector C2 According to a Plurality of Embodiments Including Third Embodiment and its Modification Examples A connector C2 according to a plurality of embodiments, including a third embodiment of the invention and its modification examples, will be hereinafter described with reference to FIGS. 3A and 3B. FIGS. 3A and 3B illustrate the connector C2 of the third embodiment. Similarly to FIG. 1B, FIG. 3A shows the Y-Y', Z-Z', and X-X' directions. Similarly to FIG. 1C, FIG. 3B shows the Y-Y' and Z-Z' directions.

The connector C2 has the same configuration as the connector C1, except that the mounting portion 230 of the or each terminal 200 is different in configuration from the mounting portion 230 of the or each terminal 200 of the connector C1. The connector C2 will be hereinafter described focusing on the differences from the connector C1 and omitting overlapping descriptions. Components of the connector C2 will be referred to using the same reference numerals as those of the corresponding components of the connector C1.

The mounting portion 230 of the or each terminal 200 is constituted by a rod, a flat plate, or the like and extends in the Z' direction from the third end 210*c* of the main body 210. The mounting portion 230 may have a dimension in the Y-Y' direction that is the same as, or alternatively smaller than, that of the second portion of the main body 210. A part of the mounting portion 230 may be accommodated in the basal portion 110 of the body 100 and the remaining part may be located outside the body 100, i.e., on the Z'-direction side relative to the body 100 (see FIG. 3B). Alternatively, the entire mounting portion may be located outside the body 100, i.e., on the Z'-direction side relative to the body 100 (not illustrated). The mounting portion 230 includes a first end 230*a* on the Y-direction side, a second end 230*b* on the Y'-direction side, a third end 230*c* on the Z'-direction side, and a fourth end 230*d* on the Z-direction side.

The third end 321*c* of the first leg 321 of the shell 300 and the third end 332*c* of the second leg 322 may be each substantially coincident in the Z-Z' direction with, or alternatively located on the Z'-direction side relative to, the third end 230*c* of the mounting portion 230 of the or each terminal 200.

Similarly to the shell 300 of the connector C1, the bottom face 310*c* of the shell body 310 of the shell 300 of the connector C2 may or may not be provided with one or more protrusions 340.

The connector C2 may or may not include the shield cover 400 and/or the ground terminal 500.

The connector C2 as described above provides substantially the same technical features and effects as the first to third technical features and effects of the connector C1.

Figure 4A:
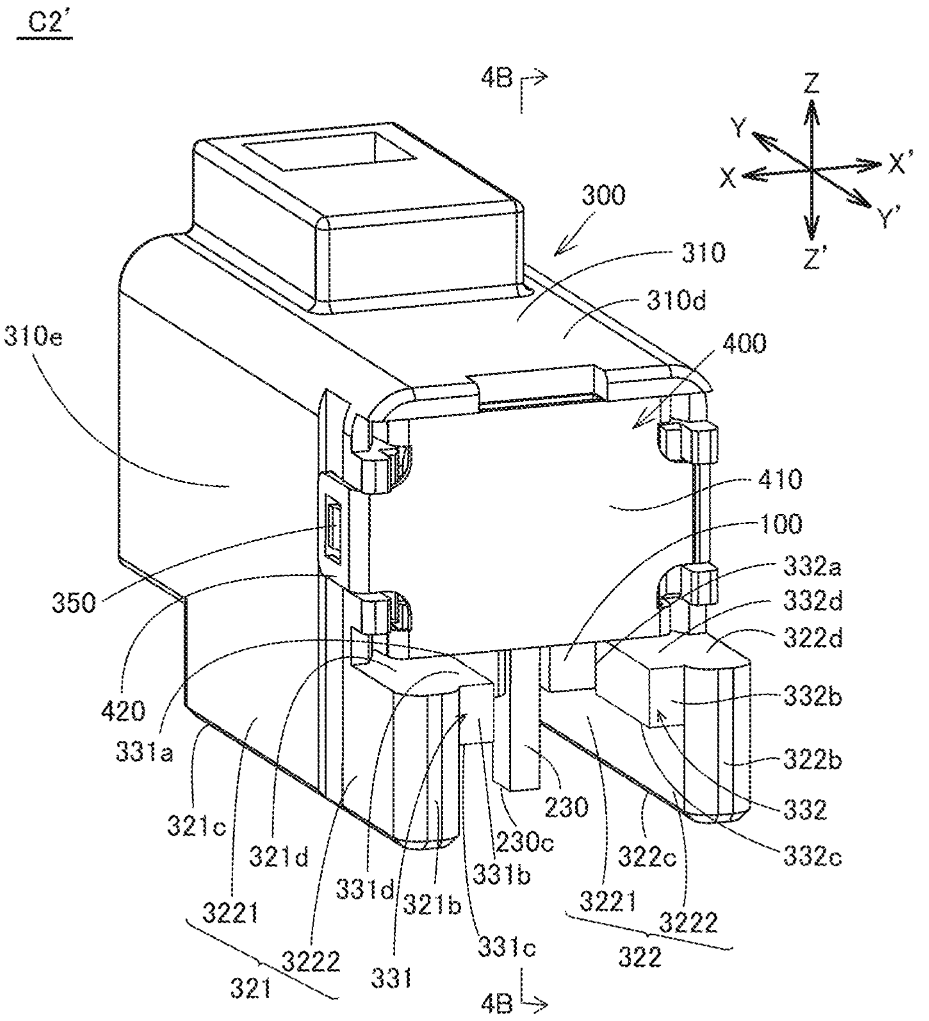
FIG. 4A is a rear, top, right side perspective view of the connector according to a fourth embodiment of the invention.
Figure 4B:
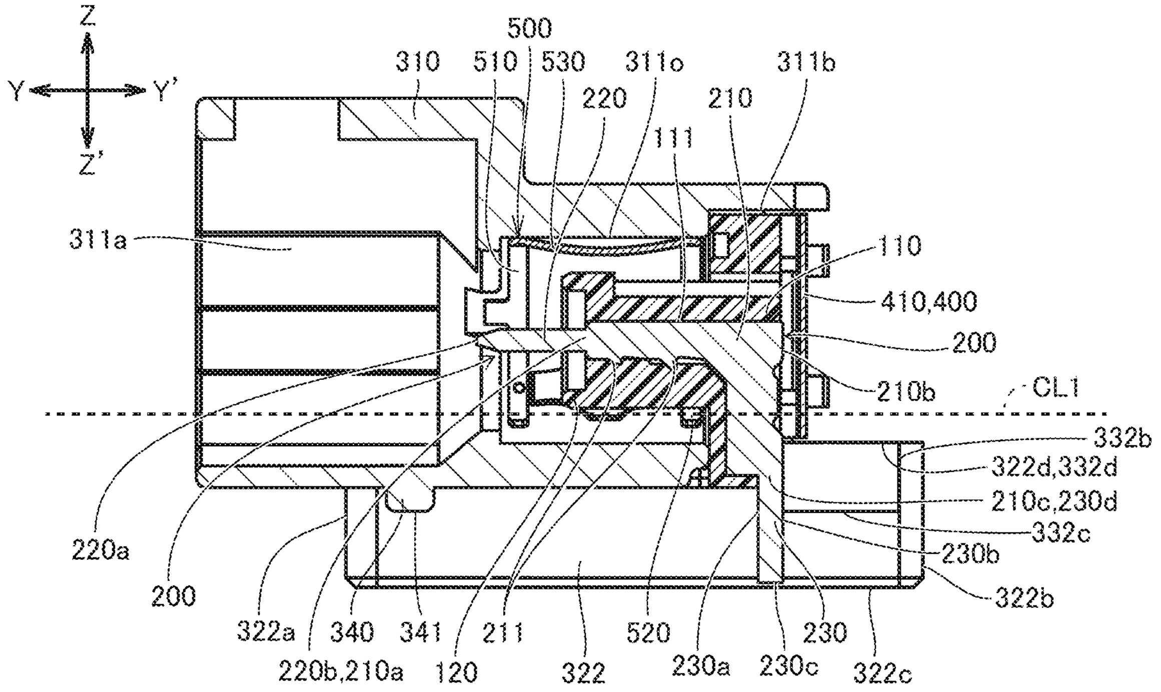
FIG. 4B is a cross-sectional view of a connector according to the fourth embodiment, taken along line 4B-4B in FIG. 4A.
Figure 4C:
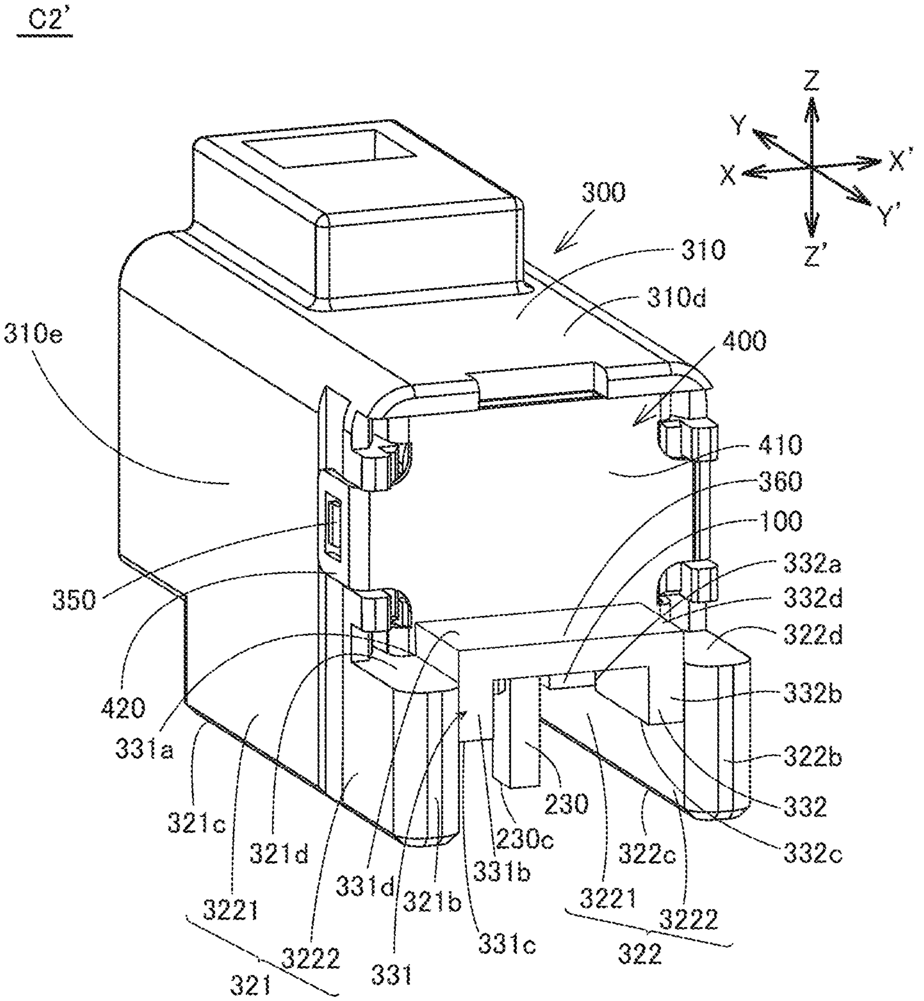
FIG. 4C is a rear, top, right side perspective view of a first variant of the connector according to the fourth embodiment.

Connector C2' According to a Plurality of Embodiments Including Fourth Embodiment and its Modification Examples A connector C2' according to a plurality of embodiments, including a fourth embodiment of the invention and its modification examples, will be hereinafter described with reference to FIGS. 4A and 4B. FIGS. 4A and 4B illustrate the connector C2' of the fourth embodiment. FIG. 4C illustrates a first variant of the connector C2' of the fourth embodiment. Similarly to FIG. 1A, FIGS. 4A and 4C show the Y-Y', Z-Z', and X-X' directions. Similarly to FIG. 3B, FIG. 4B shows the Y-Y' and Z-Z' directions.

The connector C2' has the same configuration as the connector C2, except that the shell 300 further includes a first wall 331 and a second wall 332. The connector C2' will be hereinafter described focusing on the differences from the connector C2 and omitting overlapping descriptions. Except the first wall 331 and the second wall 332 of the connector C2', components of the connector C2' will be referred to using the same reference numerals as those of the corresponding components of the connector C2.

The first wall 331 and the second wall 332 of the connector C2' have substantially the same configurations as the first wall 331 and the second wall 332 of the connector C1' except for the following difference. The first wall 331 and the second wall 332 of the connector C2' will be hereinafter described focusing on the differences from the first wall 331 and the second wall 332 of the connector C1' and omitting overlapping descriptions. Components of the first wall 331 and the second wall 332 of the connector C2' will be referred to using the same reference numerals as those of the corresponding components of the first wall 331 and the second wall 332 of the connector C1'.

Differences: Where the bottom face 310*c* of the shell body 310 is provided with the one or more protrusions 340 (see FIG. 4B), the third end 331*c* of the first wall 331 and the third end 332*c* of the second wall 332 are each substantially coincident in the Z-Z' direction with the distal end 340*c* of the or each protrusion 340. Where the bottom face 310*c* of the shell body 310 is not provided with the one or more protrusions 340 (not illustrated), the third end 331*c* of the first wall 331 and the third end 332*c* of the second wall 332 are each substantially coincident in the Z-Z' direction with the bottom face 310*c* of the shell body 310.

The shell 300 may further include a second coupling portion 360 (see FIG. 4C) located on the Z-direction side relative to the mounting portion 230 of the terminal 200 or relative to the mounting portions 230 of the plurality of terminals 200 so as to couple the first wall 331 and the second wall 332. The second coupling portion 360 can be omitted.

The connector C2' may or may not include the shield cover 400 and/or the ground terminal 500.

The connector C2' as described above provides the following technical features and effects.

The connector C2' provides substantially the same technical features and effects as the first technical features and effects of the connector C2. Moreover, the first wall 331 and the second wall 332 of the shell 300 of the connector C2' extend in the Y' direction from the shell body 310, and are disposed on the X- and X'-direction sides relative to the mounting portion 230 of the terminal 200 or the mounting portions 230 of the plurality of terminals 200. Where the first wall 331 and the second wall 332 are grounded in use, the connector C2' has improved grounding strength, resulting in that the connector C2' provides improved EMI characteristics.

The connector C2' provides substantially the same technical features and effects as the second and third technical features and effects of the connector C2.

Connector C3 According to a Plurality of Embodiments Including Fifth Embodiment and its Modification Examples A connector C3 according to a plurality of embodiments, including a fifth embodiment of the invention and its modification examples, will be hereinafter described with reference to FIGS. 5A to 5E. FIGS. 5A to 5E illustrate the connector C3 of the fifth embodiment. Similarly to FIGS. 1A to 1E, FIGS. 5A to 5E show the Y-Y' and Z-Z' directions. Similarly to FIGS. 1A, 1B, 1C, 1D, and 1E, FIGS. 5A, 5B, 5C, 5D, and 5E show X-X' direction.

The connector C3 has the same configuration as the connector C1, except that the dimensions in the Y-Y' direction of the first leg 321 and the second leg 322 of the shell

300 are smaller than those of the first leg 321 and the second leg 322 of the connector C1, respectively, and that the shell 300 further includes a third leg 323 and a fourth leg 324. The connector C3 will be hereinafter described focusing on the differences from the connector C1 and omitting overlapping descriptions. Except the third leg 323 and the fourth leg 324, components of the connector C3 will be referred to using the same reference numerals as those of the corresponding components of the connector C1.

The first end 321*a* of the first leg 321 and the first end 322*a* of the second leg 322 are each located on the Y-direction side relative to the first end 220*a* of the distal portion 220 of the or each terminal 200. The second end 321*b* of the first leg 321 and the second end 322*b* of the second leg 322 are each located between the second end 220*b* of the distal portion 220 of the or each terminal 200 and the end on the Y'-direction side of the first portion of the main body 210 of the or each terminal 200 in the Y-Y' direction. In other words, the first leg 321 is disposed on the X-direction side relative to the distal portion 220 and a portion on the Y-direction side of the first portion of the main body 210 of the terminal 200, or alternatively relative to the distal portions 220 and portions on the Y'-direction side of the first portions of the main bodies 210 of the plurality of terminals 200. The second leg 322 is disposed on the X'-direction side relative to the distal portion 220 and the portion on the Y-direction side of the first portion of the main body 210 of the terminal 200, or alternatively relative to the distal portions 220 and the portions on the Y-direction side of the first portions of the main bodies 210 of the plurality of terminals 200.

The third leg 323 is a ridge elongated in the Y-Y' direction, extends in the Z' direction from the bottom face 310*c* of the shell body 310. The third leg 323 is spaced from, and located on the Y'-direction side relative to, the first leg 321, and disposed on the X-direction side relative to the mounting portion 230 of the terminal 200 or relative to the mounting portions 230 of the plurality of terminals 200. The fourth leg 324 is a ridge elongated in the Y-Y' direction, extends in the Z' direction from the bottom face 310*c* of the shell body 310. The fourth leg 324 is spaced from, and located on the Y'-direction side relative to, the second leg 322, and disposed on the X'-direction side relative to the mounting portion 230 of the terminal 200 or relative to the mounting portions 230 of the plurality of terminals 200.

The third leg 323 includes a side face on the X-direction side, which may be flush with the first side face 310*e* of the shell body 310 or alternatively located on the X- or X'-direction side relative to the first side face 310*e* of the shell body 310. The fourth leg 324 includes a side face on the X'-direction side, which may be flush with the second side face 310*f* of the shell body 310 or alternatively located on the X'- or X-direction side relative to the second side face 310*f* of the shell body 310.

The third leg 323 and the fourth leg 324 may be integrated with the shell body 310 (see FIGS. 5A to 5E), or alternatively provided separately from, and fixed to, the shell body 310 (not illustrated).

The third leg 323 and the fourth leg 324 may be, but is not required to be, positioned substantially symmetrically to each other in the X-X' direction across the first imaginary line CL1 or the second imaginary line that serves as an axis of line symmetry (see FIGS. 5A to 5E). The third leg 323 and the fourth leg 324 may be, but is not required to be, shaped substantially symmetrically to each other in the X-X' direction across the first imaginary line CL1 or the second imaginary line that serves as an axis of line symmetry (see FIGS. 5A to 5E).

The third leg 323 is larger in dimension in the Y-Y' direction than in the X-X' direction. The fourth leg 324 is larger in dimension in the Y-Y' direction than in the X-X' direction. The third leg 323 and the fourth leg 324 may have substantially the same dimension in the Y-Y' direction (see FIGS. 5A to 5E), but may have different dimensions in the Y-Y' direction (not illustrated). The third leg 323 and the fourth leg 324 may have substantially the same dimension in the X-X' direction (see FIGS. 5A to 5E), but may have different dimensions in the X-X' direction (not illustrated).

The third leg 323 includes a first end 323*a* on the Y-direction side, a second end 323*b* on the Y'-direction side, a third end 323*c* on the Z'-direction side, and a fourth end 323*d* on the Z-direction side. The fourth leg 324 includes a first end 324*a* on the Y-direction side, a second end 324*b* on the Y'-direction side, a third end 324*c* on the Z'-direction side, and a fourth end 324*d* on the Z-direction side.

The first end 323*a* of the third leg 323 and the first end 324*a* of the fourth leg 324 may be each substantially coincident in the Y-Y' direction with the first end 230*a* of the mounting portion 230 of the or each terminal 200 (not illustrated), or alternatively located on the Y-direction side relative to the first end 230*a* of the mounting portion 230 of the or each terminal 200 (see FIGS. 5A to 5E).

The second end 323*b* of the third leg 323 and the second end 324*b* of the fourth leg 324 may be each substantially coincident in the Y-Y' direction with the second end 230*b* of the mounting portion 230 of the or each terminal 200 (not illustrated), or alternatively located on the Y'-direction side relative to the second end 230*b* of the mounting portion 230 of the or each terminal 200 (see FIGS. 5A to 5E).

The third end 323*c* of the third leg 323 and the third end 324*c* of the fourth leg 324 are each substantially coincident in the Z-Z' direction with the third end 230*c* of the mounting portion 230 of the or each terminal 200. The fourth end 323*d* of the third leg 323 and the fourth end 324*d* of the fourth leg 324 may be each substantially coincident in the Z-Z' direction with the fourth end 230*d* of the mounting portion 230 of the or each terminal 200, or alternatively located on the Z-direction side relative to the fourth end 230*d* of the mounting portion 230 of the or each terminal 200.

Similarly to the shell 300 of the connector C1, the bottom face 310*c* of the shell body 310 of the shell 300 of the connector C3 may or may not be provided with the one or more protrusions 340. Where the one or more protrusions 340 are not provided, the third end 230*c* of the mounting portion 230 of the or each terminal 200, the third end 323*c* of the third leg 323, and the third end 324*c* of the fourth leg 324 are each substantially coincident in the Z-Z' direction with the bottom face 310*c* of the shell body 310.

The connector C3 may or may not include the shield cover 400 and/or the ground terminal 500.

The connector C3 as described above provides the following technical features and effects.

First technical features and effects: The connector C3 C1 has improved EMI characteristics for the following reasons. The first leg 321 and the second leg 322 of the shell 300 of the connector C3 are ridges elongated in the Y-Y' direction and are located on the X- and X'-direction sides relative to the distal portion 220 and the portion on the Y-direction side of the first portion of the main body 210 of the terminal 200, or alternatively relative to the distal portions 220 and the portions on the Y-direction side of the first portions of the main bodies 210 of the plurality of terminals 200. Therefore, the first leg 321 and the second leg 322 of the shell 300 of the connector C3 are each at a relatively short distance to the distal portion 220 and the portion on the Y-direction side of the first portion of the main body 210 of the terminal 200, or alternatively to the distal portions 220 and the portions on the Y-direction side of the first portions of the main bodies 210 of the plurality of terminals 200. Also, the third leg 323 and the fourth leg 324 of the shell 300 of the connector C3 are ridges elongated in the Y-Y' direction and are located on the X- and X'-direction sides relative to the mounting portion 230 of the terminal 200 or relative to the mounting portions 230 of the plurality of terminals 200. Therefore, the third leg 323 and the fourth leg 324 of the shell 300 of the connector C3 are each at a relatively short distance to the mounting portion 230 of the terminal 200 or the mounting portion(s) 230 of the plurality of terminals 200. Moreover, being ridges elongated in the Y-Y' direction, the first leg 321, the second leg 322, the third leg 323, and the fourth leg 324 each have a larger cross-sectional area in cross section along the Y-Y' and Z-Z' directions than the cross-sectional area in the corresponding cross section of each of the front and rear legs of the conventional connector. With the first leg 321, the second leg 322, the third leg 323, and the fourth leg 324 grounded (in a manner described below) in use, the connector C3 has improved grounding strength. For this reason, in use, even if high-speed signals transmitted through the at least one terminal 200 are reflected on the at least one terminal 200 to cause generation of noise to be radiated to the shell body 310 of the shell 300, the noise will easily flow to the ground, through at least one of the first leg 321, the second leg 322, the third leg 323, and the fourth leg 324 of the connector C3. This suppresses the possibility that the noise radiated to the shell body 310 of the shell 300 is re-radiated from an edge portion or portions of the shell body 310.

Second technical features and effects: The connector C3 has improved EMC characteristics for the following reason. Being ridges elongated in the Y-Y' direction, the first leg 321, the second leg 322, the third leg 323, and the fourth leg 324 of the connector C3 each have a larger cross-sectional area in cross section along the Y-Y' and Z-Z' directions. This reduces impedances of the first leg 321, the second leg 322, the third leg 323, and the fourth leg 324, strengthening the grounding of the connector C3. The connector C3 thus has improved EMC characteristics.

Third technical features and effects: The connector C3 provides substantially the same technical features and effects as the third technical features and effects of the connector C1.

Figure 5A:
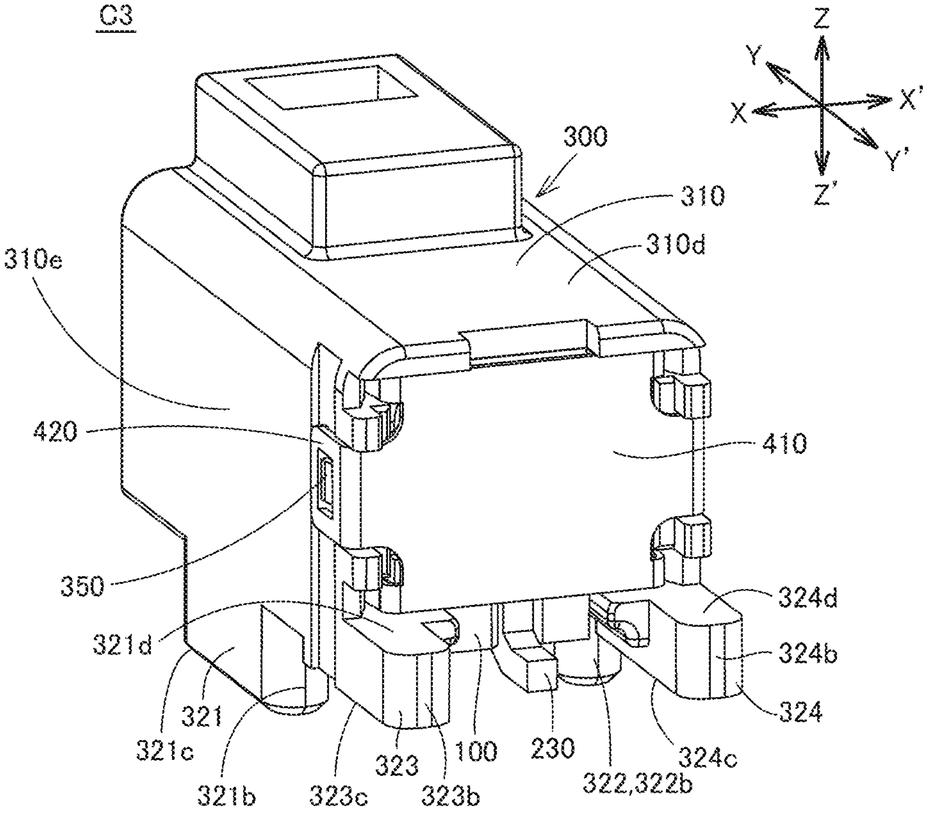
FIG. 5A is a rear, top, right side perspective view of a connector according to a fifth embodiment of the invention.
Figure 5B:
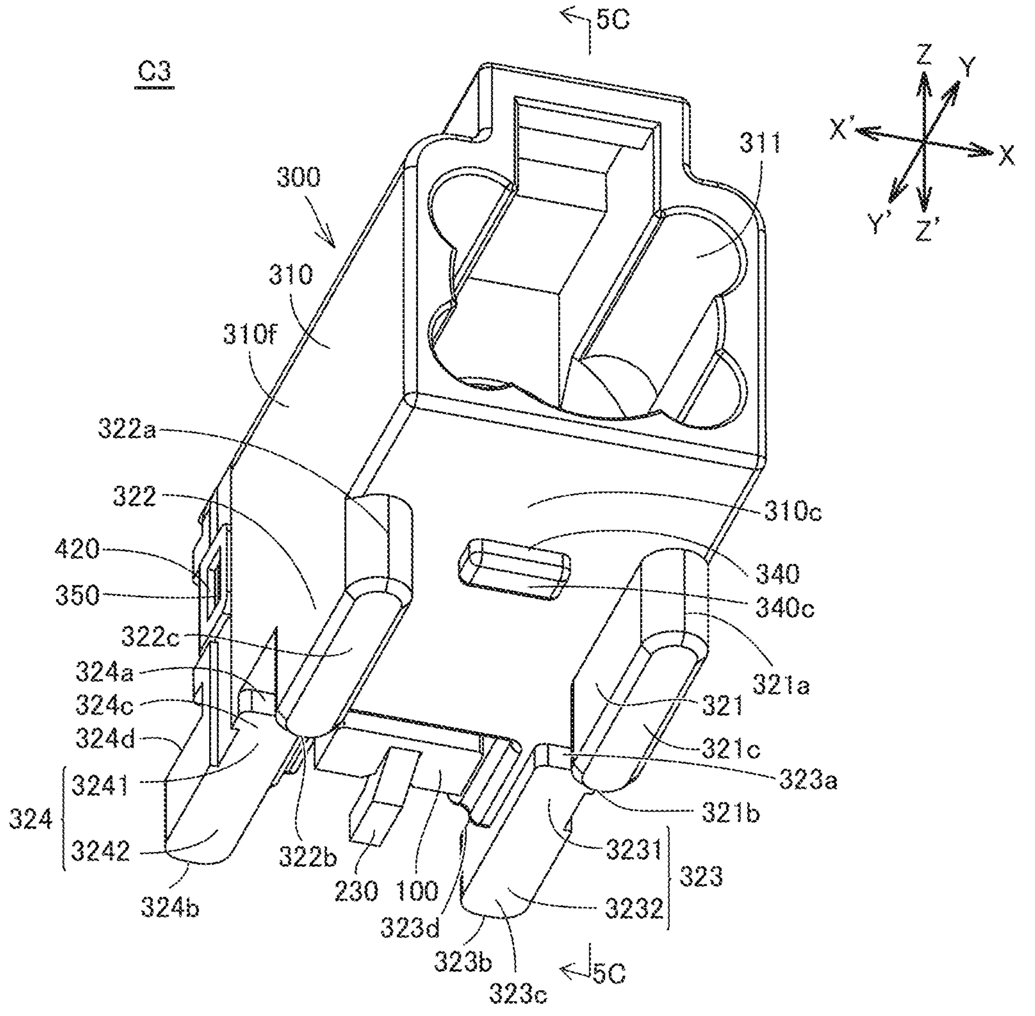
FIG. 5B is a front, bottom, left side perspective view illustrating the connector according to the fifth embodiment.
Figure 5C:
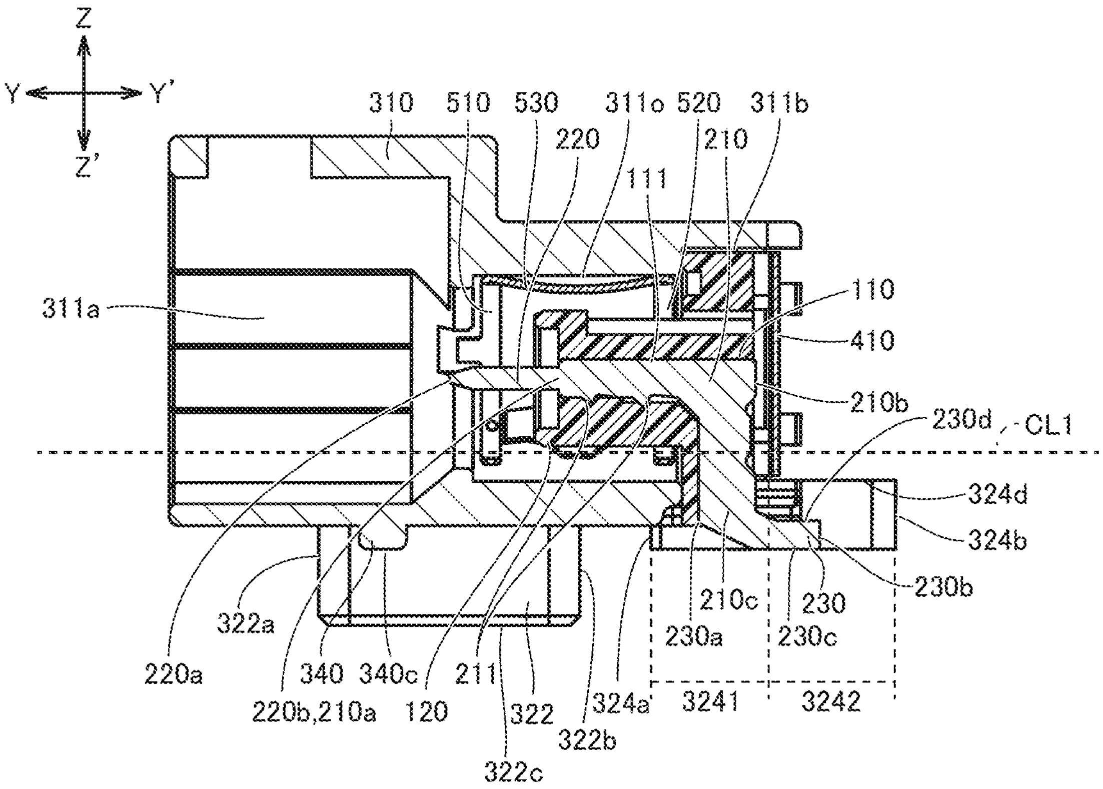
FIG. 5C is a cross-sectional view of the connector of the fifth embodiment, taken along line 5C-5C in FIG. 5B.
Figure 5D:
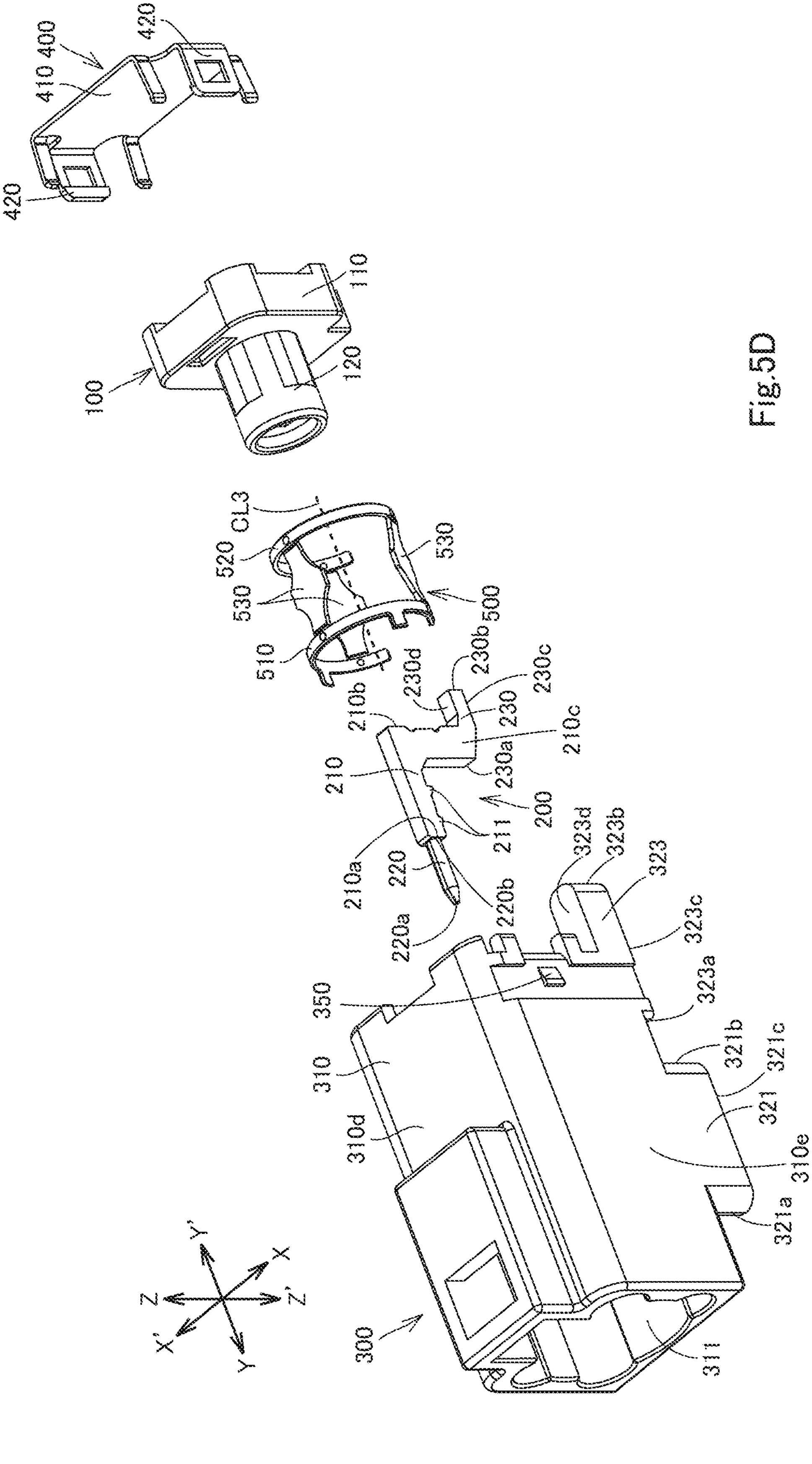
FIG. 5D is an exploded, front, top, right side perspective view of the connector according to the fifth embodiment.
Figure 5E:
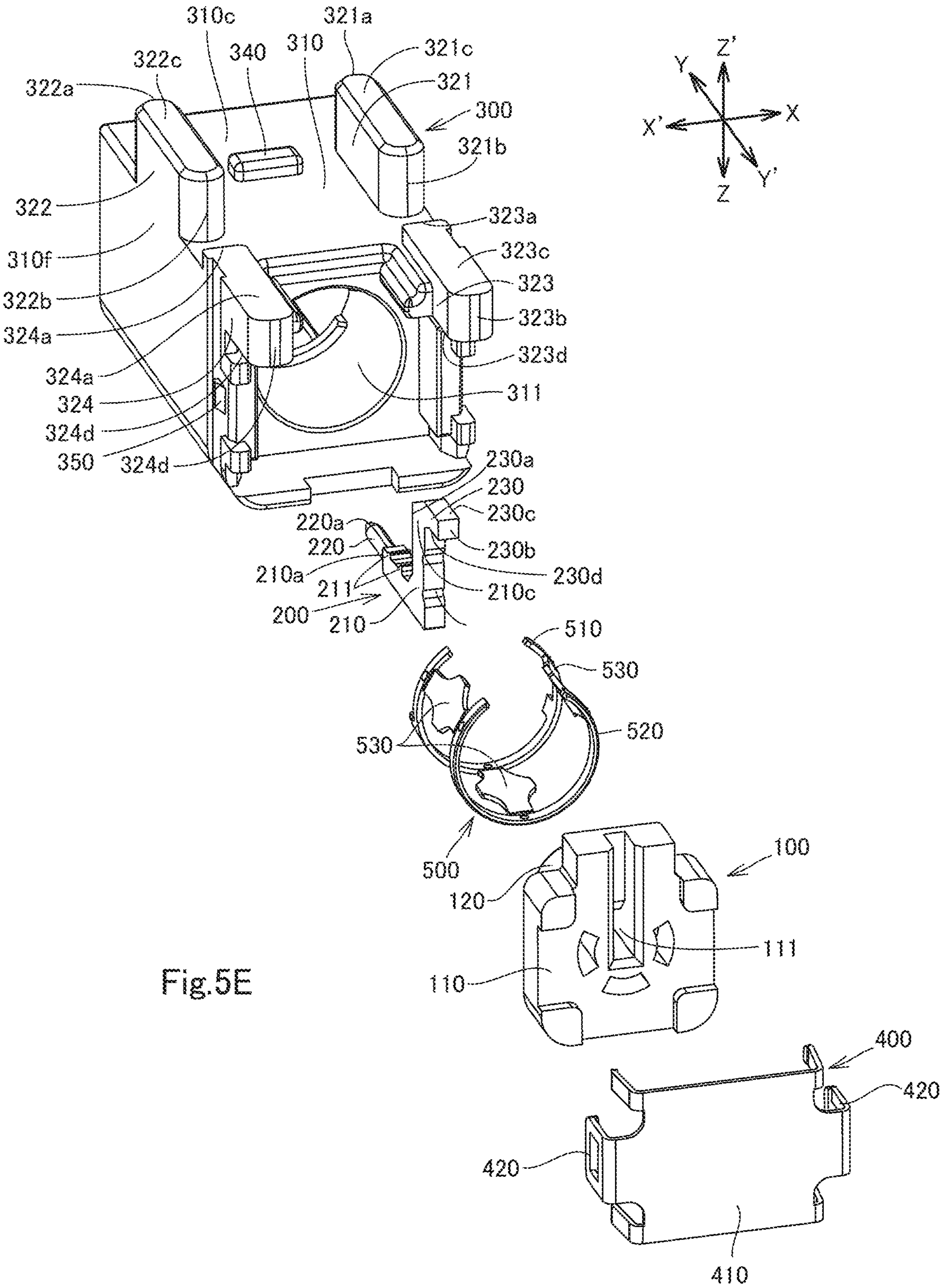
FIG. 5E is an exploded, rear, bottom, left side perspective view of the connector of the fifth embodiment.
Figure 6A:
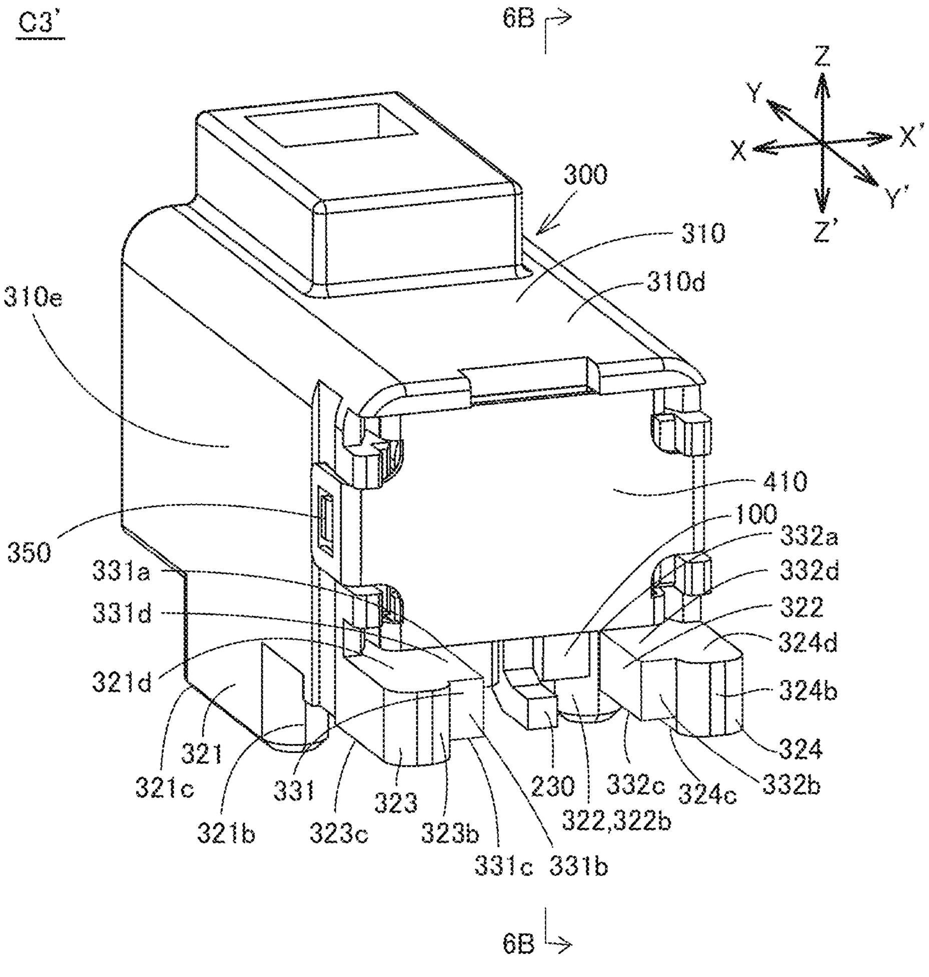
FIG. 6A is a rear, top, right side perspective view of a connector according to a sixth embodiment of the invention.
Figure 6B:
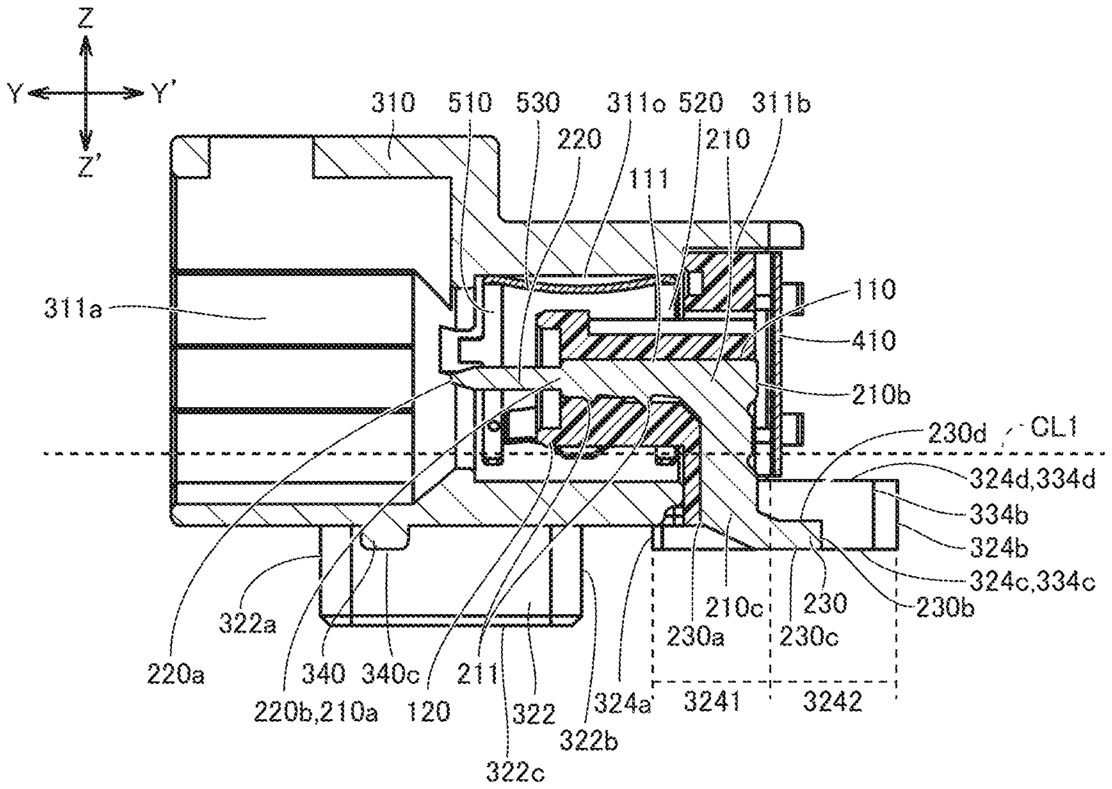
FIG. 6B is a cross-sectional view of the connector of the sixth embodiment, taken along line 6B-6B in FIG. 6A.
Figure 6C:
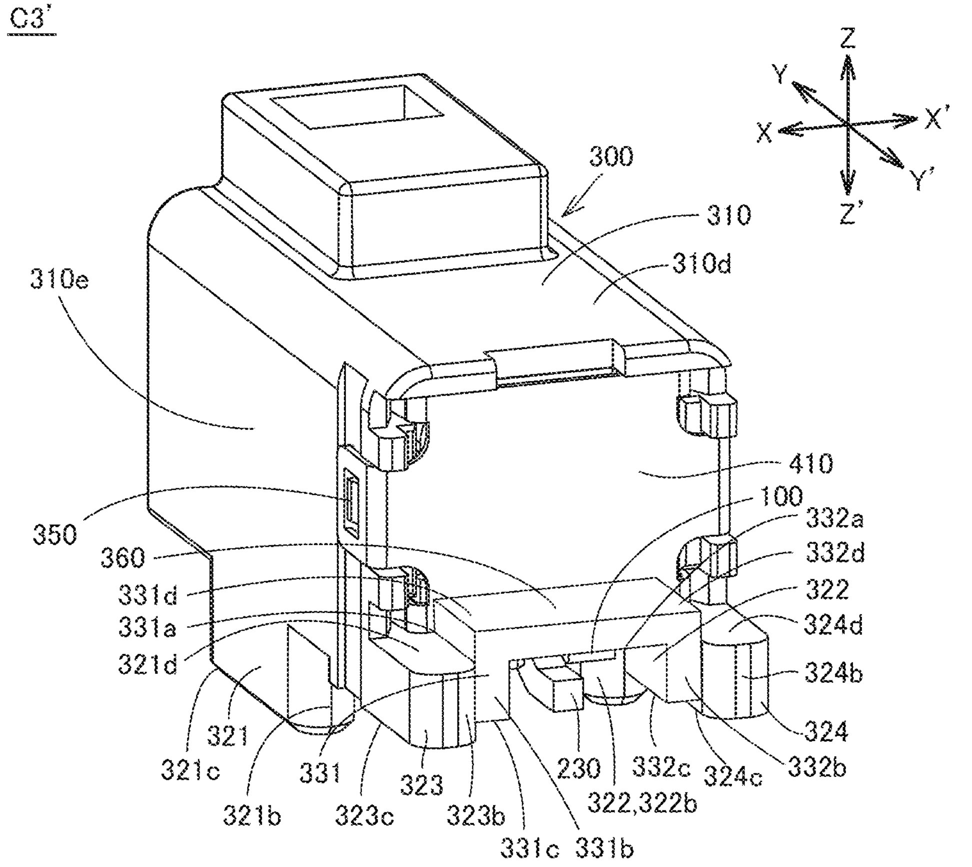
FIG. 6C is a rear, top, right side perspective view of a first variant of the connector according to the sixth embodiment.

Connector C3' According to a Plurality of Embodiments Including Sixth Embodiment and its Modification Examples A connector C3' according to a plurality of embodiments, including a sixth embodiment of the invention and its modification examples, will be hereinafter described with reference to FIGS. 6A to 6C. FIGS. 6A and 6B illustrate the connector C3' of the sixth embodiment. FIG. 6C illustrates a first variant of the connector C3' of the sixth embodiment. Similarly to FIG. 5A, FIGS. 6A and 6C show the Y-Y', Z-Z', and X-X' directions. Similarly to FIG. 5B, FIG. 6B shows the Y-Y' and Z-Z' directions.

The connector C3' has the same configuration as the connector C3, except that the shell 300 further includes a first wall 331 and a second wall 332. The connector C3' will be hereinafter described focusing on the differences from the connector C3 and omitting overlapping descriptions. Except the first wall 331 and the second wall 332 of the connector C3', components of the connector C3' will be referred to using the same reference numerals as those of the corresponding components of the connector C3.

The first wall 331 extends from the shell body 310 in the Y' direction and is disposed between the mounting portion 230 of the terminal 200, or alternatively the mounting portions 230 of the plurality of terminals 200, and the third leg 323 in the X-X' direction. The first wall 331 is spaced from, and located on the X-direction side relative to, the mounting portion 230 of the terminal 200 or the mounting portions 230 of the plurality of terminals 200. The first wall 331 may be integrated with the third leg 323 (see FIG. 6A), or alternatively disposed with a gap from the third leg 323 in the X-X' direction (not illustrated).

The second wall 332 extends from the shell body 310 in the Y' direction and is disposed between the mounting portion 230 of the terminal 200 or the mounting portions 230 of the plurality of terminals 200, and the fourth leg 324 in the X-X' direction. The second wall 332 is paced from, and located on the X'-direction side relative to, the mounting portion 230 of the terminal 200, or alternatively the mounting portions 230 of the plurality of terminals 200. The second wall 332 may be integrated with the fourth leg 324 (see FIG. 6A) or alternatively be disposed with a gap from the fourth leg 324 in the X-X' direction (not illustrated).

The first wall 331 includes a first end 331*a* on the Y-direction side, a second end 331*b* on the Y'-direction side, a third end 331*c* on the Z'-direction side, and a fourth end 331*d* on the Z-direction side. The second wall 332 includes a first end 332*a* on the Y-direction side, a second end 332*b* on the Y'-direction side, a third end 332*c* on the Z'-direction side, and a fourth end 332*d* on the Z-direction side.

The first end 331*a* of the first wall 331 and the first end 332*a* of the second wall 332 are each contiguous with the shell body 310. The second end 331*b* of the first wall 331 and the second end 332*b* of the second wall 332 may be each substantially coincident in the Y-Y' direction with the second end 230*b* of the mounting portion 230 of the or each terminal 200 (not illustrated), or alternatively located on the Y'-direction side relative to the second end 230*b* of the mounting portion 230 of the or each terminal 200 (see FIGS. 6A and 6B).

The third end 331*c* of the first wall 331 and the third end 332*c* of the second wall 332 are each substantially coincident in the Z-Z' direction with the third end 230*c* of the mounting portion 230 of the or each terminal 200 (see 6A and 6B). The fourth end 331*d* of the first wall 331 and the fourth end 332*d* of the second wall 332 may be each substantially coincident in the Z-Z' direction with the fourth end 230*d* of the mounting portion 230 of the or each terminal 200 (not illustrated), or alternatively may be each located on the Z-direction side relative to the fourth end 230*d* of the mounting portion 230 of the or each terminal 200 (see FIGS. 6A and 6B). In the latter case, the first wall 331 and the second wall 332 may extend in the Z direction such that the fourth end 331*d* of the first wall 331 and the fourth end 332*d* of the second wall 332 are substantially coincident in the Z-Z' direction with, or alternatively on the Z-direction side relative to, the fourth end 323*d* of the third leg 323 and the fourth end 324*d* of the fourth leg 324, respectively. The first wall 331 and the second wall 332 may extend in the Z direction such that the fourth end 331*d* of the first wall 331 and the fourth end 332*d* of the second wall 332 are each substantially coincident with the top face 310*d* of the shell body 310 in the Z-Z' direction.

The shell 300 may further include a second coupling portion 360 (see FIG. 6C) located on the Z-direction side relative to the mounting portion 230 of the terminal 200 or relative to the mounting portions 230 of the plurality of terminals 200 so as to couple the first wall 331 and the second wall 332. The second coupling portion 360 can be omitted.

Where the wall on the X-direction side and the wall on the X'-direction side of the internal space 311 of the shell body 310 are located on the X-direction side and the X'-direction side, respectively, relative to the mounting portion 230 of the terminal 200, or alternatively relative to the mounting portions 230 of the plurality of terminals 200, the first wall 331 may not extend in the Y' direction from the shell body 310, but may be part of the wall on the X-direction side of the internal space 311 of the shell body 310. Likewise, the second wall 332 may not extend in the Y' direction from the shell body 310, but may be part of the wall on the X'-direction side of the internal space 311 of the shell body 310.

Similarly to the shell 300 of the connector C1, the bottom face 310*c* of the shell body 310 of the shell 300 of the connector C3' may or may not be provided with one or more protrusions 340.

The connector C3' may or may not include the shield cover 400 and/or the ground terminal 500.

The connector C3' as described above provides the following technical features and effects.

The connector C3' provides substantially the same technical features and effects as the first technical features and effects of the connector C3. Moreover, the first wall 331 and the second wall 332 of the shell 300 of the connector C3' extend in the Y' direction from the shell body 310, and are disposed on the X- and X'-direction sides relative to the mounting portion 230 of the terminal 200, or alternatively relative to the mounting portions 230 of the plurality of terminals 200. Where the first wall 331 and the second wall 332 are grounded in use, the connector C3' has improved grounding strength, resulting in that the connector C3' provides improved EMI characteristics.

The connector C3' provides substantially the same technical features and effects as the second and third technical features and effects of the connector C3.

Connection Structure S1 of Connector C1 and Circuit Board B1 According to a Plurality of Embodiments Including First Embodiment and its Modification Examples A connection structure S1 according to a plurality of embodiments, including the first embodiment of the invention and its modification examples, will be hereinafter described with reference to FIGS. 7A to 8B. FIGS. 7A to 7D illustrate the connection structure S1 of the first embodiment. FIGS. 8A and 8B illustrate a circuit board B1 of the connection structure S1 of the first embodiment.

Figure 7A:
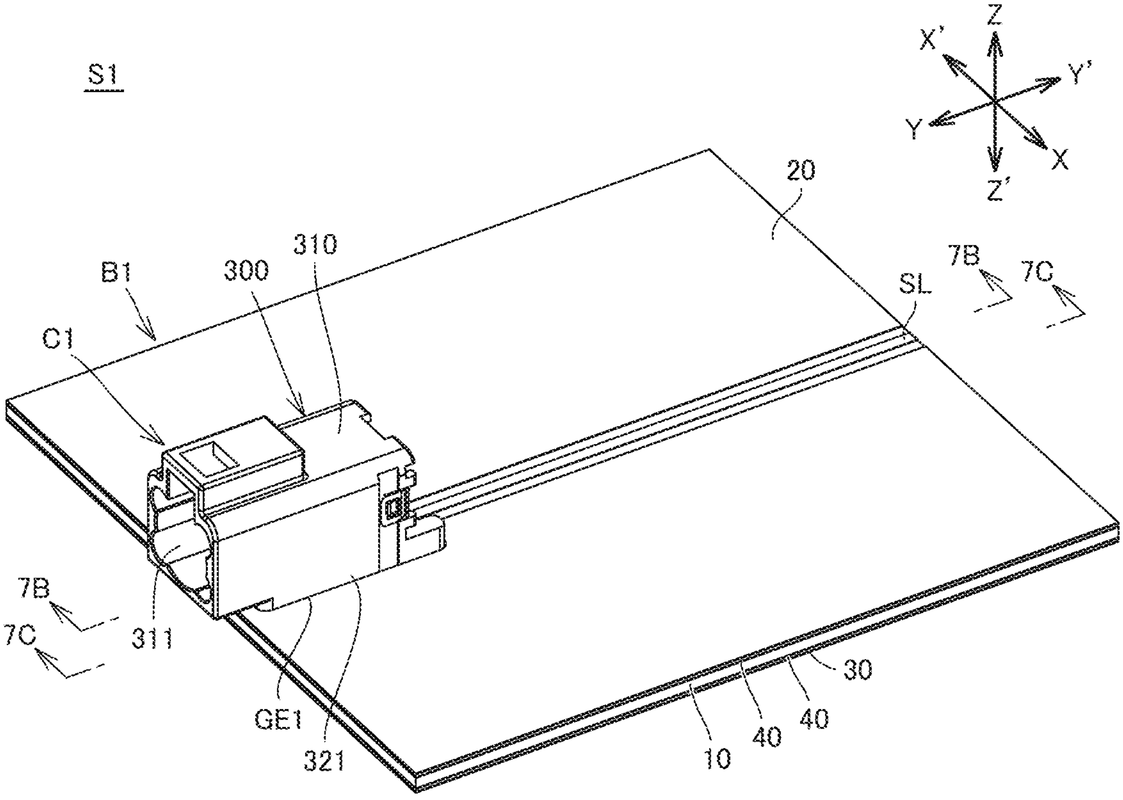
FIG. 7A is a front, top, right side perspective view of a connection structure of a circuit board and the connector according to a first embodiment of the invention.
Figure 7B:
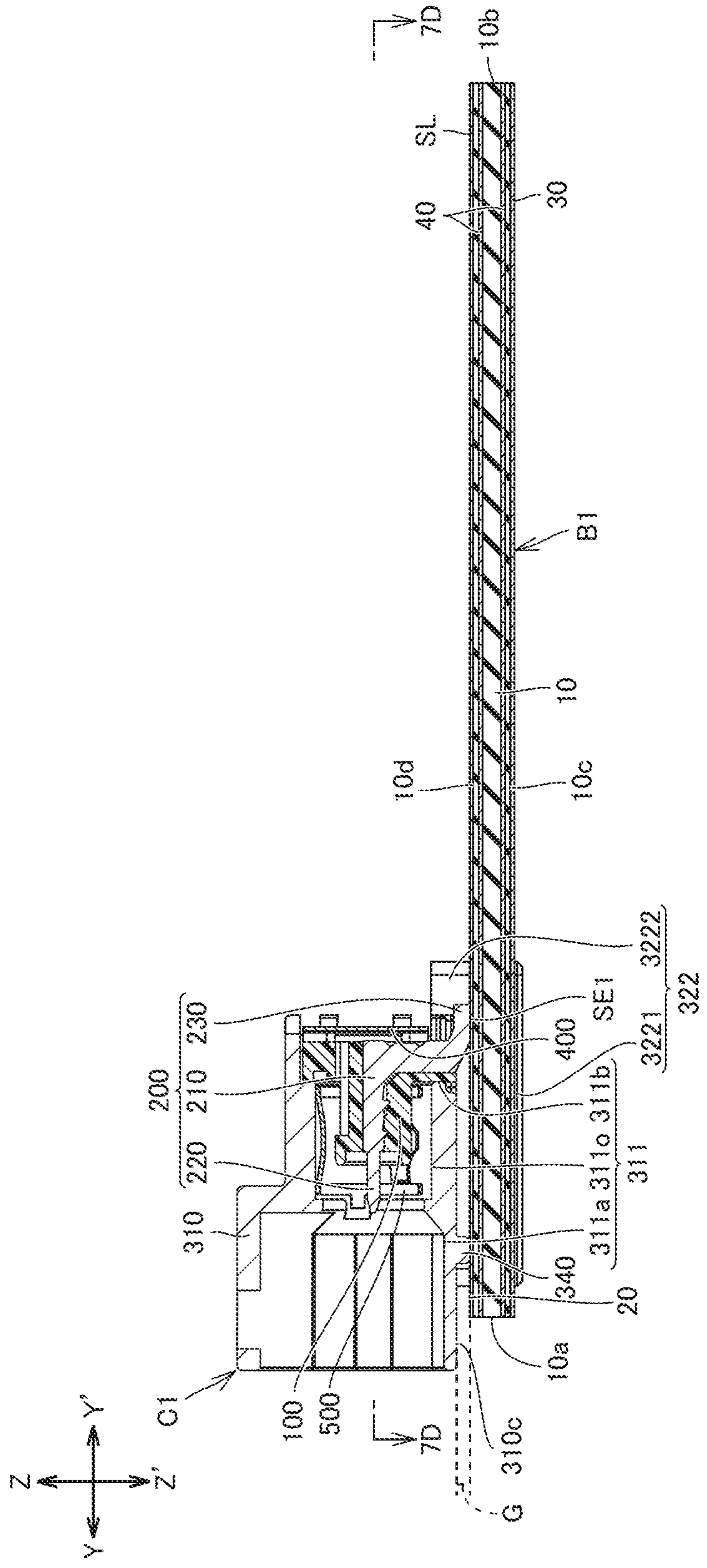
FIG. 7B is a cross-sectional view of the connection structure of the first embodiment, taken along line 7B-7B in FIG. 7A.
Figure 7C:
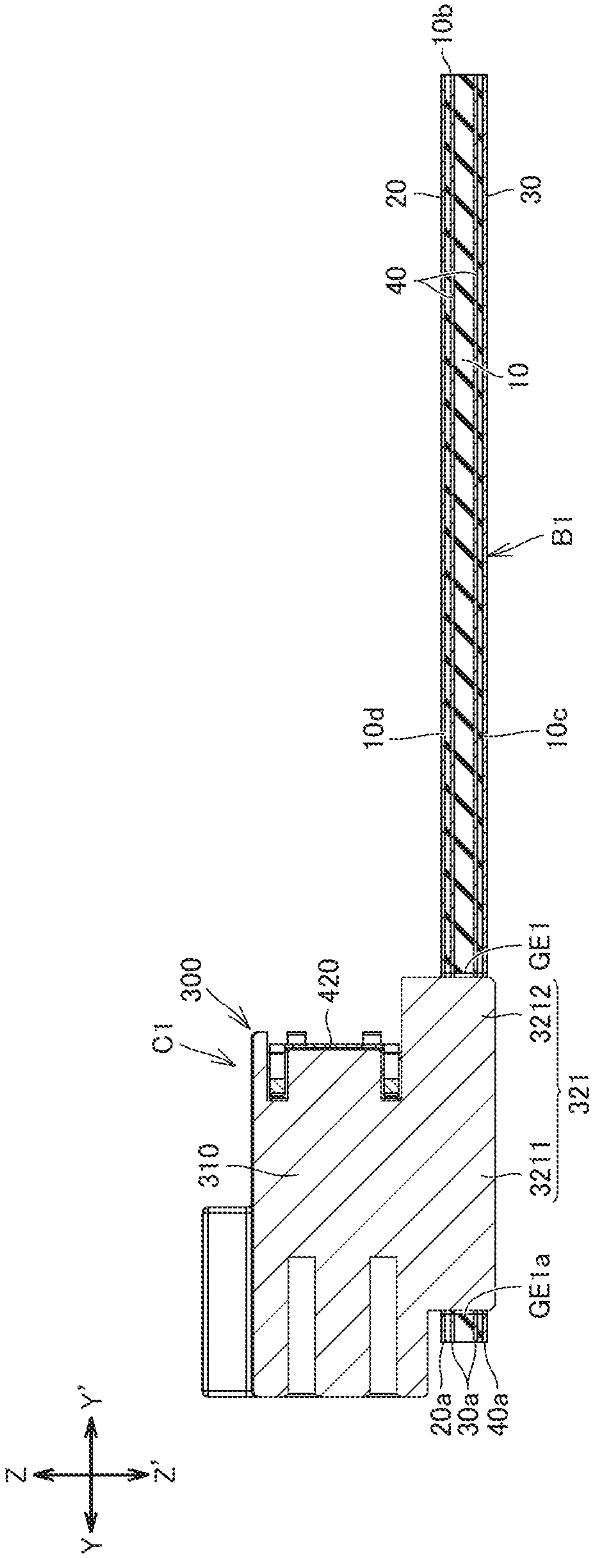
FIG. 7C is a cross-sectional view of the connection structure of the first embodiment, taken along line 7C-7C in FIG. 7A.
Figure 7D:
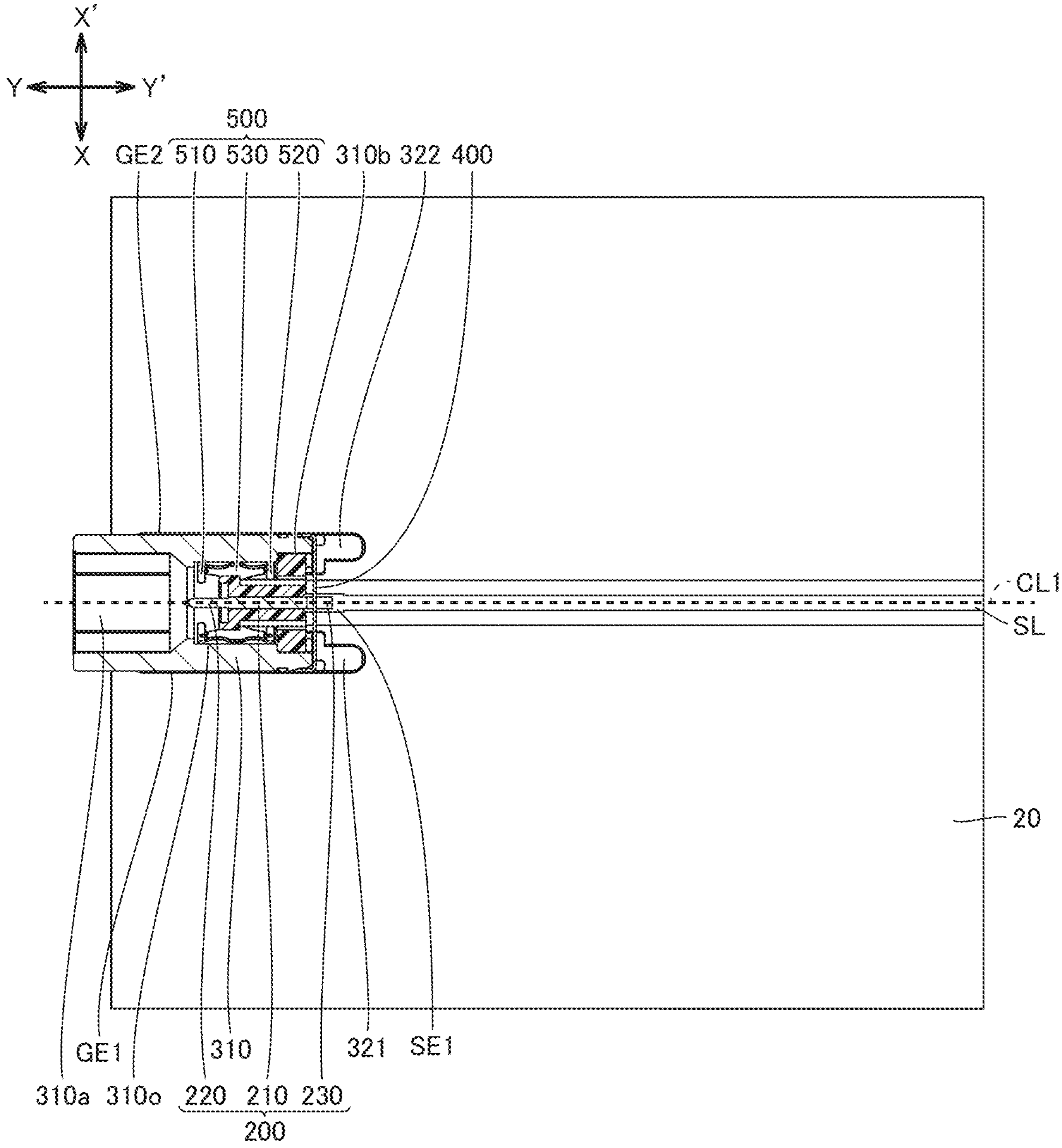
FIG. 7D is a cross-sectional view of the connection structure of the first embodiment, taken along line 7D-7D in FIG. 7B.
Figure 8A:
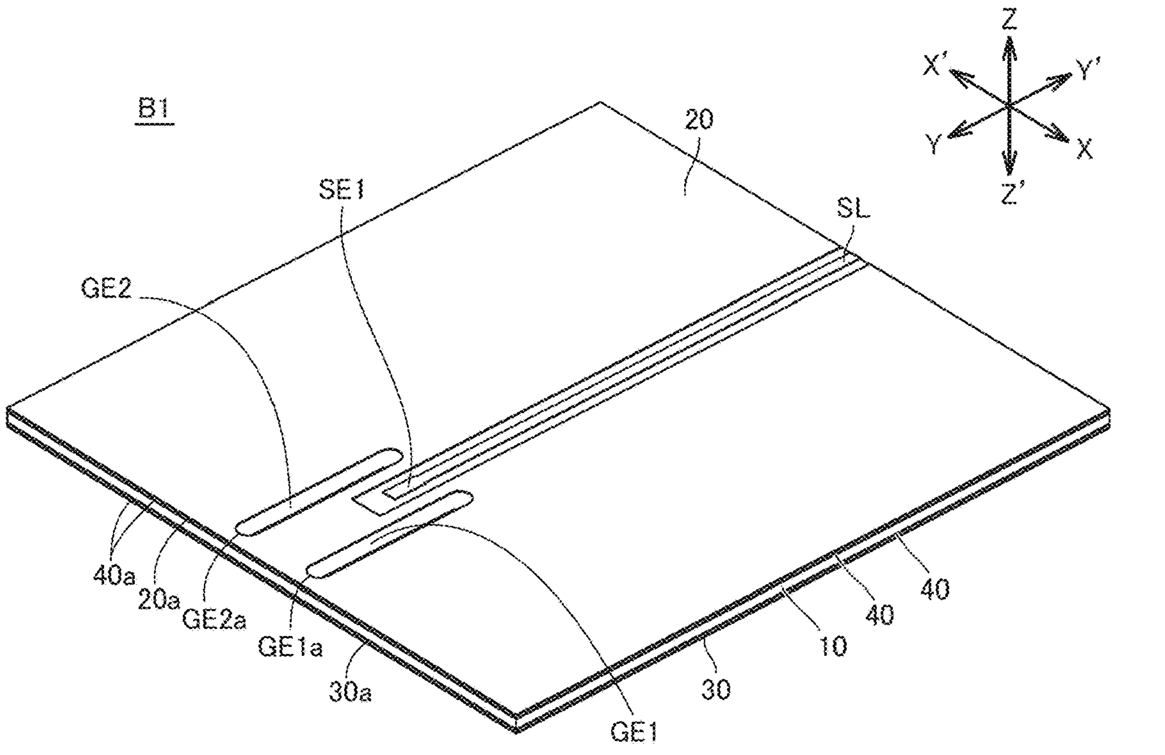
FIG. 8A is a front, top, right side perspective view of the circuit board of the connection structure according to the first embodiment.
Figure 8B:
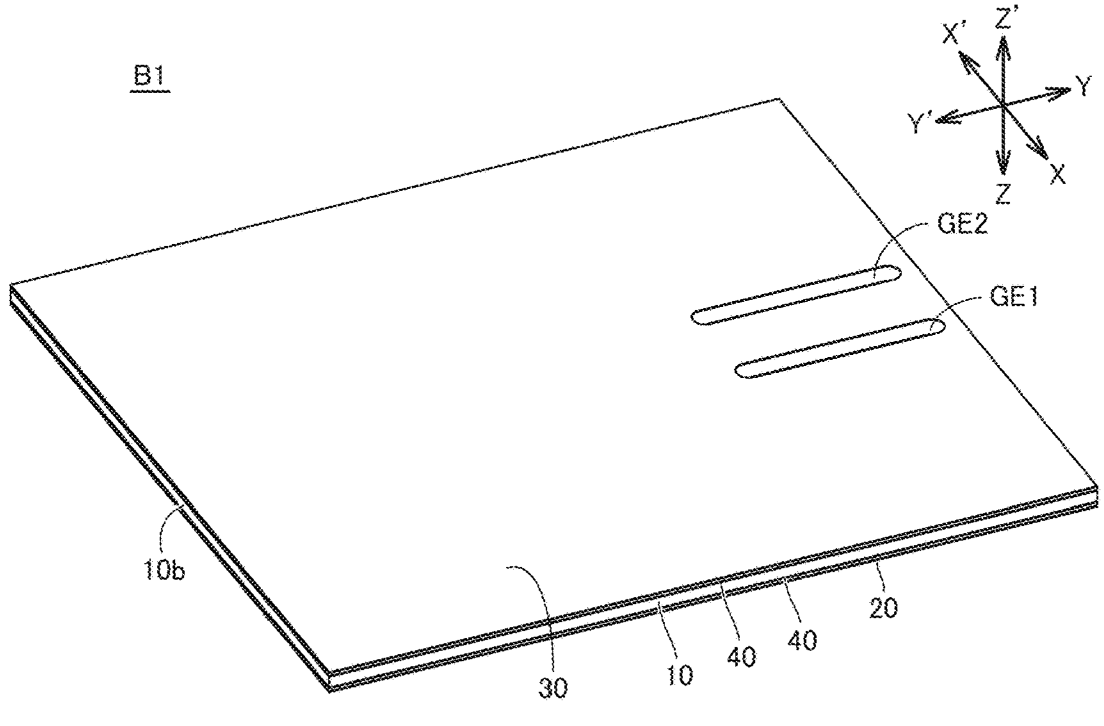
FIG. 8B is a rear, bottom, right side perspective view illustrating the circuit board of the connection structure of the first embodiment.

FIGS. 7A, 8A, and 8B show the Y-Y', Z-Z', and X-X' directions. FIGS. 7B and 7C show the Y-Y' and Z-Z' directions. FIG. 7D shows the Y-Y' and X-X' directions. The Y-Y', Z-Z', and X-X' directions in the connection structure S1 correspond respectively to the Y-Y', Z-Z', and X-X' directions in the description of the connector C1.

The connection structure S1 includes the circuit board B1 and the connector C1 mounted on the circuit board B1.

The circuit board B1 includes a board body 10. The board body 10 is a single-layer or multilayer board. The board body 10 includes a first end 10*a* on the Y-direction side, a second end 10*b* on the Y'-direction side, a back face 10*c* on the Z'-direction side, and a front face 10*d* on the Z-direction side.

The circuit board B1 further includes a first ground electrode GE1 having electrical conductivity, a second ground electrode GE2 having electrical conductivity, at least one signal electrode SE1 having electrical conductivity, and at least one ground layer.

The first ground electrode GE1 and the second ground electrode GE2 are through-hole electrodes elongated in the Y-Y' direction, and extend through the board body 10 in the Z-Z' direction. The first ground electrode GE1 and the second ground electrode GE2 open in both Y and Y' directions. The first ground electrode GE1 and the second ground electrode GE2 are directly connected to the at least one ground layer and have the same potential as the at least one ground layer.

The first ground electrode GE1 and the second ground electrode GE2 have cross sections along the Y-Y' and X-X' directions of shapes, sizes, and positions corresponding to the outer shapes, sizes, and positions of the cross sections along the Y-Y' and X-X' directions of the first leg 321 and the second leg 322, respectively. The distance in the X-X' direction between the first ground electrode GE1 and the second ground electrode GE2 corresponds to the distance in the X-X' direction between the first leg 321 of the connector C1 and the second leg 322 of the connector C1.

The first ground electrode GE1 includes a first end GE1*a* on the Y-direction side, and the second ground electrode GE2 includes a first end GE2*a* on the Y-direction side. The first end GE1*a* of the first ground electrode GE1 and the first end GE2*a* of the second ground electrode GE2 may be coincident in the Y-Y' direction with each other (see FIGS. 8A and 8B), but either one of the first end GE1*a* of the first ground electrode GE1 and the first end GE2*a* of the second ground electrode GE2 may be located closer to the Y-direction side than the other (not illustrated).

The first leg 321 of the connector C1 is received in, and electrically connected to, the first ground electrode GE1. The second leg 322 of the connector C1 is received in, and electrically connected to, the second ground electrode GE2. As a result, the shell 300 of the connector C1 is at the same potential as the at least one ground layer of the circuit board B1.

The at least one signal electrode SE1 is a single electrode or a plurality of electrodes, the number of which corresponds to the number of the at least one terminal 200 of the connector C1. The signal electrode SE1 or the plurality of signal electrodes SE1 is a surface electrode or electrodes provided on a region between the first ground electrode GE1 and the second ground electrode GE2 on the front face 10*d* of the board body 10. The (single) signal electrode SE1 is arranged corresponding to the position of the mounting portion 230 of the terminal 200, or alternatively each of the signal electrodes SE1 is arranged corresponding to the position of the mounting portion 230 of the corresponding terminal 200.

The mounting portion 230 of the terminal 200 of the connector C1 is placed on, and electrically connected to, the signal electrode SE1. Alternatively, each of the mounting portions 230 of the terminals 200 of the connector C1 is placed on, and electrically connected to, a corresponding one of the signal electrodes SE1.

The at least one ground layer includes at least one of a first ground layer 20, a second ground layer 30, or at least one third ground layer 40.

The first ground layer 20 has electrical conductivity and is provided on the front face 10*d* of the board body 10. The first ground layer 20 is not provided in the region between the first ground electrode GE1 and the second ground electrode GE2 on the front face 10*d* of the board body 10. The first ground layer 20 includes a first end 20*a* on the Y-direction side. The first ground layer 20 may extend in the Y direction beyond the first end GE1$a$ of the first ground electrode GE1 and the first end GE2$a$ of the second ground electrode GE2. In this case, the first end 20$a$ of the first ground layer 20 is located on the Y-direction side relative to the first end GE1$a$ of the first ground electrode GE1 and the first end GE2$a$ of the second ground electrode GE2. The first ground layer 20 may extend in the Y direction such that the first end 20$a$ thereof is located at the first end 10$a$ of the board body 10.

The second ground layer 30 has electrical conductivity and is provided on the back face 10$c$ of the board body 10. The second ground layer 30 includes a first end 30$a$ on the Y-direction side. The second ground layer 30 may extend in the Y direction beyond the first end GE1$a$ of the first ground electrode GE1 and the first end GE2$a$ of the second ground electrode GE2. The first end 30$a$ of the second ground layer 30 is located on the Y-direction side relative to the first end GE1$a$ of the first ground electrode GE1 and the first end GE2$a$ of the second ground electrode GE2. The second ground layer 30 may extend in the Y direction such that the first end 30$a$ thereof is located at the first end 10$a$ of the board body 10.

The or each third ground layer 40 has electrical conductivity and is provided inside the board body 10. The or each third ground layer 40 includes a first end 40$a$ on the Y-direction side. The or each third ground layer 40 may extend in the Y direction beyond the first end GE1$a$ of the first ground electrode GE1 and the first end GE2$a$ of the second ground electrode GE2. The first end 40$a$ of the or each third ground layer 40 is located on the Y-direction side relative to the first end GE1$a$ of the first ground electrode GE1 and the first end GE2$a$ of the second ground electrode GE2. The or each third ground layer 40 may extend in the Y direction such that the first end 40$a$ thereof is located at the first end 10$a$ of the board body 10.

Where at least one of the first ground layer 20, the second ground layer 30, and the at least one third ground layer 40 (the at least one ground layer) extends in the Y direction beyond the first end GE1$a$ of the first ground electrode GE1 and the first end GE2$a$ of the second ground electrode GE2, the linear distance in the Y-Y' direction from each of the first end GE1$a$ of the first ground electrode GE1 and the first end GE2$a$ of the second ground electrode GE2 to the first end 10$a$ of the board body 10 may be approximately 1 mm, but may be less than approximately 1 mm. Therefore, the end on the Y-direction side of the or each ground layer (at least one of the first end 20$a$ of the first ground layer 20, the first end 30$a$ of the second ground layer 30, and the first end 40$a$ of the at least one of third ground layer 40) is not required to be substantially coincident in the Y-Y' direction with the first end 10$a$ of the board body 10. Instead, a portion of the or each ground layer that extends beyond the first end GE1$a$ of the first ground electrode GE1 and the first end GE2$a$ of the second ground electrode GE2 may have a dimension in the Y-Y' direction of less than 1 mm.

Where the at least one ground layer includes two or more layers of the first ground layer 20, the second ground layer 30, and the at least one third ground layer 40, two layers adjacent in the Z-Z' direction of the two or more ground layers may be connected by one or more first bypass electrodes (not illustrated). As a result, the two or more ground layers may have the same potential. The one or more first bypass electrodes can be omitted.

The circuit board B1 may further include at least one signal line SL. The at least one signal lines SL may be a single signal line or a plurality of signal lines, the number of which corresponds to the number of the at least one signal electrode SE1. For convenience of description, the at least one signal line SL may also be referred to as "the or each signal line SL". Where a single signal line SL is provided, the signal line SL of "the or each signal line SL" means the single signal line SL, and where a plurality of signal lines SL is provided, each signal line SL of "the or each signal line SL" means each of the signal lines SL.

The single signal line SL or the plurality of signal lines SL is provided on the front face 10$d$ of the board body 10, on the back face 10$c$ of the board body 10, or alternatively inside of the board body 10. Where the single signal line SL or the plurality of signal lines SL, as well as the first ground layer 20, are provided on the front face 10$d$ of the board body 10, the first ground layer 20 is not provided in a region of the front face 10$d$ of the board body 10 that is provided with the single signal line SL or the plurality of signal lines SL. Where the single signal line SL or the plurality of signal lines SL, as well as the second ground layer 30, are provided on the back face 10$c$ of the board body 10, the second ground layer 30 is not provided in a region of the back face 10$c$ of the board body 10 that is provided with the single signal line SL or the plurality of signal lines SL. Where the single signal line SL or the plurality of signal lines SL, as well as the third ground layer 40, are provided on one and the same layer (an inner layer) inside the board body 10, the third ground layer 40 is not provided in a region of the inner layer that is provided with the single signal line SL or the plurality of signal lines SL. The single signal line SL or the plurality of signal lines SL is spaced from, and thereby is out of contact with, the at least one ground layer.

The or each signal line SL is led to the or a corresponding signal electrode SE1. The or each signal line SL may be connected to the or a corresponding signal electrode SE1 directly or indirectly via a through-hole electrode (not illustrated) or the like means. The or each signal line SL may extend in the Y' direction from the or a corresponding signal electrode SE1 (see FIGS. 7A, 7B, 7D, and 8A), but may be routed in any other manner. Where the or each signal line SL extends in the Y-Y' direction, the or each signal line SL may extend to the second end 10$b$ of the board body 10 (see FIGS. 7A, 7B, 7D, and 8A) or may not reach the second end 10$b$ of the board body 10 (not illustrated).

Where the single signal line SL or the plurality of signal line SL is provided on the front face 10$d$ of the board body 10 and the second ground layer 30 or the at least one third ground layer 40 is provided, the signal line SL or the plurality of signal lines SL, and the second ground layer 30 or the at least one third ground layer 40, can constitute a microstrip line. Where the signal line SL or the plurality of signal lines SL is provided on the back face 10$c$ of the board body 10 and the first ground layer 20 or the at least one third ground layer 40 is provided, the signal line SL or the plurality of signal lines SL, and the first ground layer 20 or the at least one third ground layer 40, can constitute a microstrip line. Where the signal line SL or the plurality of signal lines SL is provided inside the board body 10 and the first ground layer 20 and the second ground layer 30 are provided, the signal line SL or the plurality of signal lines SL, the first ground layer 20, and the second ground layer 30 can constitute a strip line. Where the signal line SL or the plurality of signal lines SL and the first ground layer 20 are provided on the front face 10$d$ of the board body 10, the signal line SL or the plurality of signal lines SL, and the first ground layer 20, can constitute a coplanar line. Where the signal line SL or the plurality of signal lines SL, and the second ground layer 30, are provided on the back face 10$c$ of the board body 10, the signal line SL or the plurality of signal lines SL, and the second ground layer 30 can constitute a coplanar line. Where the signal line SL or the plurality of signal lines SL, and the third ground layer 40 are provided on one and the same layer inside the board body 10, the signal line SL or the plurality of signal lines SL, and the third ground layer 40 can constitute a coplanar line.

Where the single signal line SL is provided on the front face 10*d* of the board body 10, the terminal 200, the signal electrode SE1, and the signal line SL form a single first high-speed signal transmission path for transmitting high-speed signals (e.g., signals of 12 Gbps). Where the plurality of signal lines SL is provided on the front face 10*d* of the board body 10, the plurality of terminals 200, the plurality of signal electrodes SE1 and the plurality of signal lines SL form a plurality of first high-speed signal transmission paths for transmitting high-speed signals (e.g., signals of 12 Gbps). Where the single signal line SL is provided on the back face 10*c* of the board body 10 or inside the board body 10, the terminal 200, the signal electrode SE1, the signal line SL, and one second bypass electrode form a single second high-speed signal transmission paths for transmitting high-speed signals (e.g., signals of 12 Gbps) Where the plurality of signal lines SL is provided on the back face 10*c* of the board body 10 or inside the board body 10, the plurality of terminals 200, the plurality of signal electrodes SE1, the plurality of signal lines SL, and a plurality of second bypass electrodes (not illustrated) form a plurality of second high-speed signal transmission paths for transmitting high-speed signals (e.g., signals of 12 Gbps). The single second bypass electrode connect the signal electrode SE1 and the signal line SL. The plurality of second bypass electrodes connects the signal electrodes SE1 and the corresponding signal lines SL.

Where the ground terminal 500 of the connector C1 is provided, the ground terminal 500, the shell body 310, the first leg 321, the second leg 322, the first ground electrode GE1, the second ground electrode GE2, and the at least one ground layer form a first return path through which a return current of high-speed signals flow. Where the ground terminal 500 is provided, the at least one ground layer includes the two or more layers described above with the two adjacent layers connected by the one or more first bypass electrodes, the ground terminal 500, the shell body 310, the first leg 321, the second leg 322, the first ground electrode GE1, and the second ground electrode GE2, the two or more ground layers, and the one or more first bypass electrodes form a second return path through which a return current of high-speed signals flow.

Where the ground terminal 500 of the connector C1 is not provided, the shell body 310, the first leg 321, the second leg 322, the first ground electrode GE1, the second ground electrode GE2, and the at least one ground layer form a third return path through which a return current of high-speed signals flow. Where the ground terminal 500 is not provided, the at least one ground layer includes the two or more layers described above with the two adjacent layers connected by the one or more first bypass electrodes, the shell body 310, the first leg 321, the second leg 322, the first ground electrode GE1, the second ground electrode GE2, the two or more ground layers, and the one or more first bypass electrodes form a fourth return path.

The circuit board B1 may further include a resist (not illustrated) having insulating properties. The resist is provided on the front face 10*d* of the board body 10 so as to cover at least the signal electrode SE1 or the plurality of signal electrodes SE1. Where the first ground layer 20 and/or the signal line SL or the plurality of signal lines SL are provided on the front face 10*d* of the board body 10, the resist covers the first ground layer 20 and/or the signal line SL or the plurality of signal lines SL. The resist includes a first opening and a second opening. The first opening exposes at least a part of an end face on the Z-direction side of the first ground electrode GE1. The second opening exposes at least a part of an end face on the Z-direction side of the second ground electrode GE2. The first opening and the second opening may be separated from each other. The resist may also be provided on the back face 10*c* of the board body 10. The resist can be omitted.

Where the bottom face 310*c* of the shell body 310 of the connector C1 is provided with the one or more protrusions 340, the distal end(s) 340*c* of the one or more protrusions 340 abuts the circuit board B1 in a state where the first leg 321 and the second leg 322 of the connector C1 are electrically connected respectively to the first ground electrode GE1 and the second ground electrode GE2 of the circuit board B1, and where the mounting portion 230 of the or each terminal 200 of the connector C1 is electrically connected to the or a corresponding signal electrode SE1 of the circuit board B1 as described above. This arrangement leaves a gap G between the bottom face 310*c* of the shell body 310 and the circuit board B1. Where the single signal line 340 or a plurality of protrusions 340 is not provided, the bottom face 310*c* of the shell body 310 is placed on the circuit board B1 in a state where the first leg 321 and the second leg 322 of the connector C1 are electrically connected respectively to the first ground electrode GE1 and the second ground electrode GE2 of the circuit board B1, and where the mounting portion 230 of the or each terminal 200 of the connector C1 is electrically connected to the or a corresponding signal electrode SE1 of the circuit board B1 as described above.

Mating Connector CP

Figure 9A:
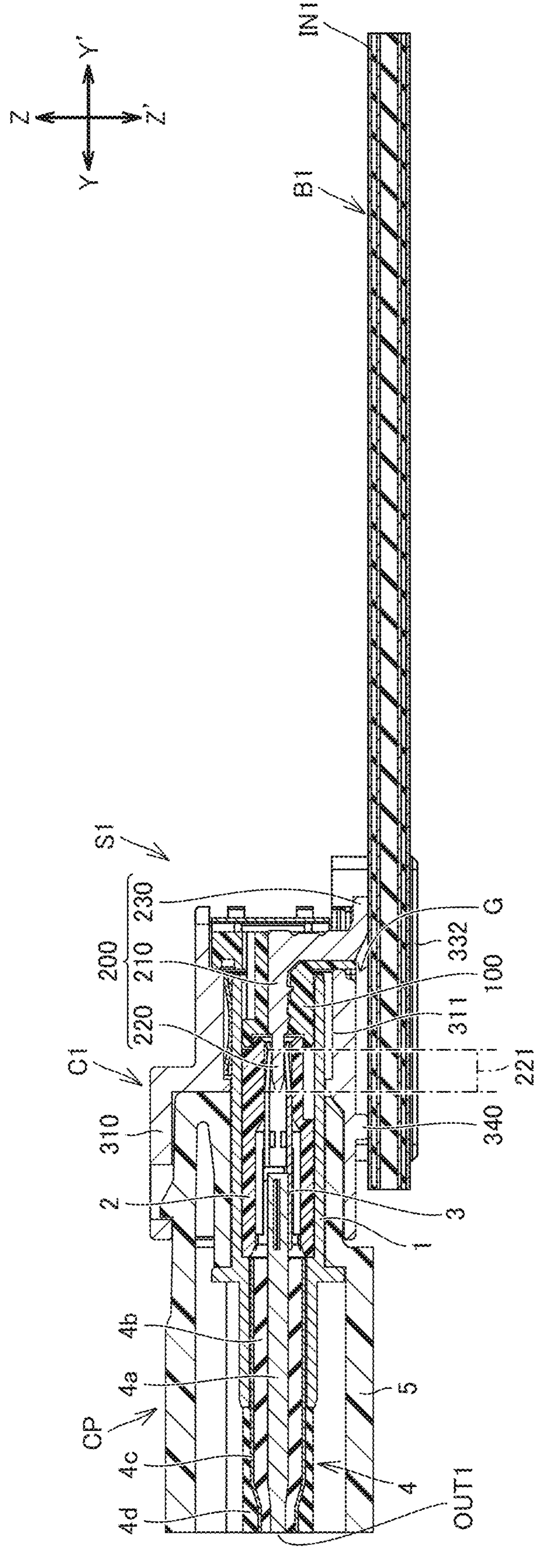
FIG. 9A is a cross-sectional view, which corresponds to FIG. 7B, illustrating the connection structure of the first embodiment and a mating connector connected to the connector of the connection structure.

A mating connector CP, which can be removably inserted into the connector C1 of the connection structure S1, will be hereinafter described with reference to FIG. 9A. FIG. 9A illustrates the connection structure S1 of the first embodiment and the mating connector CP connected to the connector C1 of the connection structure S1. Similarly to FIG. 7B, FIG. 9A also shows the Y-Y' and Z-Z' directions. The Y-Y' direction also corresponds to the direction in which the mating connector CP is inserted into, and removed from, the connector C1 (insertion/removal direction of the mating connector CP).

The mating connector CP is a plug connector configured to be inserted into, and thereby connected to, the connector C1 of the connection structure S1 along the Y-Y' direction, and also configured to be removed from the connector C1, and thereby disconnected from, the connection structure S1 along the Y-Y' direction. The mating connector CP includes a shield member 1, which has electrical conductivity and has a tubular shape, an inner body 2 made of an insulating resin, at least one terminal 3, and a cable 4.

The shield member 1 is a circular-section tube (see FIG. 9A) or a polygonal-section tube (not illustrated) and extends in the Y-Y' direction. Where the connector C1 includes the ground terminal 500, the shield member 1 has a cross section along the X-X' and Z-Z' directions of an outer size that is larger than a size of a cross section along the X-X' and Z-Z' directions of a space defined by the intermediate portions of the plurality of contact springs 530 of the ground terminal 500, and smaller than an inner size of a cross section along the X-X' and Z-Z' directions of the first ring 510. Where the ground terminal 500 is not provided, the shield member 1 has a cross section along the X-X' and Z-Z' directions of an outer shape that corresponds to a shape of a cross section along the X-X' and Z-Z' directions of the central space 3110 of the internal space 311 of the shell body 310 of the connector C1, and of an outer size that is substantially the same as a size of the cross section along the X-X' and Z-Z' directions of the central space 3110 of the internal space 311 of the shell body 310 of the connector C1.

The at least one terminal 3 may be a single terminal or a plurality of terminals, the number of which may correspond to, be larger than, or be smaller than, the number of the at least one terminal 200 of the connector C1. The or each terminal 3 includes a distal portion, an intermediate portion, and a basal portion. The basal portion of the or each terminal 3 is located on the Y-direction side relative to the intermediate portion of the or each terminal 3. The distal portion of the or each terminal 3 is located on the Y'-direction side relative to the intermediate portion of the or each terminal 3. The intermediate portion of the single terminal 3 is held in the inner body 2 and the terminal 3 is securely accommodated in the shield member 1 together with the inner body 2, or alternatively the intermediate portions of the plurality of terminals 3 are held in the inner body 2 and the terminals 3 are securely accommodated in the shield member 1 together with the inner body 2. Where the number of the or each terminal 3 is the same as the number of the or each terminal 200 of the connector C1, the distal portion of the or each terminal 3 is adapted to be brought into contact with the distal portion 220 of the or a corresponding terminal 200. The distal portion of the or each terminal 3 may be shaped as a female type (for example, shaped like a tube extending in the Y-Y' direction, a pair of arms, or the like), and the distal portion 220 of the or a corresponding terminal 200 may be shaped as a male type (for example, shaped like a rod, a plate, or the like), or alternatively vice versa. In either of these cases, the male type may be adapted to fit into the female type. Where the number of the terminals 3 is larger than the number of the at least one terminal 200 of the connector C1, the distal portion of one of the terminals 3 may be adapted to contact with the distal portion 220 of the corresponding terminal 200, or alternatively the distal portion of each of a plurality of terminals 3 (the number of which is smaller than the number of all terminals 3) may be adapted to contact with the distal portion 220 of the corresponding terminal 200, but the remaining terminal or terminals 3 (a plurality of terminals 3 of a number smaller than the number of all terminals 3, or alternatively one terminal 3) will not contact with any of the at least one terminal 200 of the connector C1. Where the number of the at least one terminal 3 is smaller than the number of the terminals 200 of the connector C1, the distal portion of the single terminal 3 may be adapted to contact with the distal portion of one of the terminals 200 of the connector C1, or alternatively the distal portion of each of a plurality of terminals 3 (the number of which is smaller than the number of all terminals 3) may be adapted to contact with the distal portion of each of a plurality of the terminals 200 (the number of which is smaller than the number of all terminals 200) of the connector C1, but the remaining terminal or terminals 200 of the connector C1 will not contact with any of the distal portions of the terminals 3.

The cable 4 includes at least one inner conductor 4*a*, at least one inner insulator 4*b*, an outer conductor 4*c*, and an outer insulator 4*d*. The at least one inner conductor 4*a* may be a single conductor or a plurality of conductors, the number of which may correspond to, be larger than, or be smaller than, the number of the at least one terminal 3. Where the number of the at least one inner conductor 4*a* is the same as the number of the at least one terminal 3, the distal portion of the or each inner conductor 4*a* are connected to the basal portion of the or a corresponding terminal 3. Where the number of the inner conductors 4*a* is larger than the number of the at least one terminal 3, the distal portion of one of the inner conductors 4*a* is connected to the basal portion of the corresponding terminal 3, or alternatively the distal portion of each of a plurality of inner conductors 4*a* (the number of which is smaller than the number of all inner conductors 4*a*) is connected to the basal portion of the corresponding terminal 3, but the remaining inner conductor or conductors 4*a* (a plurality of inner conductors 4*a* of a number smaller than the number of all terminals 3, or alternatively one inner conductor 4*a*) are not connected to any of the at least one terminal 3. Where the number of the at least one inner conductor 4*a* is smaller than the number of the terminals 3, the distal portion of the single inner conductor 4*a* is connected to the basal portion of one of the terminals 3, or alternatively the distal portion of each of a plurality of inner conductors 4*a* (the number of which is smaller than the number of all inner conductors 4*a*) is connected to the basal portion of each of a plurality of the terminals 3 (the number of which is smaller than the number of all terminals 3), but the remaining inner conductor or conductors 4*a* are not connected to any of the distal portions of the terminals 3. The at least one inner insulator 4*b* is a single inner conductor 4*a* or a plurality of inner conductors 4*a*, the number of which corresponds to the number of the at least one inner conductors 4*a*. The or each inner insulator 4*b* is made of a material having insulating properties, has a generally tubular shape, and covers the outer perimeter surface of the or a corresponding inner conductor 4*a* excluding the distal portion thereof. The outer conductor 4*c* is of a generally tubular shape, is made of a material having electrical conductivity, and covers the inner insulator 4*b* or inner insulators 4*b*. The distal portion of the inner conductor 4*a*, the distal portion of the inner insulator 4*b*, and the distal portion of the outer conductor 4*c* are disposed inside the shield member 1, or alternatively the distal portions of the inner conductors 4*a*, the distal portions of inner insulators 4*b*, and the distal portion of the outer conductor 4*c* are disposed inside the shield member 1. The distal portion of the outer conductor 4*c* is fitted over, and connected to, the shield member 1. The outer insulator 4*d* is made of a material having insulating properties, has a generally tubular shape, and covers the outer conductor 4*c* excluding the distal portion thereof. It should be noted that FIG. 9A illustrates only part of the cable 4.

The mating connector CP may further include a housing 5 made of an insulating resin. The housing 5 surrounds the shield member 1 excluding a distal portion thereof. In other words, the distal portion of the shield member 1 protrudes from the housing 5. Where the shell body 310 of the connector C1 has the first space 311*a*, a distal portion of the housing 5 may fit in the first space 311*a*. Where the perimeter face of the first space 311*a* is provided with the plurality of key grooves, the housing 5 may be provided with a plurality of key portions corresponding to the plurality of key grooves. Where the perimeter face of the first space 311*a* is provided with the lock hole, the housing 5 may be provided with a lock arm corresponding to the lock hole.

In use, the distal portion of the shield member 1 of the mating connector CP is inserted from the Y-direction side into the internal space 311 of the shell body 310 of the shell 300 of the connector C1. Where the ground terminal 500 of the connector C1 is provided, the distal portion of the shield member 1 of the mating connector CP is inserted into the central space 3110 in the shell body 310 of the connector C1, and the intermediate portions of the plurality of contact springs 530 of the ground terminal 500 are substantially equally elastically contact with the distal portion of the shield member 1. At the same time, the distal portion of the at least one terminal 3 of the mating connector CP contacts with the distal portion 220 of the at least one terminal 200 of the connector C1. The shield member 1 of the mating connector CP is thus electrically connected via the ground terminal 500 to the shell 300 of the connector C1, and the distal portion of the at least one terminal 3 of the mating connector CP is electrically connected to the distal portion 220 of the at least one terminal 200 of the connector C1, resulting in that the connector C1 is electrically connected to the mating connector CP.

Where the ground terminal 500 of the connector C1 is not provided, the distal portion of the shield member 1 of the mating connector CP is fitted into the central space 3110 in the shell body 310 of the connector C1, and the distal portion of the at least one terminal 3 of the mating connector CP contacts with the distal portion 220 of the at least one terminal 200 of the connector C1. The shield member 1 of the mating connector CP is thus electrically connected to the shell 300 of the connector C1, and the distal portion of the at least one terminal 3 of the mating connector CP is electrically connected to the distal portion 220 of the at least one terminal 200 of the connector C1, resulting in that the connector C1 is electrically connected to the mating connector CP.

In a state where the connector C1 of the connection structure S1 is connected to the mating connector CP in one of the manners described above, the at least one first high-speed signal transmission path or the at least one second high-speed signal transmission path, and the at least one terminal 3 of the mating connector CP, and the at least one inner conductor 4*a* of the mating connector CP form at least one signal transmission path (this path will be hereinafter referred to as "at least one third high-speed signal transmission path") for transmitting high-speed signals. On the other hand, the first, second, third, or fourth return paths, the shield member 1 of the mating connector CP, and the outer conductor 4*c* of the mating connector CP form a path (this path will be hereinafter referred to as a "fifth return path") through which a return current of the high-speed signals flow.

FIG. 9A illustrates a portion 221 from a contact point of the terminal 200 of the connector C1 that is in contact with the terminal 3 of the mating connector CP to the first end 220*a* of the terminal 200. The portion 221 forms an open stub branched from the third high-speed signal transmission path for transmitting high-speed signals. Where the connector C1 includes a plurality of terminals 200 and the mating connector CP includes a plurality of terminals 3, there are a plurality of open stubs 221 respectively branched from the plurality of third high-speed signal transmission paths described above.

Here, a first simulation and a second simulation were performed as described below. On an electromagnetic (EM) simulator (Ansys HFSS from Ansys) used for the first simulation, the following conditions were set for the first simulation.

[Conditions of first simulation] The EM simulator used information obtained by modeling the connection structure S1 of the first embodiment and the mating connector CP connected to the connector C1 of the connection structure S1. The configurations of the connection structure S1 and the mating connector CP are as illustrated in FIG. 9A.

The connector C1 of the connection structure S1, configured as illustrated in FIGS. 1A to 1E and FIGS. 7A to 7D, includes one body 100, one terminal 200, one shell 300, one shield cover 400, and one ground terminal 500. The first leg 321 and the second leg 322 of the shell 300 are positioned and shaped substantially symmetrically to each other across the first imaginary line CL1 that serves the axis of line symmetry. The first end 321*a* of the first leg 321 and the first end 322*a* of the second leg 322 are located on the Y'-direction side relative to the first end 220*a* of the distal portion 220 of the terminal 200. The second end 321*b* of the first leg 321 and the second end 322*b* of the second leg 322 are located on the Y'-direction side relative to the second end 230*b* of the mounting portion 230 of the terminal 200. The third end 321*c* of the first leg 321 and the third end 322*c* of the second leg 322 are located on the Z'-direction side relative to the third end 230*c* of the mounting portion 230 of the terminal 200. The fourth end 321*d* of the first leg 321 and the fourth end 322*d* of the second leg 322 are located on the Z-direction side relative to the fourth end 230*d* of the mounting portion 230 of the terminal 200. The bottom face 310*c* of the shell 300 of the connector C1 is provided with one protrusion 340. The protrusion 340 abuts the circuit board B1, leaving a gap G between the bottom face 310*c* and the circuit board B1.

The circuit board B1 of the connection structure S1, configured as illustrated in FIGS. 7A to 8B, is a so-called four-layer circuit board. The circuit board B1 includes one board body 10, one signal electrode SE1, one signal line SL, one first ground layer 20, one second ground layer 30, two third ground layers 40, one first ground electrode GE1, and one second ground electrode GE2. The board body 10 includes three insulating layers stacked in the Z-Z' direction.

The first ground layer 20, as illustrated in FIG. 8A, is provided in the entire front face 10*d* of the board body 10 excluding a generally rectangular, central region of the front face 10*d*. This generally rectangular region extends to the second end 10*b* of the board body 10. On the generally rectangular region of the front face 10*d* of the board body 10, there is provided the signal electrode SE1, which is a surface electrode. The mounting portion 230 of the terminal 200 of the connector C1 is placed on, and soldered to, the signal electrode SE1. On the generally rectangular region of the front face 10*d* of the board body 10, there is further provided the signal line SL, which extends from the signal electrode SE1 to the second end 10*b* of the board body 10. As illustrated in FIG. 8B, the second ground layer 30 is provided on the entire back face 10*c* of the board body 10. The two third ground layers 40 are provided on the entire faces on the Z- and Z'-direction sides of the middle one of the three insulating layers of the board body 10, and each have substantially the same shape as the second ground layer 30. The first end 20*a* of the first ground layer 20, the first end 30*a* of the second ground layer 30, and the first ends 40*a* of the two third ground layers 40 are located on the Y-direction side relative to the first ground electrode GE1 and the second ground electrode GE2, and are coincident in the Y-Y' direction with the first end 10*a* of the board body 10. Each linear distance in the Y-Y' direction from the first end GE1*a* of the first ground electrode GE1 and the first end GE2*a* of the second ground electrode GE2 to the first end 10*a* of the board body 10 is approximately 1 mm. Accordingly, the first ground layer 20, the second ground layer 30, and the two third ground layers 40 each have an open stub having a dimension in the Y-Y' direction of approximately 1 mm, from the first end GE1*a* of the first ground electrode GE1 and the first end GE2*a* of the second ground electrode GE2 to the first end 10*a* of the board body 10.

The first ground electrode GE1 and the second ground electrode GE2 have cross sections along the X-X' and Z-Z' directions of shapes, sizes, and positions corresponding to the outer shapes, sizes, and positions of the cross sections along the Y-Y' and X-X' directions of the first leg 321 and the second leg 322, respectively, of the connector C1. The first leg 321 and the second leg 322 of the connector C1 are respectively received in, and soldered to, the first ground electrode GE1 and the second ground electrode GE2. The first ground electrode GE1 and the second ground electrode GE2 are led (connected) to the first ground layer 20, the second ground layer 30, and the two third ground layers 40.

The mating connector CP of the connector C1, configuration as illustrated in FIG. 9A, includes one shield member 1, one inner body 2, one terminal 3, one cable 4, and one housing 5. The cable 4 includes one inner conductor 4*a*, one inner insulator 4*b*, one outer conductor 4*c*, and one outer insulator 4*d*.

In the first simulation, a signal input port IN1 is set at the end on the Y'-direction side of the signal line SL of the circuit board B1 of the connection structure S1, and a signal output port OUT1 is set at the end on the Y-direction side of the inner conductor 4*a* of the cable 4 of the mating connector CP. The transmission speed of signals to be inputted from the input port IN1 is set to 12 Gbps.

On the EM simulator (Ansys HFSS from Ansys) used for the second simulation, the following conditions were set for the second simulation.

[Conditions of second simulation] The EM simulator used information obtained by modeling a connection structure SC1 of a first comparative example and the mating connector CP connected to a connector CC1 of the connection structure SC1. The connection structure SC1 and the mating connector CP of the first comparative example are configured as illustrated in FIG. 9B.

Figure 9B:
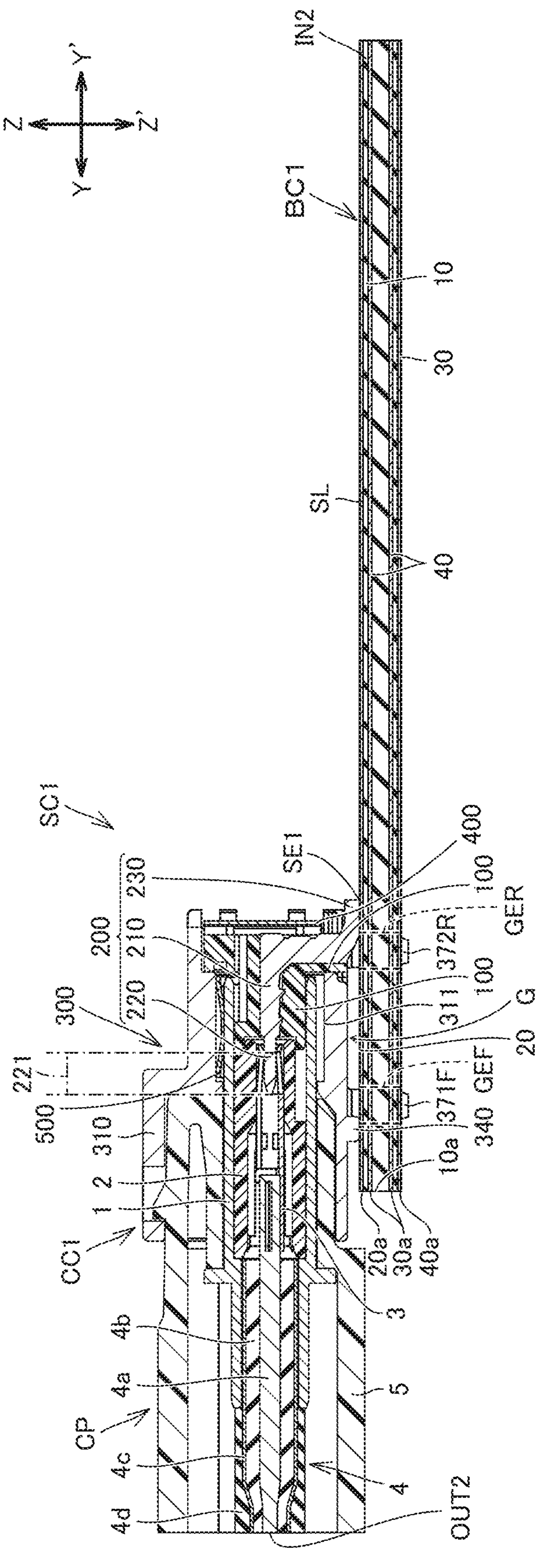
FIG. 9B is a cross-sectional view, which corresponds to FIG. 7B, illustrating a connection structure of a circuit board and a connector of a first comparative example, and the mating connector connected to the connector of the connection structure.

The connector CC1 of the connection structure SC1, configured as illustrated in FIG. 9B, has the same configuration as the connector C1 of the connection structure S1 of the first embodiment, except that the bottom face 310*c* of the shell body 310 is provided with, in place of the first leg 321 and the second leg 322, a first front leg 371F, a second front leg 371F, a first rear leg 372R, and a second rear leg 372R. Therefore, components of the connector CC1, excluding the first front leg 371F, the second front leg 371F, the first rear leg 372R, and the second rear leg 372R, will be referred to using the same reference numerals as those of the corresponding components of the connector C1 of the connection structure S1 of the first embodiment, and will not be described in detail. As the first front leg 371F and the first rear leg 372R are not illustrated in FIG. 9B, for the first front leg 371F, refer to the second front leg 371F illustrated in FIG. 9B, and for the first rear leg 372R, refer to the second rear leg 372R illustrated in FIG. 9B.

The first front leg 371F, the first rear leg 372R, the second front leg 371F, and the second rear leg 372R extend in the Z' direction from the bottom face 310*c* of the shell body 310 and each have a generally cylindrical shape of a diameter that is substantially the same as the dimension in the X-X' direction of the first leg 321 of the connector C1.

The first front leg 371F and the second front leg 371F are spaced from each other in the X-X' direction. The first rear leg 372R and the second rear leg 372R are spaced from each other in the X-X' direction. Each of the distances in the X-X' direction between the first front leg 371F and the second front leg 371F and between the first rear leg 372R and the second rear leg 372R is substantially the same as the distance in the X-X' direction between the first leg 321 and the second leg 322 of the connector C1.

The first front leg 371F and the first rear leg 372R are spaced from each other in the Y-Y' direction. The second front leg 371F and the second rear leg 372R are spaced from each other in the Y-Y' direction. An end on the Y-direction side of the first front leg 371F and an end on the Y-direction side of the second front leg 371F are respectively coincident in the Y-Y' direction with the first end 321*a* of the first leg 321 and the first end 322*a* of the second leg 322 of the connector C1 of the first embodiment, and are located on the Y-direction side relative to the first end 220*a* of the distal portion 220 of the terminal 200. An end on the Y'-direction side of the first front leg 371F and an end on the Y'-direction side of the second front leg 371F are located slightly on the Y'-direction side relative to the first end 220*a* of the distal portion 220 of the terminal 200. An end on the Y-direction side of the first rear leg 372R and an end on the Y-direction side of the second rear leg 372R are located on the Y-direction side relative to the first end 230*a* of the mounting portion 230 of the terminal 200. An end on the Y'-direction side of the first rear leg 372R and an end on the Y'-direction side of the second rear leg 372R are substantially coincident in the Y-Y' direction with the second end 210*b* of the main body 210 of the terminal 200.

A circuit board BC1 of the connection structure SC1 has the same configuration as the circuit board B1 of the connection structure S1 of the first embodiment, except that the first ground electrode GE1 and the second ground electrode GE2 are replaced with a first front ground electrode GEF, a second front ground electrode GEF, a first rear ground electrode GER, and a second rear ground electrode GER. Therefore, components of the circuit board BC1, excluding the first front ground electrode GEF, the second front ground electrode GEF, the first rear ground electrode GER, and the second rear ground electrode GER, will be referred to using the same reference numerals as those of the corresponding components of the circuit board B1 of the connection structure S1 of the first embodiment, and will not be described in detail. As the first front ground electrode GEF and the first rear ground electrode GER are not illustrated in FIG. 9B, for the first front ground electrode GEF, refer to the second front ground electrode GEF illustrated in FIG. 9B, and for the first rear ground electrode GER, refer to the second rear ground electrode GER illustrated in FIG. 9B.

The first front ground electrode GEF, the second front ground electrode GEF, the first rear ground electrode GER, and the second rear ground electrode GER are through-hole electrodes extending through the circuit board BC1 in the Z-Z' direction and having diameters that respectively correspond to the diameters of the first front leg 371F, the second front leg 371F, the first rear leg 372R, and the second rear leg 372R of the connector CC1. Each of these diameters is substantially the same as the dimension in the X-X' direction of the first ground electrode GE1 of the circuit board B1 of the first embodiment.

The first front ground electrode GEF, the second front ground electrode GEF, the first rear ground electrode GER, and the second rear ground electrode GER are located at positions respectively corresponding to the positions of the first front leg 371F, the second front leg 371F, the first rear leg 372R, and the second rear leg 372R. Each of the distances in the X-X' direction between the first front ground electrode GEF and the second front ground electrode GEF and between the first rear ground electrode GER and the second rear ground electrode GER is the same as distance in the X-X' direction between the first ground electrode GE1 and the second ground electrode GE2 of the circuit board B1 of the first embodiment.

Each linear distance in the Y-Y' direction from the on the Y-direction side of the first front ground electrode GEF and the on the Y-direction side of the second front ground electrode GEF to the first end 10*a* of the board body 10 of the circuit board BC1 is approximately 2.5 mm. The first ground layer 20, the second ground layer 30, and the two third ground layers 40 each have an open stub having a dimension in the Y-Y' direction of approximately 2.5 mm, from the end on the Y-direction side of the first front ground electrode GEF and the end on the Y-direction side of the second front ground electrode GEF to the first end 10*a* of the board body 10.

The first front ground electrode GEF, the second front ground electrode GEF, the first rear ground electrode GER, and the second rear ground electrode GER are led (connected) to the first ground layer 20, the second ground layer 30, and the two third ground layers 40.

In the connector CC1, the first front leg 371F of the shell 300 is received in, and soldered to, the first front ground electrode GEF, the second front leg 371F is received in, and soldered to, the second front ground electrode GEF, the first rear leg 372R is received in, and soldered to, the first rear ground electrode GER, and the second rear leg 372R is received in, and soldered to, the second rear ground electrode GER.

The mating connector CP has the same configuration as that used in the first simulation.

In the second simulation, a signal input port IN2 is set at the end on the Y'-direction side of the signal line SL of the circuit board BC1 of the connection structure SC1, and a signal output port OUT2 is set at the end on the Y-direction side of the inner conductor 4*a* of the cable 4 of the mating connector CP. The transmission speed of signals inputted from the input port IN2 is set to 12 Gbps.

Under the conditions of the first simulation, electric field intensity analysis (first simulation) was performed using the EM simulator. Also, under the conditions of the second simulation, electric field intensity analysis (second simulation) was performed using the EM simulator.

Figure 10A:
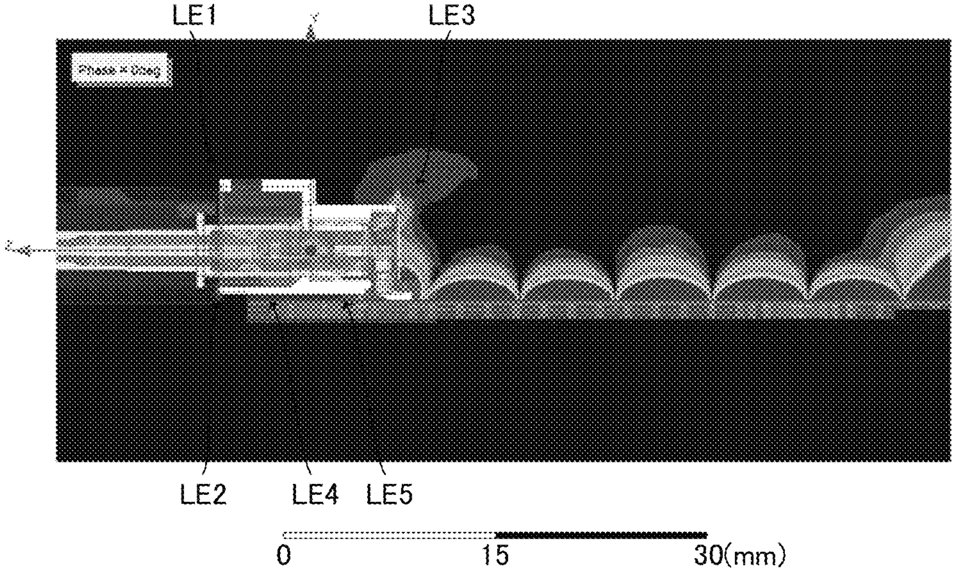
FIG. 10A shows results of electric field intensity analysis (simulation) performed on the connection structure of the first embodiment.
Figure 10B:
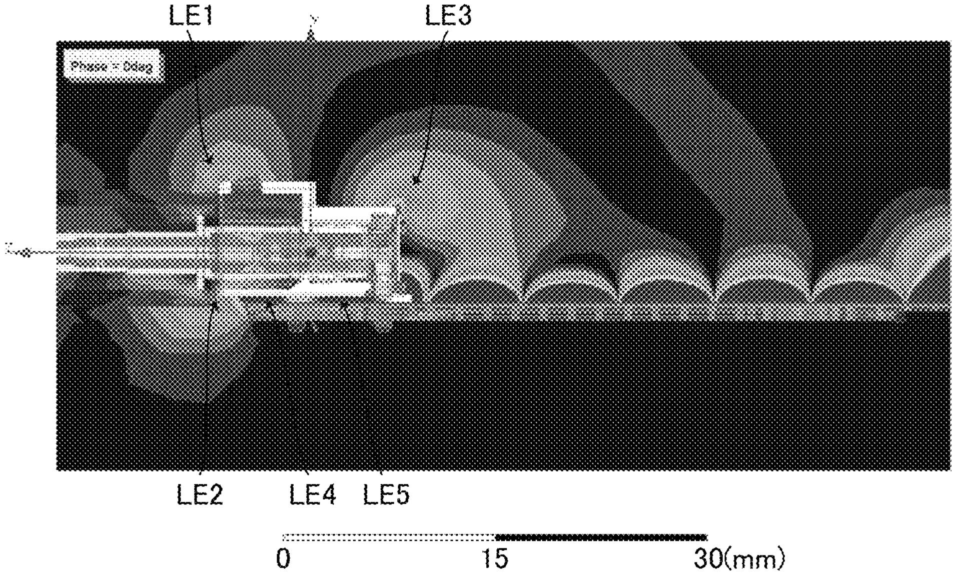
FIG. 10B shows results of electric field intensity analysis (simulation) performed on the connection structure of the first comparative example.

[Results of first and second simulations] FIG. 10A shows the result of electric field intensity analysis of the first simulation, and FIG. 10B shows the result of electric field intensity analysis of the second simulation. Comparisons will now be made between the results of the first simulation and the results of the second simulation referring to FIGS. 10A and 10B.

[Comparison between results of first simulation and results of second simulation] The results of electric field intensity analysis of the second simulation indicate leakage of the electric field is observed in areas, which are indicated by arrows LE1, LE2, and LE3, in the vicinity of edge portions of the shell body 310 of the connector CC1 for following reason. The first front leg 371F and the second front leg 371F of the shell 300 of the connector CC1 are disposed on opposite sides relative to the first end 220*a* of the distal portion 220 of the terminal 200, and the first rear leg 372R and the second rear leg 372R are disposed on opposite sides relative to the portion on the Y-direction side of the mounting portion 230 of the terminal 200. However, since the connector CC1 is configured such that the first front leg 371F, the second front leg 371F, the first rear leg 372R, and the second rear leg 372R are cylindrical and are respectively connected to the first ground layer 20, the second ground layer 30, and the two third ground layers 40 of the circuit board BC1, the connection structure SC1 has a lower grounding strength. This causes reflection of high-speed signals in at least one of the following portions (hereinafter referred to as "at least one reflecting factor portion"): a portion where the terminal 200 of the connector CC1 changes in shape, a portion where the mounting portion 230 of the terminal 200 is connected to the signal electrode SE1 of the circuit board BC1, a contact portion where the terminal 200 of the connector CC1 is in contact with the terminal 3 of the mating connector CP, the portion 221 (open stub) from the contact portion to the first end 220*a* of the distal portion 220 of the terminal 200, etc. Reflection noise resulting from the reflection of high-speed signals is radiated from the at least one reflection factor portion to the shell body 310, and before the noise flows from at least one of the first front leg 371F, the second front leg 371F, the first rear leg 372R, and the second rear leg 372R of the shell body 310 to the first ground layer 20, the second ground layer 30, and the two third ground layers 40 of the circuit board BC1, the noise will be re-radiated to the outside of the shell body 310 from the edge portions of the shell body 310, with the edge portions functioning as antennas. This is considered to be a factor of leakage of the electric field in the areas LE1, LE2, and LE3.

The results of electric field intensity analysis of the second simulation also indicate leakage of the electric field is observed in an area, which is indicated by an arrow LE4, between the shell body 310 of the connector CC1 and the circuit board BC1 for the following reason. The first ground layer 20, the second ground layer 30, and the third ground layers 40 have open stubs of approximately 2.5 mm in the vicinity of the area LE4. With the open stubs of the first ground layer 20, the second ground layer 30, and the third ground layers 40 functioning as antennas, noise flowing through the first ground layer 20, the second ground layer 30, and the third ground layers 40 may be re-radiated from the open stubs before flowing from the first ground layer 20, the second ground layer 30, and the third ground layers 40 to a housing ground or the like, or alternatively the noise may be lost as Joule heat. This is considered to be a factor of leakage of the electric field in the area LE4.

The results of electric field intensity analysis of the second simulation further indicate leakage of the electric field is observed in the area, which is indicated by an arrow LE5, between the shell body 310 of the connector CC1 and the circuit board BC1 for the following reason. The gap G is left between the bottom face 310*c* of the shell body 310 and the circuit board BC1 because of the provision of the protrusion 340, the cylindrical first front leg 371F and the cylindrical first rear leg 372R of the shell 300 of the connector CC1 are spaced from each other in the Y-Y' direction, and the cylindrical second front leg 371F and the cylindrical second rear leg 372R of the shell 300 of the connector CC1 are spaced from each other in the Y-Y' direction. In this arrangement, on the Z'-direction side relative to the bottom face 310*c* of the shell body 310, there are areas where no legs exist between the first front leg 371F and the first rear leg 372R and between the second front leg 371F and the second rear leg 372R, causing reduced shielding effect of the connector CC1, and resulting in that noise superimposed on high-speed signals transmitted through the terminal 200 is directly radiated from the terminal 200 to the outside of the connector CC1. This is considered to be a factor of leakage of the electric field in the area LE5.

In contrast, the results of electric field intensity analysis of the first simulation indicate little leakage of the electric fields in the areas LE1 and LE2. Although the leakage of the electric field in the area LE3 is indicated, the leakage of the electric field in the area LE3 is reduced, as compared with the leakage of the electric field in the area LE3 in the results of electric field intensity analysis of the second simulation. The reasons for these are given below. The first leg 321 and the second leg 322 are disposed on the X- and X'-direction sides relative to the terminal 200 such that the first end 321*a* of the first leg 321 and the first end 322*a* of the second leg 322 are disposed on the Y-direction side relative to the first end 220*a* of the distal portion 220 of the terminal 200, and such that the second end 321*b* of the first leg 321 and the second end 322*b* of the second leg 322 are located on the Y'-direction side relative to the second end 230*b* of the mounting portion 230 of the terminal 200. In other words, over the entire length in the Y-Y' direction of the terminal 200, the terminal 200 is substantially at the same distance in the X-X' direction to the first leg 321 and to the second leg 322, and the first leg 321 and the second leg 322 exist near the terminal 200. Therefore, the grounding strength of the connection structure S1 is stronger than that of the connection structure SC1. Therefore, even if high-speed signals are reflected in at least one of the following portions (at least one reflecting factor portion): a portion where the terminal 200 of the connector C1 changes in shape, a portion where the mounting portion 230 of the terminal 200 is connected to the circuit board B1, a contact point where the terminal 200 of the connector C1 is in contact with the terminal 3 of the mating connector CP, the portion 221 (open stub) from the contact point to the first end 220*a* of the distal portion 220 of the terminal 200, etc., and reflection noise resulting from the reflection of high-speed signals is radiated from the at least one reflecting factor portion to the shell body 310, the noise will easily flow from the first leg 321 and/or the second leg 322 of the shell body 310 to at least one of the first ground layer 20, the second ground layer 30, and the two third ground layers 40 of the circuit board BC1. Therefore, it is considered that the noise is hardly re-radiated from the edge portions of the shell body 310 to the outside.

The results of electric field intensity analysis of the first simulation also indicate little leakage of the electric field in the area LE4 for the following reasons. The first ground layer 20, the second ground layer 30, and the third ground layers 40 of the circuit board B1 have respective open stubs of approximately 1 mm in the vicinity of the area LE4. However, each of the open stubs of the first ground layer 20, the second ground layer 30, and the third ground layers 40 of the circuit board B1 is shorter in dimension in the Y-Y' direction, by approximately 1.5 mm, than each of the open stubs of the first ground layer 20, the second ground layer 30, and the third ground layers 40 of the circuit board BC1 of the first comparative example. It is considered that such difference in dimension diminishes the characteristics of the open stubs of the first ground layer 20, the second ground layer 30, and the third ground layers 40 of the circuit board B1 functioning as antennas, suppressing re-radiation of noise from the open stubs.

The results of electric field intensity analysis of the first simulation further indicates little leakage of the electric field in the area LE5 for the following reason. In the connector C1, the gap G is left between the bottom face 310*c* of the shell body 310 and the circuit board BC1 because of the provision of the protrusion 340, but the bottom face 310*c* of the shell body 310 of the connector C1 is provided with the first leg 321 and the second leg 322 elongated in the Y-Y' direction. In this arrangement, there is no area where no legs exist between the first front leg 371F and the first rear leg 372R nor between the second front leg 371F and the second rear leg 372R on the Z'-direction side relative to the bottom face 310*c* of the shell body 310, as in the connector CC1 of the first comparative example. Therefore, it is considered that the connector C1 provides improved shielding effect, so that the noise superimposed on high-speed signals transmitted the terminal 200 is less likely to be radiated from the terminal 200 to the outside of the connector C1.

The connection structure S1 as described above provides the following technical features and effects.

First technical features and effects: The connection structure S1 has improved EMI characteristics for the following reasons. As discussed for the first technical features and effects of the connector C1, the first leg 321 and the second leg 322 of the shell 300 of the connector C1 are each at a shorter distance to the terminal or terminals 200, and the first leg 321 and the second leg 322 have larger cross-sectional areas in cross section along the Y-Y' and Z-Z' directions than the cross-sectional areas in the corresponding cross sections of the front legs and the rear legs of the connector of the conventional example. The first leg 321 and the second leg 322 of the connector C3 as such are connected to the at least one ground layer of the circuit board B1 via the first ground electrode GE1 and the second ground electrode GE2 of the circuit board B1, resulting in that the connection structure S1 has improved grounding strength. For this reason, even if high-speed signals transmitted through the at least one terminal 200 are reflected on the at least one terminal 200 to cause generation of noise to be radiated to the shell body 310 of the shell 300, the noise will easily flow from the first leg 321 and/or the second leg 322 of the connector C1, through the first ground electrode GE1 and/or the second ground electrode GE2 of the circuit board B1, to the at least one ground layer of the circuit board B1. This suppresses the possibility that the noise radiated to the shell body 310 of the shell 300 is re-radiated from an edge portion of the shell body 310 before flowing from the first leg 321 and/or the second leg 322 of the connector C1, through the first ground electrode GE1 and/or the second ground electrode GE2 of the circuit board B1, to the at least one ground layer of the circuit board B1. Especially in a case where the first end 321*a* of the first leg 321 and the first end 322*a* of the second leg 322 are each located on the Y-direction side relative to the first end 220*a* of the distal portion 220 of the or each terminal 200, and the second end 321*b* of the first leg 321 and the second end 322*b* of the second leg 322 are each located on the Y'-direction side relative to the second end 230*b* of the mounting portion 230 of the or each terminal 200, the first leg 321 and the second leg 322 are disposed on the X- and X'-direction sides relative to the terminal or terminals 200 over the entire length in the Y-Y' direction of the terminal or terminals 200. In this case, even if high-speed signals are reflected on the at least one terminal 200 to cause generation of noise to be radiated to the shell body 310, the noise will more easily flow from the first leg 321 and/or the second leg 322 of the connector C1, through the first ground electrode GE1 and/or the second ground electrode GE2 of the circuit board B1, to the at least one ground layer of the circuit board B1. This further suppresses the possibility that the noise is re-radiated from an edge portion of the shell body 310.

Second technical features and effects: The connection structure S1 has improved EMC characteristics for the following reasons. As discussed for the second technical features and effects of the connector C1, the reduced impedances of the first leg 321 and the second leg 322 strengthen the grounding of the connector C1. The connection structure S1 thus has improved EMC characteristics. Where the at least one ground layer of the circuit board B1 is a plurality of ground layers (all ground layers, or alternatively a plurality of ground layers of a number smaller than the number of all ground layers), and the plurality of ground layers are led (connected) to the first ground electrode GE1 and the second ground electrode GE2 of the circuit board B1, the first leg 321 and the second leg 322 are connected to the plurality of ground layers of the circuit board B1 via the first ground electrode GE1 and the second ground electrode GE2. This also strengthens the ground of the connection structure S1.

Third technical features and effects: Where the shield cover 400 of the connector C1 closes the internal space 311 of the tubular shell body 310 of the shell 300 from the Y'-direction side, it is possible to reduce the possibility of the increase of the impedance of the second end 210*b* of the main body 210 of the at least one terminal 200 in the first or second high-speed signal transmission path, by adjusting the distance in the Y-Y' direction from the covering portion 410 of the shield cover 400 to the second end 210*b* of the main body 210 of the at least one terminal 200. This also improves EMI characteristics of the connector C1.

Fourth technical features and effects: Where the at least one ground layer of the circuit board B1 extends in the Y direction beyond the first end GE1*a* of the first ground electrode GE1 and the first end GE2*a* of the second ground electrode GE2, the portion of the or each ground layer of the circuit board B1 that extends beyond the first end GE1*a* of the first ground electrode GE1 and the first end GE2*a* of the second ground electrode GE2 forms an open stub branched from the first, second, third, or fourth return path, and the or each open stub may function as an antenna to radiate noise. However, where the linear distance in the Y-Y' direction from each of the first end GE1*a* of the first ground electrode GE1 and the first end GE2*a* of the second ground electrode GE2 to the first end 10*a* of the board body 10 is approximately 1 mm, the or each open stub is unlikely to function as an antenna, reducing noise generated from the or each open stub. This configuration also improves EMI characteristics of connection structure S1.

Fifth technical features and effects: Where the bottom face 310*c* of the shell 300 of the connector C1 is provided with the at least one protrusion 340, the connector C1 can be mounted on the circuit board B1 by a through-hole reflow method for the following reasons. Since the distal end 340*c* of the or each protrusion 340 abuts the circuit board B1, the gap G is left between the bottom face 310*c* of the shell body 310 of the shell 300 and the circuit board B1. This arrangement allows the first leg 321 and the second leg 322 of the connector C1 to be soldered respectively to the first ground electrode GE1 and the second ground electrode GE2 by a through-hole reflow method to form respective fillets around the first leg 321 and the second leg 322 in the gap G. Moreover, since the first leg 321 and the second leg 322 of the connector C1 are ridges elongated in the Y-Y' direction and disposed on the X- and X'-direction sides relative to the gap G, they electromagnetically shield a wider area on the X- and X'-direction sides of the gap G, as compared with the cylindrical, front and rear legs of the connector of the conventional example. This also improves the EMC characteristics of the connection structure S1.

Sixth technical features and effects: Where the distal portion 220 of the at least one terminal 200 of the connector C1 is shaped as a male type and the distal portion of the at least one terminal 3 of the mating connector CP s shaped as a female type, in a state where the mating connector CP is fitted in the connector C1 and the distal portion 220 of the at least one terminal 200 of the connector C1 is fitted in the distal portion of the at least one terminal 3 of the mating connector CP, the distal portion of the at least one terminal 3 of the mating connector CP is located outside the distal portion 220 of the at least one terminal 200. As such, the distal portion of the at least one terminal 3 is closer to the shield member 1 of the mating connector CP than the distal portion 220 of the at least one terminal 200 is. This arrangement may cause impedance mismatch at a portion, and/or front and rear portions thereof in the Y-Y' direction, where the distal portion 220 of the at least one terminal 200 of the connector C1 is fitted in the distal portion of the at least one terminal 3 of the mating connector CP. If the impedance mismatch is large, high-speed signals would be reflected to generate reflection noise. However, where the at least one distal portion 220 is smaller in dimension in the Z-Z' direction than the first portion of the main body 210, the above-described impedance mismatch is reduced to suppress generation of noise. This configuration also improves EMI characteristics of connection structure S1.

Seventh technical features and effects: Where the front face 10*d* of the circuit board B1 is provided with the resist having the first and second openings separated from each other, a metal mask for applying solder paste to be used in a through-hole reflow method can be formed with first and second openings that separated from each other in accordance with the first and second openings of the resist. Thus, when soldering the first leg 321 and the second leg 322 of the connector C1 respectively to the first ground electrode GE1 and the second ground electrode GE2 of the circuit board B1 by the through-hole reflow method as described above, the solder paste is unlikely to flow out from the first opening to the second opening of the resist or vice versa. This reduces the possibility that the solder fillet is formed only in any one of a first joint between the first leg 321 of the connector C1 and the first ground electrode GE1 of the circuit board B1 and a second joint between the second leg 322 of the connector C1 and the second ground electrode GE2 of the circuit board B1, and/or the possibility that one of the first and second joints has insufficient amount of solder fillet. In other words, both the first and second joints have a sufficient amount of solder fillet to maintain a favorable connection state, stabilizing EMI characteristics of the connection structure S1.

Figure 11A:
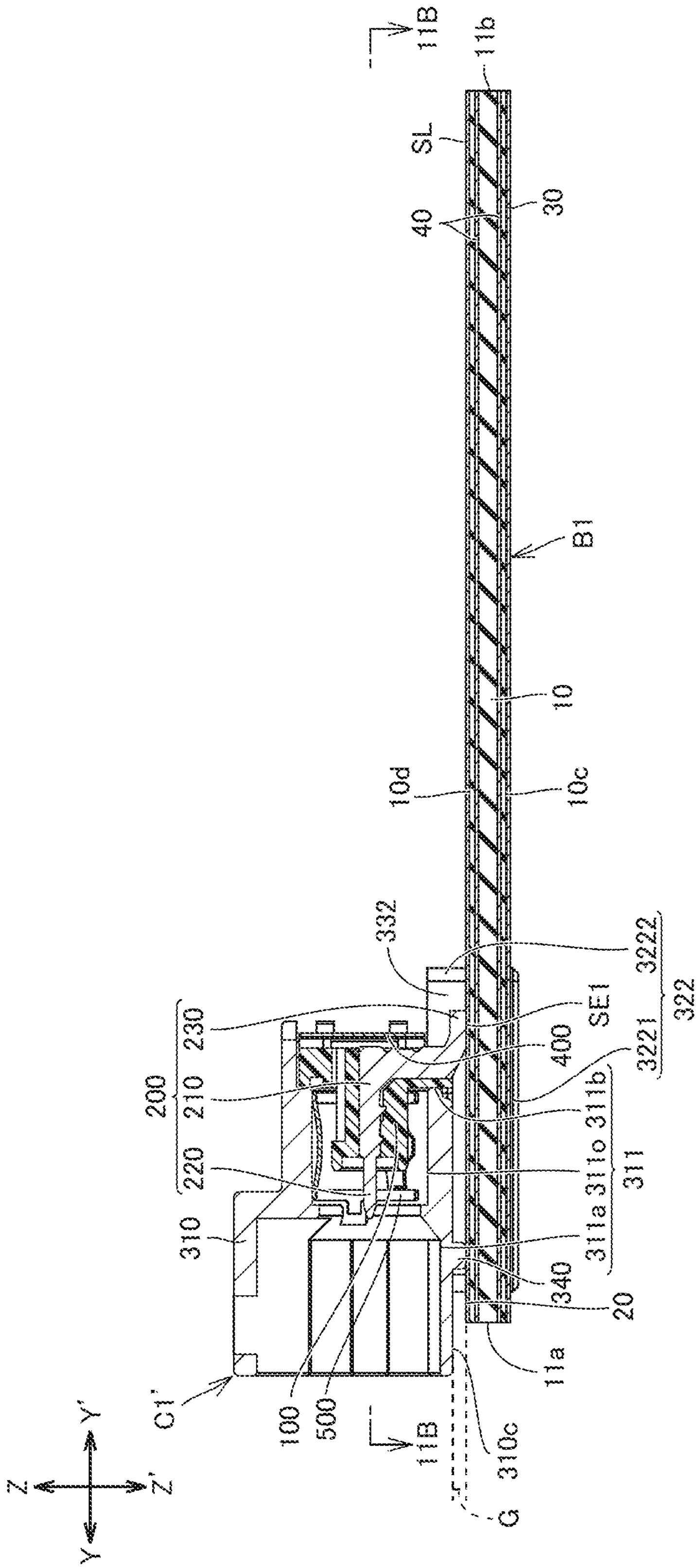
FIG. 11A is a cross-sectional view, which corresponds to FIG. 7B, of a connection structure of a circuit board and the connector according to a second embodiment of the invention.
Figure 11B:
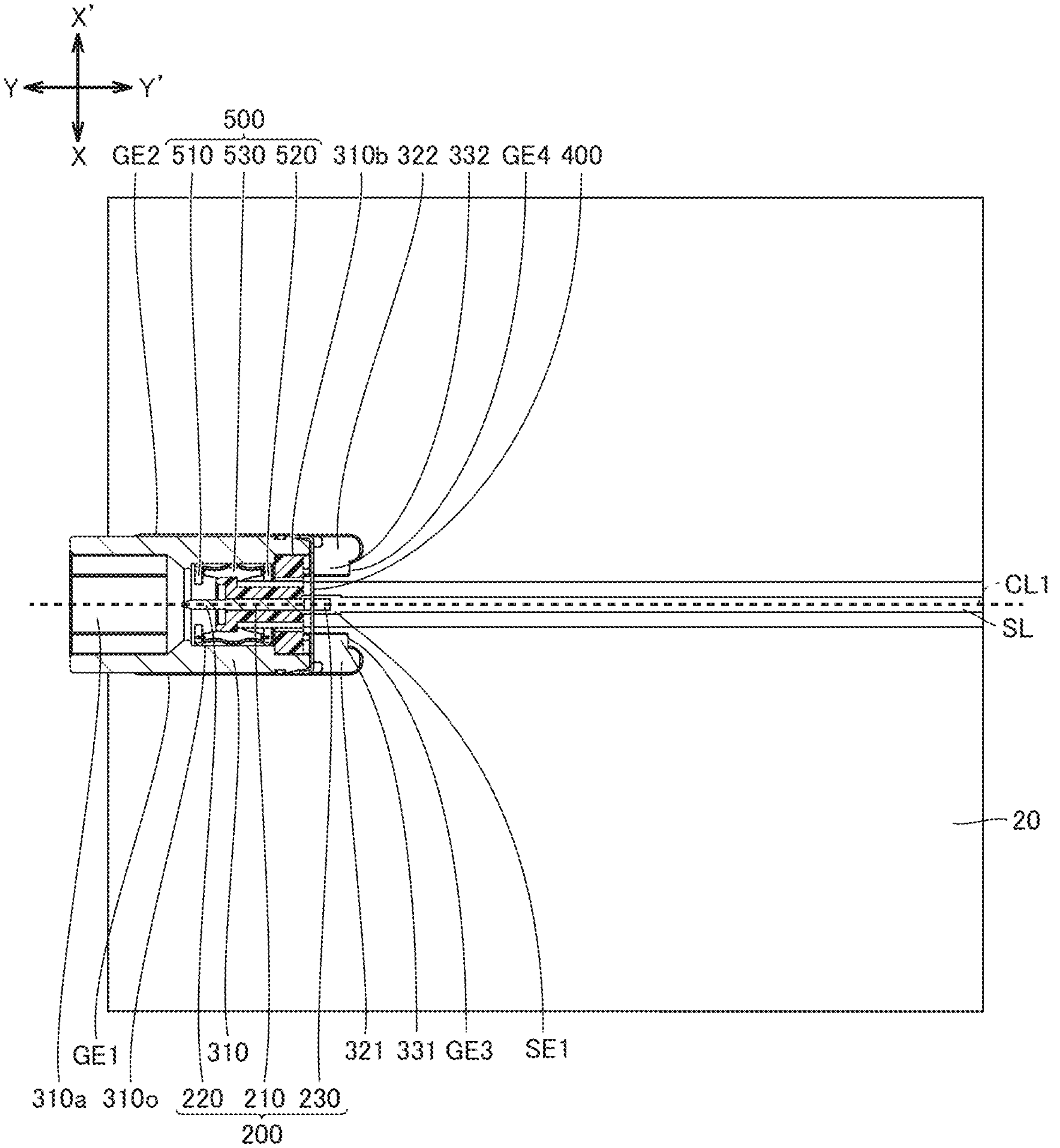
FIG. 11B is a cross-sectional view of the connection structure according to the second embodiment, taken along line 11B-11B in FIG. 11A.

Connection Structure S1' of Connector C1' and Circuit Board B1 According to a Plurality of Embodiments Including Second Embodiment and its Modification Examples A connection structure S1' according to a plurality of embodiments, including the second embodiment of the invention and its modification examples, will be hereinafter described with reference to FIGS. 11A to 11B. FIGS. 11A to 11B illustrate the connection structure S1' of the second embodiment.

FIG. 11A shows the Y-Y' and Z-Z' directions. FIG. 11B shows the Y-Y' and X-X' directions. The Y-Y', Z-Z', and X-X' directions in the connection structure S1' correspond respectively to the Y-Y', Z-Z', and X-X' directions in the description of the connector C1'.

The connection structure S1' has the same configuration as the connection structure S1, except that the connector C1', in place of the connector C1, is mounted on the circuit board B1. The connection structure S1' will be hereinafter described focusing on the differences from the connection structure S1 and omitting overlapping descriptions.

The circuit board B1 may further include a third ground electrode GE3 and a fourth ground electrode GE4. Where the first ground layer 20 is provided on the front face 10*d* of the circuit board B1 (see FIG. 11B), the third ground electrode GE3 and the fourth ground electrode GE4 are surface electrodes constituted by a part of the first ground layer 20. Where the first ground layer 20 is not provided on the front face 10*d* of the circuit board B1 (not illustrated), the third ground electrode GE3 and the fourth ground electrode GE4 are surface electrodes on the front face 10*d* of the circuit board B1. In this case, each of the third ground electrode GE3 and the fourth ground electrode GE4 is connected to the at least one ground layer by a third bypass electrode (not illustrated) and has a same potential as the at least one ground layer.

Where the first leg 321 is disposed on the X-direction side relative to the first wall 331 of the connector C1' and the second leg 322 is disposed on the X'-direction side relative to the second wall 332 of the connector C1', the third ground electrode GE3 of the circuit board B1 is disposed between the signal electrode or electrodes SE1 of the circuit board B1 and the first ground electrode GE1 of the circuit board B1, and the fourth ground electrode GE4 of the circuit board B1 is disposed between the signal electrode or electrodes SE1 of the circuit board B1 and the second ground electrode GE2 of the circuit board B1. Where the first leg 321 is not disposed on the X-direction side relative to the first wall 331 of the connector C1' and the second leg 322 is not disposed on the X'-direction side relative to the second wall 332 of the connector C1', the third ground electrode GE3 of the circuit board B1 is disposed on the X-direction side relative to the signal electrode or electrodes SE1 of the circuit board B1, and the fourth ground electrode GE4 of the circuit board B1 is disposed on the X'-direction side relative to the signal electrode or electrodes SE1 of the circuit board B1. The distance in the X-X' direction between the third ground electrode GE3 and the fourth ground electrode GE4 corresponds to the distance in the X-X' direction between the first wall 331 of the connector C1' and the second wall 332 of the connector C1'. The position in the Y-Y' direction of the third ground electrode GE3 relative to the fourth ground electrode GE4 corresponds to the position in the Y-Y' direction of the first wall 331 of the connector C1'relative to the second wall 332 of the connector C1'.

The first wall 331 of the connector C1' is placed on, and electrically connected to, the third ground electrode GE3. The second wall 332 of the connector C1' is placed on, and electrically connected to, the fourth ground electrode GE4.

The first leg 321, the second leg 322, the first wall 331, and the second wall 332 of the connector C1' are electrically connected respectively to the first ground electrode GE1, the second ground electrode GE2, the third ground electrode GE3, and the fourth ground electrode GE4 of the circuit board B1, so that the shell 300 of the connector C1' has a same potential as the at least one ground layer of the circuit board B1.

Where the connection structure S1' includes the first return path, the first return path is constituted by the ground terminal 500, the shell body 310, the first leg 321, the second leg 322, the first wall 331, the second wall 332, the first ground electrode GE1, the second ground electrode GE2, the third ground electrode GE3, the fourth ground electrode GE4, and the at least one ground layer. Where the connection structure S1' includes the second return path, the second return path is constituted by the ground terminal 500, the shell body 310, the first leg 321, the second leg 322, the first wall 331, the second wall 332, the first ground electrode GE1, the second ground electrode GE2, the third ground electrode GE3, the fourth ground electrode GE4, two or more ground layers, and the first bypass electrode or electrodes. Where the connection structure S1' includes the third return path, the third return path is constituted by the shell body 310, the first leg 321, the second leg 322, the first wall 331, the second wall 332, the first ground electrode GE1, the second ground electrode GE2, the third ground electrode GE3, the fourth ground electrode GE4, and at least one ground layer. Where the connection structure S1' includes the fourth return path, the fourth return path is constituted by the shell body 310, the first leg 321, the second leg 322, the first wall 331, the second wall 332, the first ground electrode GE1, the second ground electrode GE2, the third ground electrode GE3, the fourth ground electrode GE4, two or more ground layers, and the first bypass electrode or electrodes.

Where the resist is provided on the front face 10*d* of the board body 10 of the circuit board B1, the resist further includes a third opening and a fourth opening. The third opening exposes a part or the whole of the end face on the Z-direction side of the third ground electrode GE3. The fourth opening exposes a part or the whole of the end face on the Z-direction side of the fourth ground electrode GE4. The first, second, third, and fourth openings may be separated from each other. Another resist may be provided on the back face 10*c* of the board body 10. The resist or resists can be omitted.

Where the bottom face 310*c* of the shell body 310 of the connector C1' is provided with the protrusion or protrusions 340, the distal end 340*c* of the protrusion 340, or alternatively the distal ends 340*c* of the protrusions 340, abut the circuit board B1 in a state where the first leg 321 and the second leg 322 of the connector C1' are electrically connected respectively to the first ground electrode GE1 and the second ground electrode GE2 of the circuit board B1, where the mounting portion 230 of the or each terminal 200 of the connector C1' is electrically connected to the or a corresponding signal electrode SE1 of the circuit board B1, and where the first wall 331 and the second wall 332 of the connector C1' are electrically connected to respectively to the third ground electrode GE3 and the fourth ground electrode GE4 of the circuit board B1 as described above. This arrangement leaves a gap G between the bottom face 310*c* of the shell body 310 and the circuit board B1. Where the protrusion or protrusions 340 is not provided, the bottom face 310*c* of the shell body 310 is placed on the circuit board B1 in a state where the first leg 321 and the second leg 322 of the connector C1' are electrically connected respectively to the first ground electrode GE1 and the second ground electrode GE2 of the circuit board B1, where the mounting portion 230 of the or each terminal 200 of the connector C1' is electrically connected to the or a corresponding signal electrode SE1 of the circuit board B1, and where the first wall 331 and the second wall 332 of the connector C1' are electrically connected respectively to the third ground electrode GE3 and the fourth ground electrode GE4 of the circuit board B1 as described above.

The third ground electrode GE3 and the fourth ground electrode GE4 can be omitted.

The mating connector CP can be removably inserted into the connector C1' of the connection structure S1', in a similar manner to the connector C1 of the connection structure S1.

The connection structure S1' as described above provides substantially the same technical features and effects as the first to seventh technical features and effects of the connection structure S1. Moreover, the first wall 331 and the second wall 332 of the shell 300 of the connector C1' of the connection structure S1' extend in the Y' direction from the shell body 310, and are disposed on the X- and X'-direction sides relative to the mounting portion 230 of the terminal 200 or relative to the mounting portions 230 of the terminals 200. Where the first wall 331 and the second wall 332 are connected to the third ground electrode GE3 of the circuit board B1 and the fourth ground electrode GE4 of the circuit board B1, the connection structure S1'has improved grounding strength, resulting in that the connection structure S1' provides improved EMI characteristics.

Figure 12A:
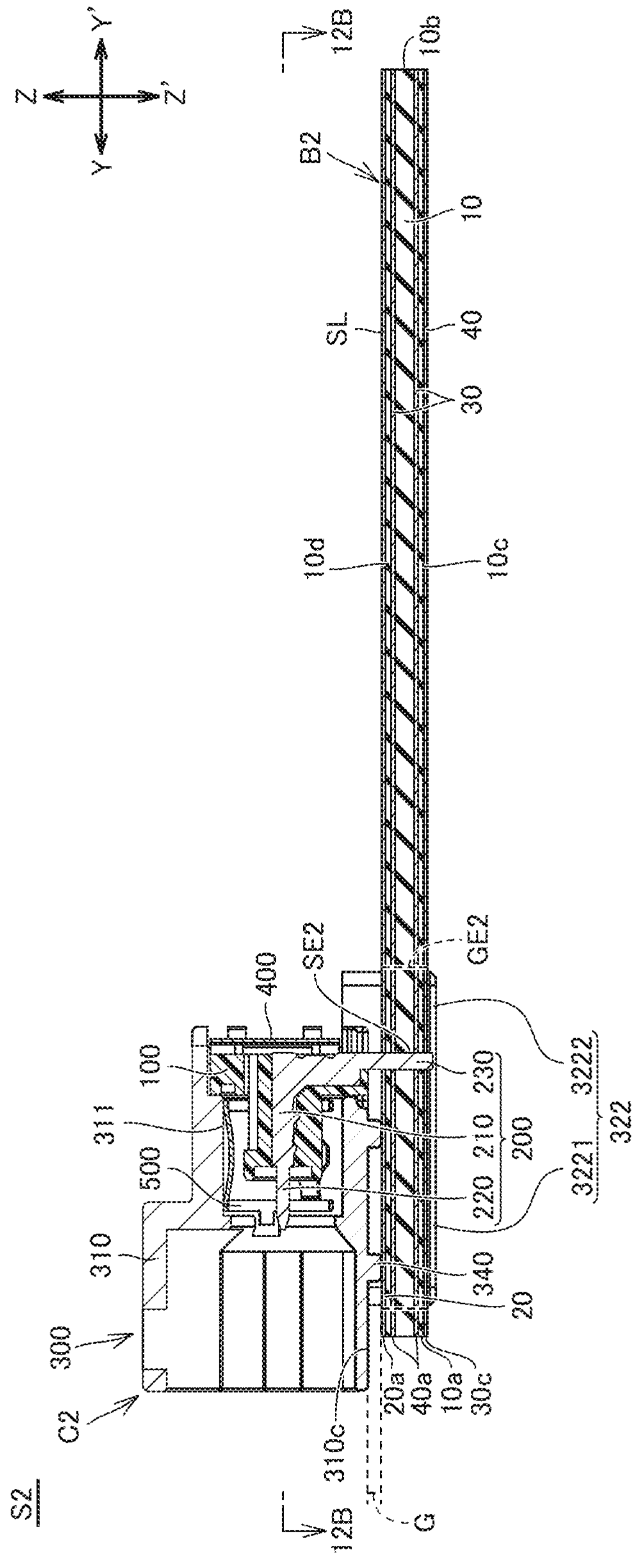
FIG. 12A is a cross-sectional view, which corresponds to FIG. 7B, of a connection structure of a circuit board and the connector according to a third embodiment of the invention.
Figure 12B:
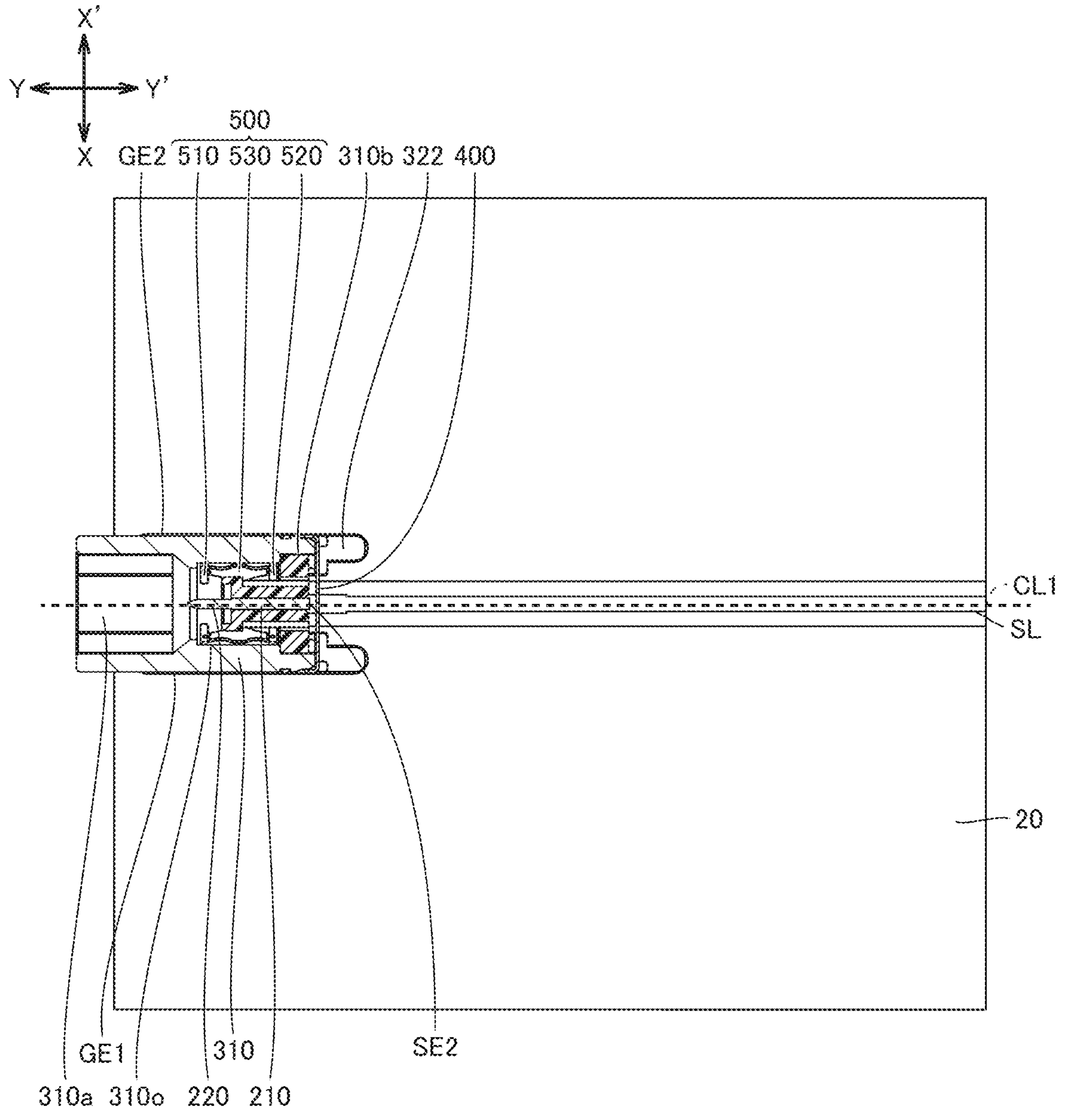
FIG. 12B is a cross-sectional view of the connection structure according to the third embodiment, taken along line 12B-12B in FIG. 12A.

Connection Structure S2 of Connector C2 and Circuit Board B2 According to a Plurality of Embodiments Including Third Embodiment and its Modification Examples A connection structure S2 according to a plurality of embodiments, including a third embodiment of the invention and its modification examples, will be hereinafter described with reference to FIGS. 12A and 12B. FIGS. 12A and 12B illustrate the connection structure S2 of the third embodiment.

FIG. 12A shows the Y-Y' and Z-Z' directions. FIG. 12B shows the Y-Y' and X-X' directions. The Y-Y', Z-Z', and X-X' directions in the connection structure S2 correspond respectively to the Y-Y', Z-Z', and X-X' directions in the description of the connector C2.

The connection structure S2 includes a circuit board B2 and the connector C2 mounted on the circuit board B2.

The circuit board B2 has the same configuration as the circuit board B1, except that at least one signal electrode SE2 is provided in place of the at least one signal electrode SE1. The circuit board B2 in the connection structure S2 will be hereinafter described focusing on the differences from the circuit board B1 of the connection structure S1 and omitting overlapping descriptions. Except the at least one signal electrode SE2, components of the circuit board B2 will be referred to using the same reference numerals as those of the corresponding components of the circuit board B1.

The at least one signal electrode SE2 of the circuit board B2 is a single signal electrode or a plurality of signal electrodes, the number of which corresponds to the number of the at least one terminal 200 of the connector C2. The or each signal electrode SE1 extends through the board body 10 in the Z-Z' direction, opens in in both Y and Y' directions, and is arranged corresponding to the position of the mounting portion 230 of the or corresponding terminal 200. The at least one ground layer is not provided in a region of the circuit board B2 that is provided with the signal electrode or electrodes SE2. The signal electrode or electrodes SE2 and the at least one ground layer are spaced from each other so as not to be in contact with each other.

Where the first leg 321 of the connector C2 includes the first portion 3211 and the second portion 3212, the second leg 322 of the connector C2 includes the first portion 3221 and the second portion 3222, and the first ground electrode GE1 and the second ground electrode GE2 of the circuit board B2 have dimensions in the Y-Y' direction that correspond to those of the first leg 321 and the second leg 322 of the connector C2 (see FIGS. 12A and 12B), the signal electrode or electrodes SE2 is disposed between the first ground electrode GE1 and the second ground electrode GE2.

The or each signal lines SL of the circuit board B2 is directly connected to the or a corresponding signal electrode SE2.

As described above, the connector C2 includes the same configuration as the connector C1, except that that the mounting portion 230 of the or each terminal 200 is different in configuration from the mounting portion 230 of the or each terminal 200 of the connector C1. The connector C2 in the connection structure S2 will be hereinafter described focusing on the differences from the connector C1 of the connection structure S1 and omitting overlapping descriptions.

The mounting portion 230 of the or each terminal 200 of the connector C2 is received in, and electrically connected to, the or a corresponding signal electrode SE2.

Where the connection structure S2 includes the first return path, the first return path of the connection structure S2 is configured similarly to the first return path of the connection structure S1. Where the connection structure S2 includes the second return path, the second return path of the connection structure S2 is configured similarly to the second return path of the connection structure S1. Where the connection structure S2 includes the third return path, the third return path of the connection structure S2 is configured similarly to the first return path of the connection structure S1. Where the connection structure S2 includes the fourth return path, the fourth return path of the connection structure S2 is configured similarly to the fourth return path of the connection structure S1.

Where the bottom face 310*c* of the shell body 310 of the connector C2 is provided with the protrusion or the protrusion 340, the distal end 340*c* of the protrusion 340, or alternatively the distal ends 340*c* of the protrusions 340, abuts the circuit board B2 in a state where the first leg 321 and the second leg 322 of the connector C2 are electrically connected respectively to the first ground electrode GE1 and the second ground electrode GE2 of the circuit board B2, and where the mounting portion 230 of the or each terminal 200 of the connector C2 is electrically connected to the or a corresponding signal electrode SE1 of the circuit board B2 as described above. This arrangement leaves a gap G between the bottom face 310*c* of the shell body 310 and the circuit board B2. Where the protrusion or protrusions 340 is not provided, the bottom face 310*c* of the shell body 310 is placed on the circuit board B2 in a state where the first leg 321 and the second leg 322 of the connector C2 are electrically connected respectively to the first ground electrode GE1 and the second ground electrode GE2 of the circuit board B2, and where the mounting portion 230 of the or each terminal 200 of the connector C2 is electrically connected to the or a corresponding signal electrode SE1 of the circuit board B2 as described above.

The mating connector CP can be removably inserted into the connector C2 of the connection structure S2, in a similar manner to the connector C1 of the connection structure S1.

The connection structure S2 as described above provides substantially the same technical features and effects as the first to seventh technical features and effects of the connection structure S1.

Figure 13A:
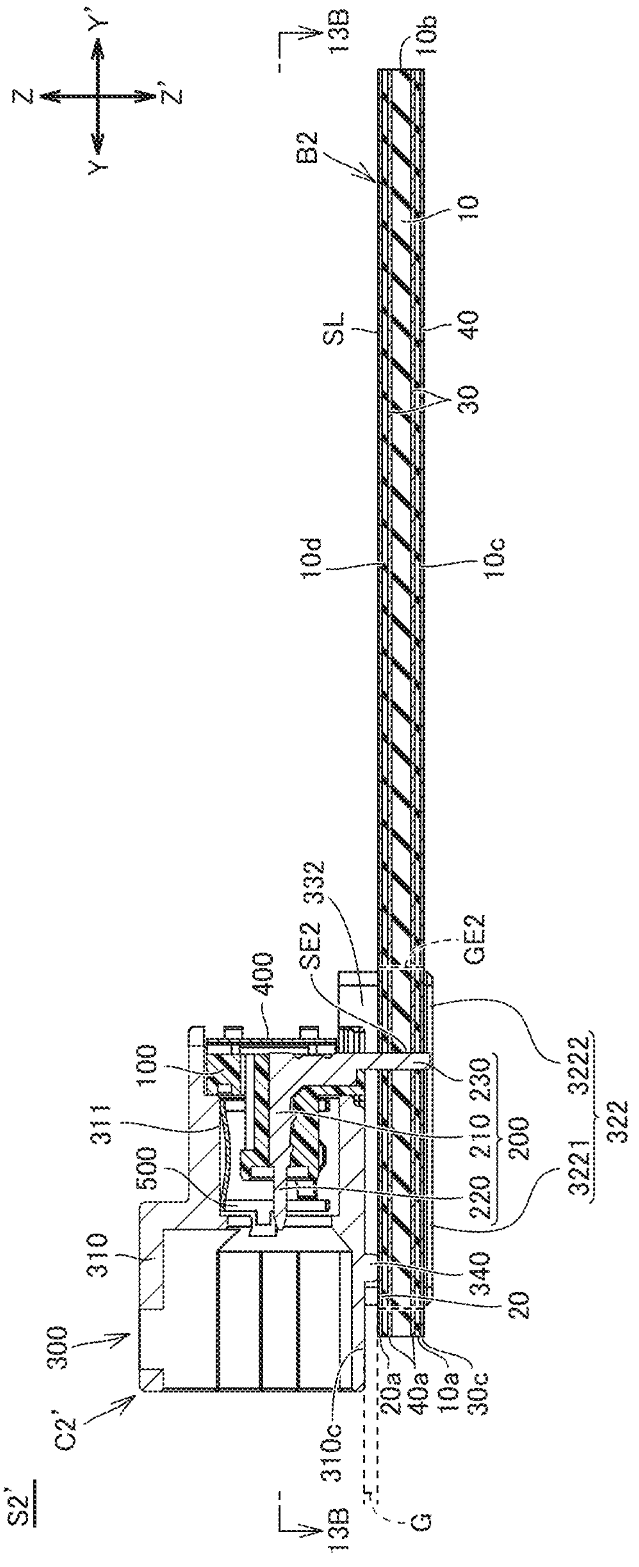
FIG. 13A is a cross-sectional view, which corresponds to FIG. 12A, of a connection structure of a circuit board and the connector according to a fourth embodiment of the invention.
Figure 13B:
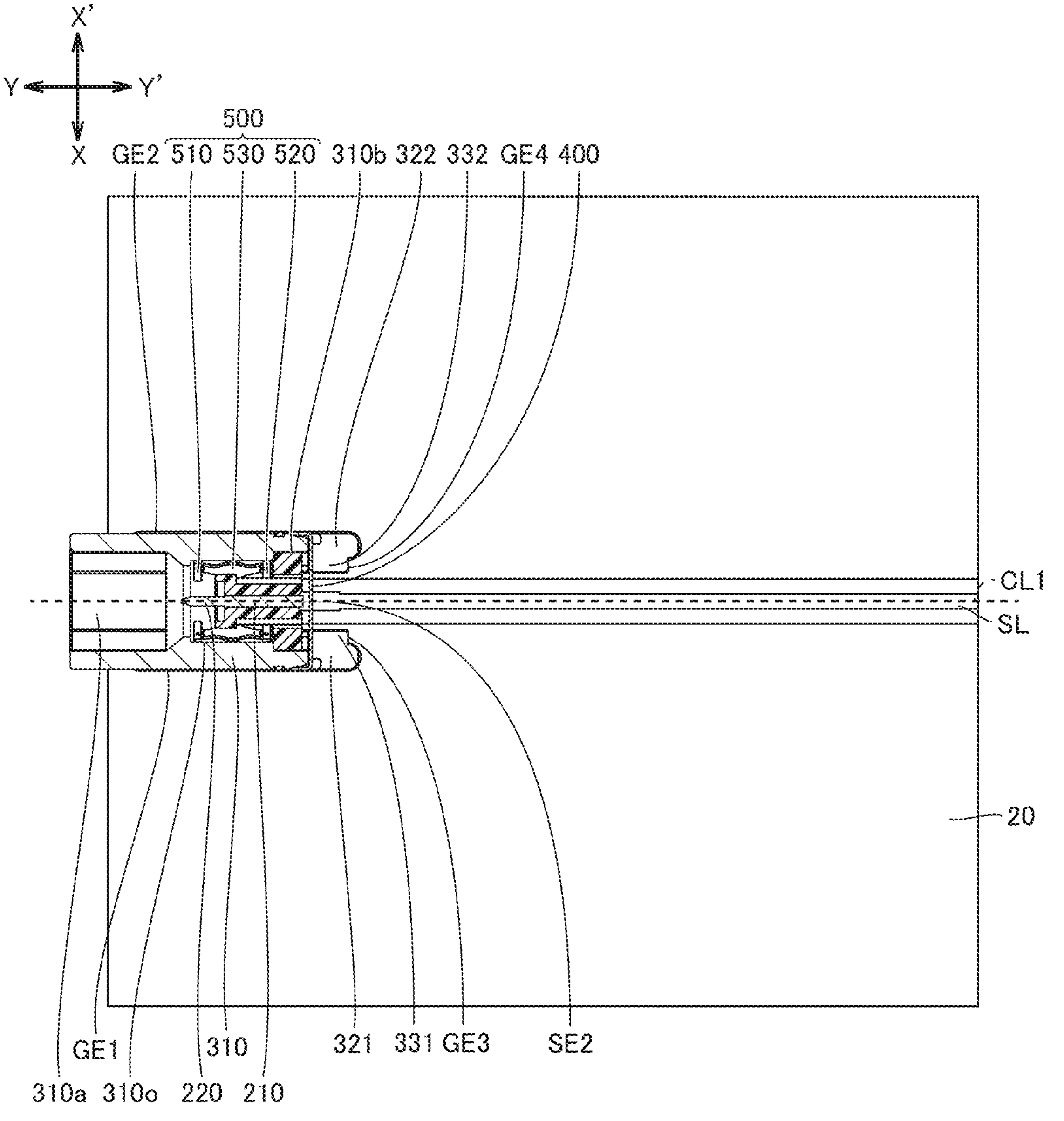
FIG. 13B is a cross-sectional view of the connection structure according to the fourth embodiment, taken along line 13B-13B in FIG. 13A.

Connection Structure S2' of Connector C2' and Circuit Board B2 According to a Plurality of Embodiments Including Fourth Embodiment and its Modification Examples A connection structure S2' according to a plurality of embodiments, including a fourth embodiment of the invention and its modification examples, will be hereinafter described with reference to FIGS. 13A and 13B. FIGS. 13A to 13B illustrate the connection structure S2' of the fourth embodiment.

FIG. 13A shows the Y-Y' and Z-Z' directions. FIG. 13B shows the Y-Y' and X-X' directions. The Y-Y', Z-Z', and X-X' directions in the connection structure S2' correspond respectively to the Y-Y', Z-Z', and X-X' directions in the description of the connector C2'.

The connection structure S2' has the same configuration as the connection structure S2, except that the connector C2', in place of the connector C2, is mounted on the circuit board B2. The connection structure S2' will be hereinafter described focusing on the differences from the connection structure S2 and omitting overlapping descriptions.

The circuit board B2 of the connection structure S2' may further include a third ground electrode GE3 and a fourth ground electrode GE4. The third ground electrode GE3 and the fourth ground electrode GE4 of the circuit board B2 of the connection structure S2' have substantially the same configurations as the third ground electrode GE3 and the fourth ground electrode GE4 of the circuit board B1 of the connection structure S1' except for the following differences. Therefore, the third ground electrode GE3 and the fourth ground electrode GE4 of the circuit board B2 of the connection structure S2' will be hereinafter described focusing on the differences from the third ground electrode GE3 and the fourth ground electrode GE4 of the circuit board B1 of the connection structure S1' and omitting overlapping descriptions.

Differences: Where the first leg 321 is disposed on the X-direction side relative to the first wall 331 of the connector C2' and the second leg 322 is disposed on the X'-direction side relative to the second wall 332 of the connector C2', the third ground electrode GE3 of the circuit board B2 is disposed on a side of an oblique direction (first oblique direction) including components of the Y' and X directions relative to the signal electrode or electrodes SE2 of the circuit board B2 and on the X'-direction side relative to the first ground electrode GE1 of the circuit board B2, and the fourth ground electrode GE4 of the circuit board B2 is disposed on a side of an oblique direction (second oblique direction) including components of the Y' and X' directions relative to the signal electrode or electrodes SE2 of the circuit board B2 and on the X-direction side relative to the second ground electrode GE2 of the circuit board B2. Where the first leg 321 is not disposed on the X-direction side relative to the first wall 331 of the connector C2' and the second leg 322 is not disposed on the X'-direction side relative to the second wall 332 of the connector C2', the third ground electrode GE3 of the circuit board B2 is disposed on the side of the first oblique direction relative to the signal electrode or electrodes SE2 of the circuit board B2, and the fourth ground electrode GE4 of the circuit board B2 is disposed the side of the second oblique direction relative to the signal electrode or electrodes SE2 of the circuit board B2.

The first wall 331 of the connector C2' is placed on, and electrically connected to, the third ground electrode GE3 of the circuit board B2. The second wall 332 of the connector C2' is placed on, and electrically connected to, the fourth ground electrode GE4 of the circuit board B2.

The first leg 321, the second leg 322, the first wall 331, and the second wall 332 of the connector C2' are electrically connected respectively to the first ground electrode GE1, the second ground electrode GE2, the third ground electrode GE3, and the fourth ground electrode GE4 of the circuit board B2, so that the shell 300 of the connector C2' has the same potential as the at least one ground layer of the circuit board B2.

Where the connection structure S2' includes the first return path, the first return path of the connection structure S2' is configured similarly to the first return path of the connection structure S1'. Where the connection structure S2' includes the second return path, the second return path of the connection structure S2' is configured similarly to the second return path of the connection structure S1'. Where the connection structure S2' includes the third return path, the third return path of the connection structure S2' is configured similarly to the first return path of the connection structure S1'. Where the connection structure S2' includes the fourth return path, the fourth return path of the connection structure S2' is configured similarly to the fourth return path of the connection structure S1'.

Where the resist is provided on the front face 10*d* of the board body 10 of the circuit board B2, the resist further includes a third opening and a fourth opening separated from each other. The third opening exposes at least a part of the end face on the Z-direction side of the third ground electrode GE3. The fourth opening exposes at least a part of the end face on the Z-direction side of the fourth ground electrode GE4.

Where the bottom face 310*c* of the shell body 310 of the connector C2' is provided with the protrusion or protrusions 340, the distal end 340*c* of the protrusion 340, or alternatively the distal ends 340*c* of the protrusions 340, abut the circuit board B2 in a state where the first leg 321 and the second leg 322 of the connector C2' are electrically connected respectively to the first ground electrode GE1 and the second ground electrode GE2 of the circuit board B2, where the mounting portion 230 of the or each terminal 200 of the connector C2' is electrically connected to the or a corresponding signal electrode SE1 of the circuit board B2, and where the first wall 331 and the second wall 332 of the connector C2' are electrically connected respectively to the third ground electrode GE3 and the fourth ground electrode GE4 of the circuit board B2 as described above. This arrangement leaves a gap G between the bottom face 310*c* of the shell body 310 and the circuit board B2. Where the protrusion or protrusions 340 are not provided, the bottom face 310*c* of the shell body 310 is placed on the circuit board B2 in a state where the first leg 321 and the second leg 322 of the connector C2' are electrically connected respectively to the first ground electrode GE1 and the second ground electrode GE2 of the circuit board B2, where the mounting portion 230 of the or each terminal 200 of the connector C2' is electrically connected to the or a corresponding signal electrode SE1 of the circuit board B2, and where the first wall 331 and the second wall 332 of the connector C2' are electrically connected respectively to the third ground electrode GE3 and the fourth ground electrode GE4 of the circuit board B2 as described above.

The third ground electrode GE3 and the fourth ground electrode GE4 can be omitted.

The mating connector CP can be removably inserted into the connector C2' of the connection structure S2', in a similar manner to the connector C1 of the connection structure S1.

The connection structure S2' as described above provides substantially the same technical features and effects as the first to seventh technical features and effects of the connection structure S1'

Connection Structure S3 of Connector C3 and Circuit Board B3 According to a Plurality of Embodiments Including Fifth Embodiment and its Modification Examples A connection structure S3 according to a plurality of embodiments, including a fifth embodiment of the invention and its modification examples, will be hereinafter described with reference to FIGS. 14A to 15B. FIGS. 14A to 14D illustrate the connection structure S3 of the fifth embodiment. FIGS. 15A and 15B illustrate a circuit board B3 of the connection structure S3 of the fifth embodiment.

Figure 14A:
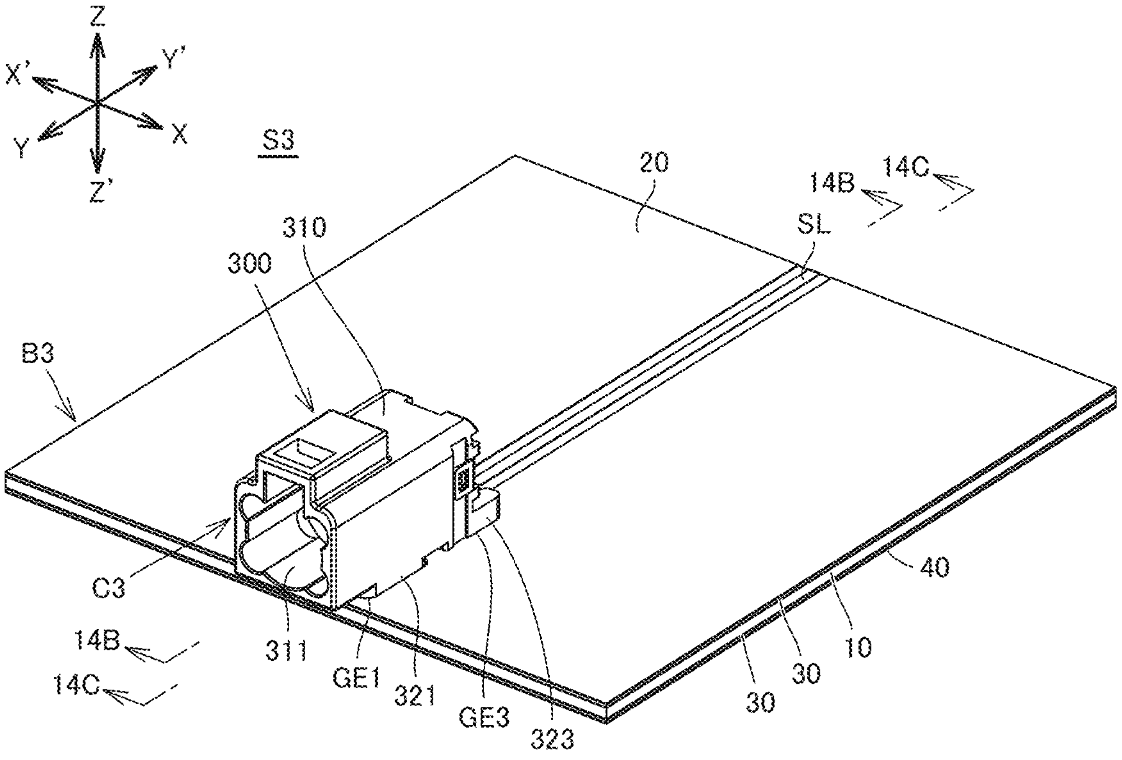
FIG. 14A is a front, top, right side perspective view of a connection structure of a circuit board and the connector according to a fifth embodiment of the invention.
Figure 14B:
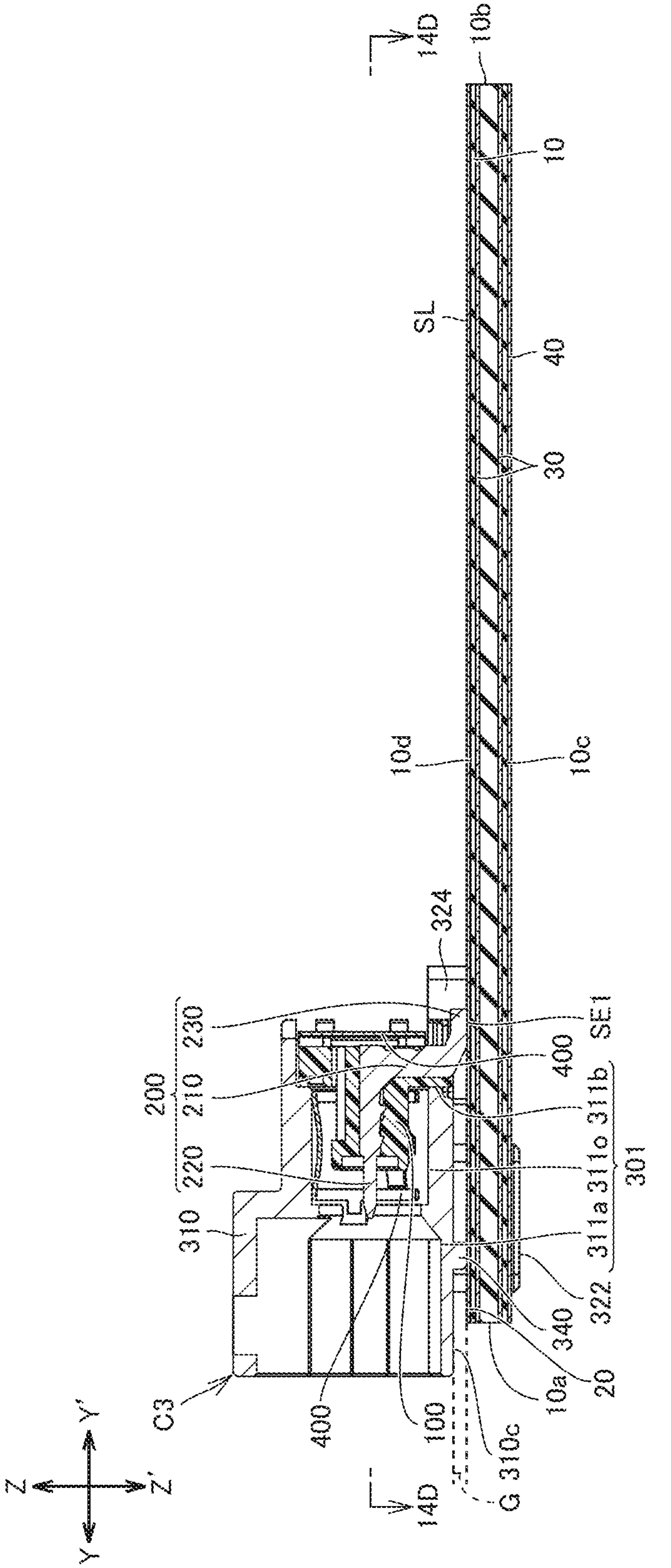
FIG. 14B is a cross-sectional view of the connection structure of the fifth embodiment, taken along line 14B-14B in FIG. 14A.
Figure 14C:
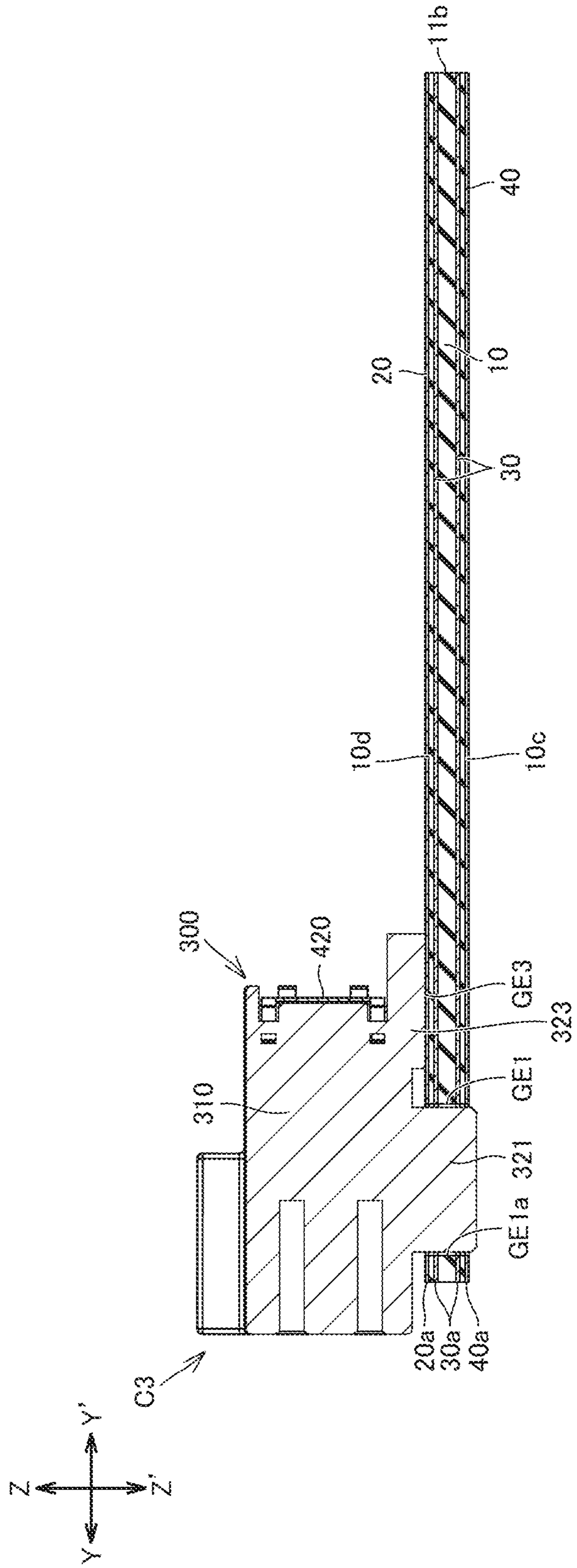
FIG. 14C is a cross-sectional view of the connection structure of the fifth embodiment, taken along line 14C-14C in FIG. 14A.
Figure 14D:
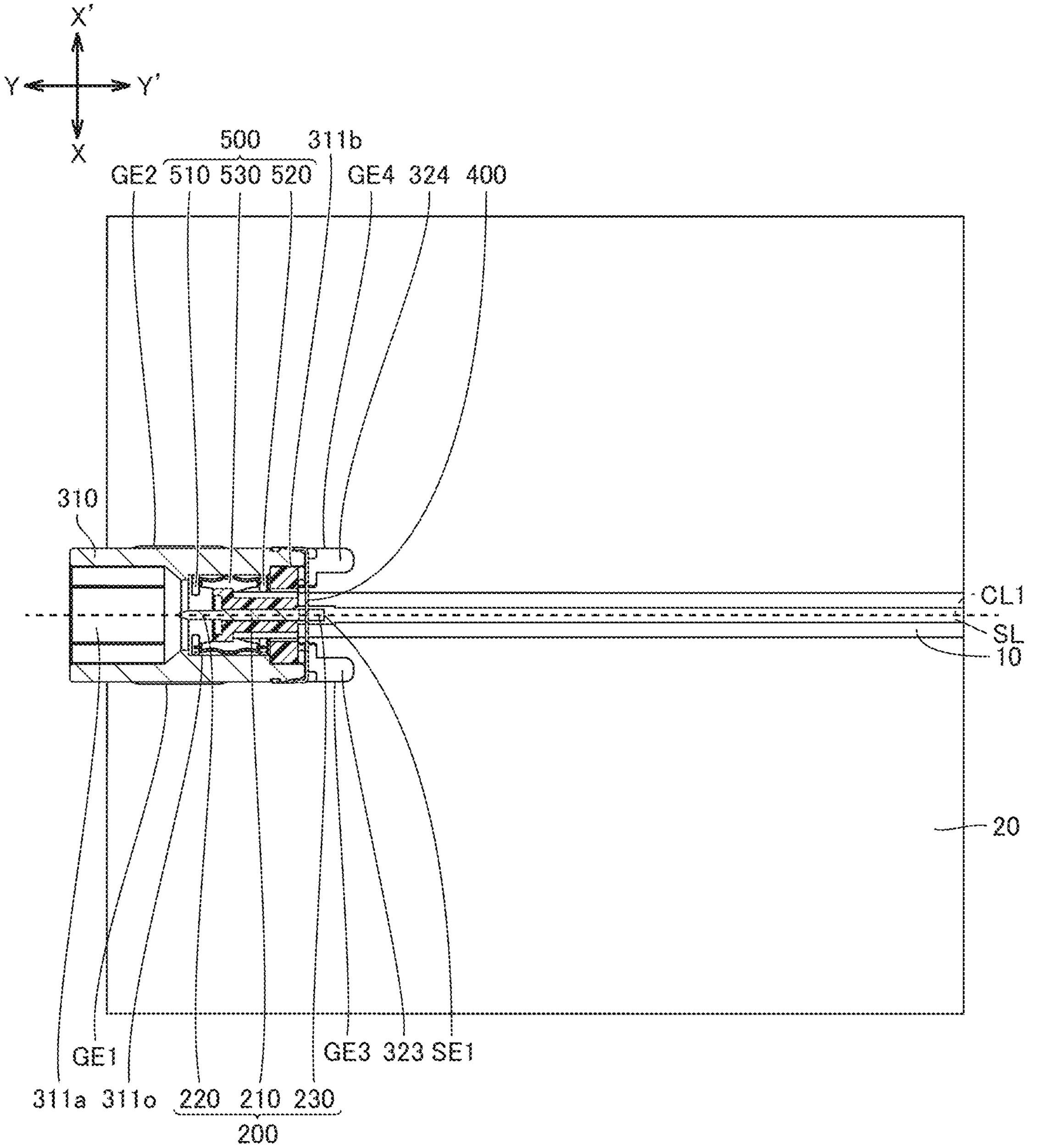
FIG. 14D is a cross-sectional view of the connection structure of the fifth embodiment, taken along line 14D-14D in FIG. 14B.
Figure 15A:
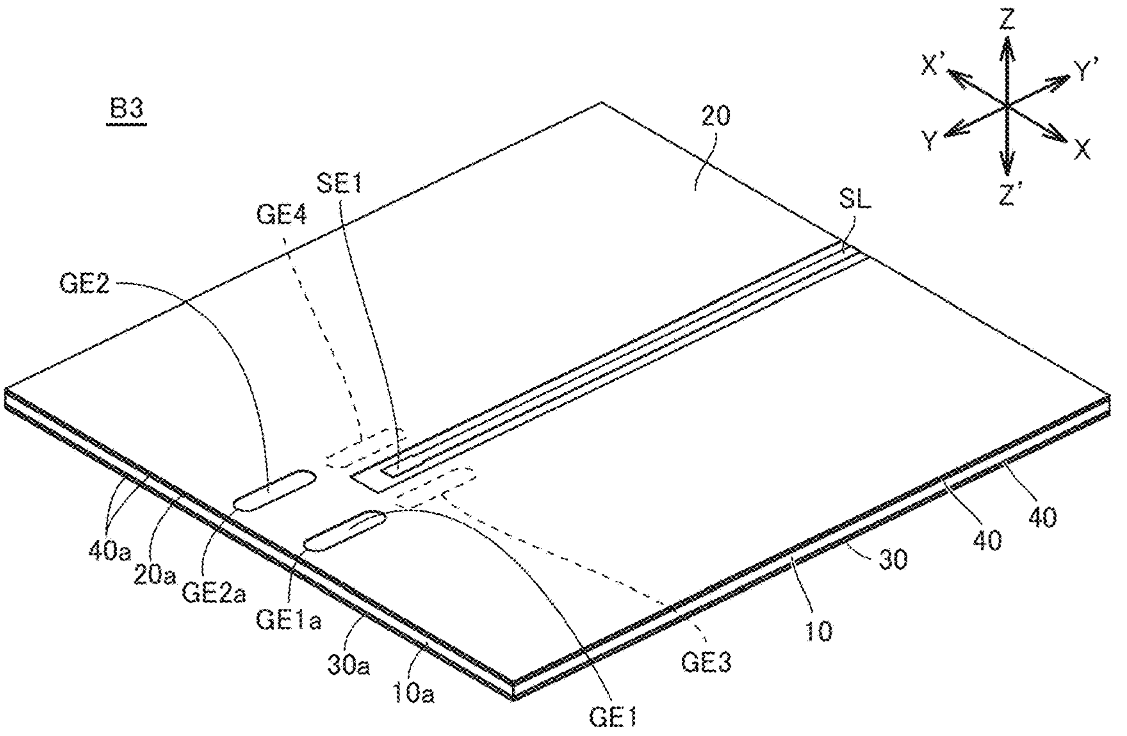
FIG. 15A is a front, top, right side perspective view of the circuit board of the connection structure of the fifth embodiment.
Figure 15B:
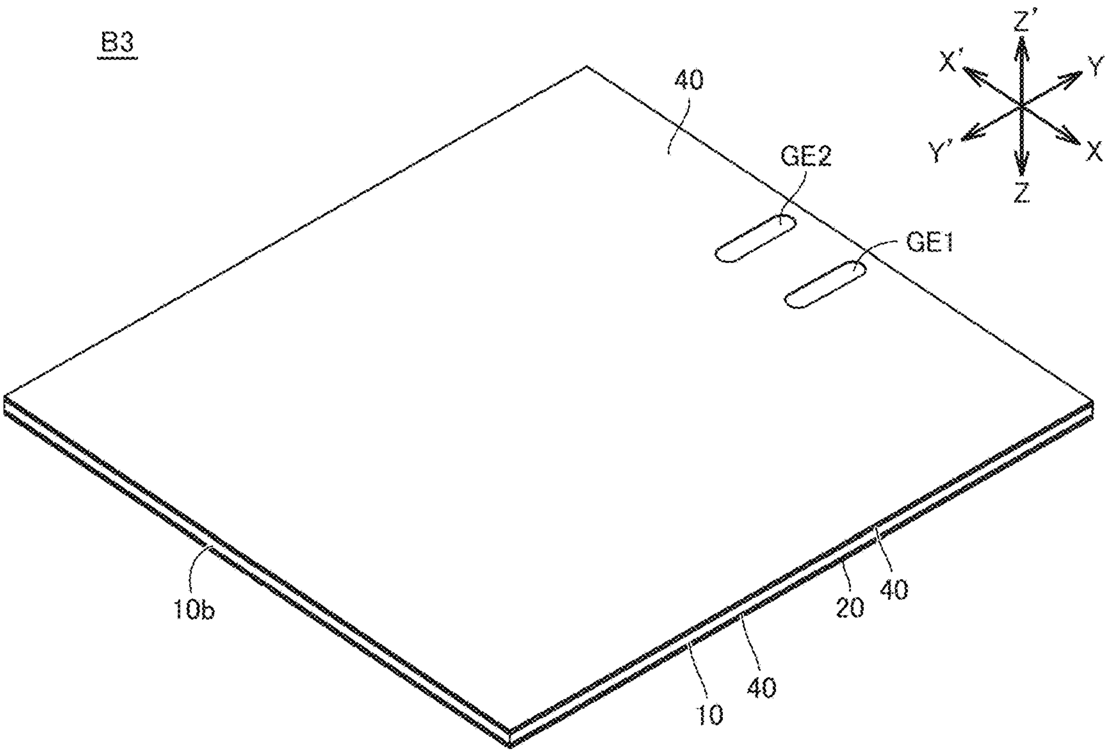
FIG. 15B is a rear, bottom, right side perspective view of the circuit board of the connection structure of the fifth embodiment.

FIGS. 14A, 15A, and 15B illustrate the Y-Y', Z-Z', and X-X' directions. FIGS. 14B and 14C show the Y-Y' and Z-Z' directions. FIG. 14D shows the Y-Y' and X-X' directions. The Y-Y', Z-Z', and X-X' directions in the connection structure S3 correspond respectively to the Y-Y', Z-Z', and X-X' directions in the description of the connector C3.

The connection structure S3 includes the circuit board B3 and the connector C3 mounted on the circuit board B3.

The circuit board B3 of the connection structure S3 has the same configuration as that of the circuit board B1, except that the circuit board B3 further includes a third ground electrode GE3 and a fourth ground electrode GE4, and that the first ground electrode GE1 and the second ground electrode GE2 of the circuit board B3 are respectively smaller in dimension in the Y-Y' direction than the first ground electrode GE1 and the second ground electrode GE2 of the circuit board B1. The circuit board B3 in the connection structure S3 will be hereinafter described focusing on the differences from the circuit board B1 of the connection structure S1 and omitting overlapping descriptions. Except the third ground electrode GE3 and the fourth ground electrode GE4, components of the circuit board B3 will be referred to using the same reference numerals as those of the corresponding components of the circuit board B1.

Where the first ground layer 20 is provided on the front face 10*d* of the circuit board B3 (see FIG. 15A), the third ground electrode GE3 and the fourth ground electrode GE4 are surface electrodes constituted by a part of the first ground layer 20. Where the first ground layer 20 is not provided on the front face 10*d* of the circuit board B3 (not illustrated), the third ground electrode GE3 and the fourth ground electrode GE4 are surface electrodes on the front face 10*d* of the circuit board B3. In this case, each of the third ground electrode GE3 and the fourth ground electrode GE4 is connected to the at least one ground layer by a third bypass electrode (not illustrated) and has a same potential as the at least one ground layer.

The third ground electrode GE3 of the circuit board B3 is spaced from, and located on the X-direction side relative to, the signal electrode or electrodes SE1. The fourth ground electrode GE4 of the circuit board B3 is spaced from, and located on the X'-direction side relative to, the signal electrode or electrodes SE1.

The third ground electrode GE3 and the fourth ground electrode GE4 of the circuit board B3 have cross sections along the Y-Y' and X-X' directions of shapes, sizes, and positions corresponding to the outer shapes, sizes, and positions of the cross sections along the Y-Y' and X-X' directions of the third leg 323 and the fourth leg 324 of the connector C3, respectively. The distance in the X-X' direction between the third ground electrode GE3 and the fourth ground electrode GE4 corresponds to the distance in the X-X' direction between the third leg 323 of the connector C3 and the fourth leg 324 of the connector C3.

The third leg 323 of the connector C3 is placed on, electrically connected to, the third ground electrode GE3. The fourth leg 324 of the connector C3 is placed on, and electrically connected to, the fourth ground electrode GE4.

The first leg 321, the second leg 322, the third leg 323, and the fourth leg 324 of the connector C3 are electrically connected respectively to the first ground electrode GE1, the second ground electrode GE2, the third ground electrode GE3, and the fourth ground electrode GE4 of the circuit board B3, so that the shell 300 of the connector C3 has the same potential as at least one ground layer of the circuit board B3.

Where the connection structure S3 includes the first return path, the first return path of the connection structure S3 is configured similarly to the first return path of the connection structure S1'. Where the connection structure S3 includes the second return path, the second return path of the connection structure S3 is configured similarly to the second return path of the connection structure S1'. Where the connection structure S3 includes the third return path, the third return path of the connection structure S3 is configured similarly to the first return path of the connection structure S1'. Where the connection structure S3 includes the fourth return path, the fourth return path of the connection structure S3 is configured similarly to the fourth return path of the connection structure S1'.

Where the resist is provided on the front face 10*d* of the board body 10 of the circuit board B3, the resist further includes a third opening and a fourth opening. The third opening exposes at least a part of the end face on the Z-direction side of the third ground electrode GE3. The fourth opening exposes at least a part of the end face on the Z-direction side of the fourth ground electrode GE4. The first, second, third, and fourth openings may be separated from each other. Another resist may be provided on the back face 10*c* of the board body 10. The resist or resists can be omitted.

Where the bottom face 310*c* of the shell body 310 of the connector C3 is provided with the protrusion or protrusions 340, the distal end 340*c* of the protrusion 340, or alternatively the distal ends 340*c* of the protrusions 340, abut the circuit board B3 in a state where the first leg 321 and the second leg 322 of the connector C3 are electrically connected respectively to the first ground electrode GE1 and the second ground electrode GE2 of the circuit board B3, where the mounting portion 230 of the or each terminal 200 of the connector C3 is electrically connected to the or a corresponding signal electrode SE1 of the circuit board B3, and where the first wall 331 and the second wall 332 of the connector C3 are electrically connected respectively to the third ground electrode GE3 and the fourth ground electrode GE4 of the circuit board B3 as described above. This arrangement leaves a gap G between the bottom face 310*c* of the shell body 310 and the circuit board B3. Where the protrusion or protrusions 340 is not provided, the bottom face 310*c* of the shell body 310 is placed on the circuit board B3 in a state where the first leg 321 and the second leg 322 of the connector C3 are electrically connected respectively to the first ground electrode GE1 and the second ground electrode GE2 of the circuit board B3, where the mounting portion 230 of the or each terminal 200 of the connector C3 is electrically connected to the or a corresponding signal electrode SE1 of the circuit board B3, and where the first wall 331 and the second wall 332 of the connector C3 are electrically connected respectively to the third ground electrode GE3 and the fourth ground electrode GE4 of the circuit board B3 as described above.

Here, a third simulation and a fourth simulation were performed as described below. On the EM simulator (Ansys HFSS from Ansys) used for the third simulation, the following conditions were set for the third simulation.

Figure 16A:
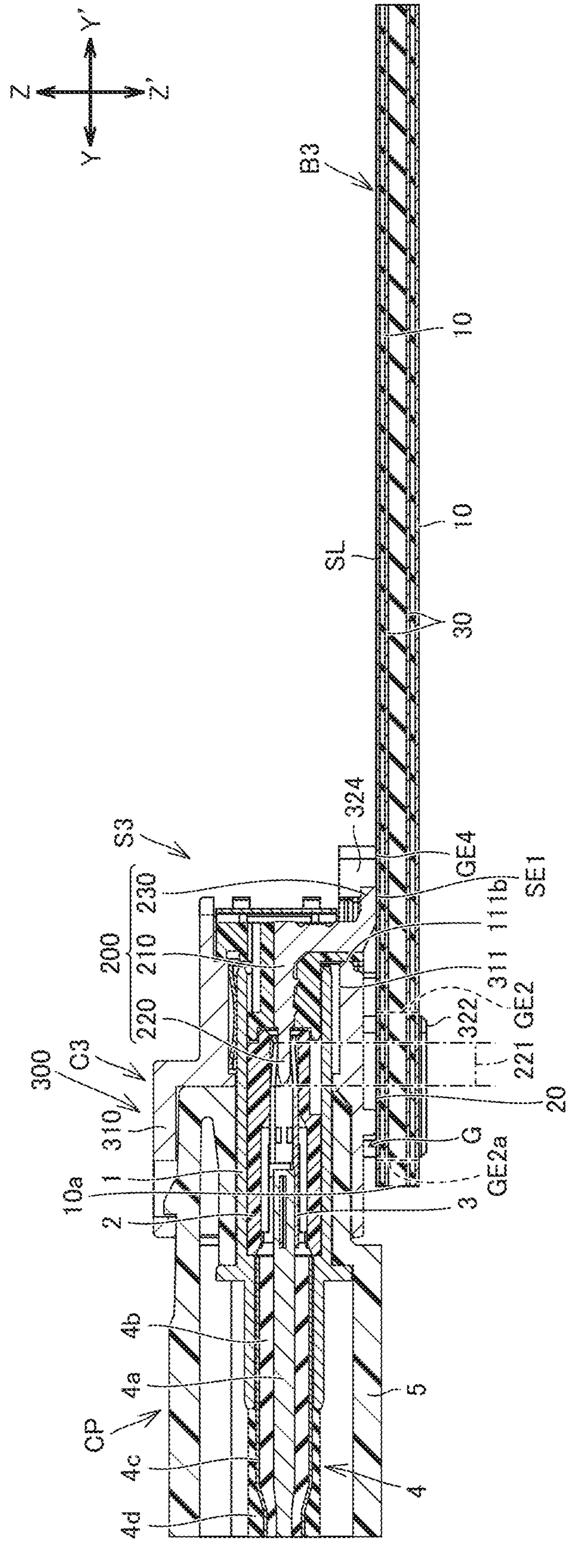
FIG. 16A is a cross-sectional view, which corresponds to FIG. 14B, illustrating the connection structure of the fifth embodiment and a mating connector connected to the connector of the connection structure.

[Conditions of third simulation] The EM simulator used information obtained by modeling the connection structure S3 of the fifth embodiment and the mating connector CP connected to the connector C3 of the connection structure S3. The configurations of the connection structure S3 and the mating connector CP are as illustrated in FIG. 16A.

The connector C3 of the connection structure S3, configured as illustrated in FIGS. 5A to 5E and FIGS. 14A to 14D, includes one body 100, one terminal 200, one shell 300, one shield cover 400, and one ground terminal 500. The connector C3 has the same configuration as the connector C1 of the connection structure S1 of the first embodiment, except that the first leg 321 and the second leg 322 are respectively smaller in dimension in the Y-Y' direction than the first leg 321 and the second leg 322 of the connector C1 of the connection structure S1 of the first embodiment, and that the third leg 323 and the fourth leg 324 are additionally provided.

The first leg 321 and the second leg 322 of the shell 300 are positioned and shaped substantially symmetrically to each other across the first imaginary line CL1 that serves the axis of line symmetry. The third leg 323 and the fourth leg 324 of the shell 300 are positioned and shaped substantially symmetrically to each other across the first imaginary line CL1 that serves the axis of line symmetry.

The first end 321*a* of the first leg 321 and the first end 322*a* of the second leg 322 are located on the Y-direction side relative to the first end 220*a* of the distal portion 220 of the terminal 200. The second end 321*b* of the first leg 321 and the second end 322*b* of the second leg 322 are located slightly on the Y-direction side relative to a midpoint in the Y-Y' direction between the first end 220*a* of the distal portion 220 of the terminal 200 and the end on the Y-direction side of the second portion of the main body 210 of the terminal 200.

The first end 323*a* of the third leg 323 and the first end 324*a* of the fourth leg 324 are located slightly on the Y'-direction side relative to the above midpoint and located on the Y-direction side relative to the first end 230*a* of the mounting portion 230 of the terminal 200. The second end 323*b* of the third leg 323 and the second end 324*b* of the fourth leg 324 are located on the Y'-direction side relative to the second end 230*b* of the mounting portion 230 of the terminal 200. The third end 323*c* of the third leg 323 and the third end 324*c* of the fourth leg 324 are substantially coincident in the Z-Z' direction with the third end 230*c* of the mounting portion 230 of the terminal 200. The fourth end 323*d* of the third leg 323 and the fourth end 324*d* of the fourth leg 324 are located on the Z-direction side relative to the fourth end 230*d* of the mounting portion 230 of the terminal 200.

The circuit board B3 of the connection structure S3, configured as illustrated in FIGS. 14A to 15B, is a so-called four-layer circuit board. The circuit board B3 has the same configuration as the circuit board B1 of the connection structure S1 of the first embodiment, except that the first ground electrode GE1 and the second ground electrode GE2 are respectively smaller in dimension in the Y-Y' direction than the first ground electrode GE1 and the second ground electrode GE2 of the circuit board B1 of the connection structure S1 of the first embodiment, and that the third ground electrode GE3 and the fourth ground electrode GE4 are additionally provided.

The first ground electrode GE1 and the second ground electrode GE2 have cross sections along the Y-Y' and X-X' directions of shapes, sizes, and positions corresponding to the outer shapes, sizes, and positions of the cross sections along the Y-Y' and X-X' directions of the first leg 321 and the second leg 322 of the connector C3, respectively. The first leg 321 and the second leg 322 of the connector C3 are respectively received in, and soldered to, the first ground electrode GE1 and the second ground electrode GE2. The first ground electrode GE1 and the second ground electrode GE2 are led (connected) to the first ground layer 20, the second ground layer 30, and the two third ground layers 40.

The third ground electrode GE3 and the fourth ground electrode GE4 have cross sections along the Y-Y' and X-X' directions of shapes, sizes, and positions corresponding to the outer shapes, sizes, and positions of the cross sections along the Y-Y' and X-X' directions of the third leg 323 and the fourth leg 324 of the connector C3. The third leg 323 and the fourth leg 324 of the connector C3 are respectively placed on, and soldered to, the third ground electrode GE3 and the fourth ground electrode GE4. The third ground electrode GE3 and the fourth ground electrode GE4 are led (connected) to the first ground layer 20, the second ground layer 30, and the two third ground layers 40.

The first ground layer 20, the second ground layer 30, and the two third ground layers 40 of the circuit board B3 of the connection structure S3 have the same configurations as those of the circuit board B1 of the connection structure S1 of the first embodiment.

The mating connector CP has the same configuration as that used in the first simulation.

In the third simulation, a signal input port IN3 is set at the end on the Y'-direction side of the signal line SL of the circuit board B3 of the connection structure S3, and a signal output port OUT3 is set at the end on the Y-direction side of the inner conductor 4*a* of the cable 4 of the mating connector CP. The transmission speed of signals to be inputted from the input port IN3 is set to 12 Gbps.

On the EM simulator (Ansys HFSS from Ansys) used for the fourth simulation, the following conditions were set for the fourth simulation.

[Conditions of fourth simulation] The EM simulator used information obtained by modeling a connection structure SC2 of a second comparative example and the mating connector CP connected to a connector CC2 of the connection structure SC1. The connection structure SC2 and the mating connector CP of the second comparative example are configured as illustrated in FIG. 16B.

Figure 16B:
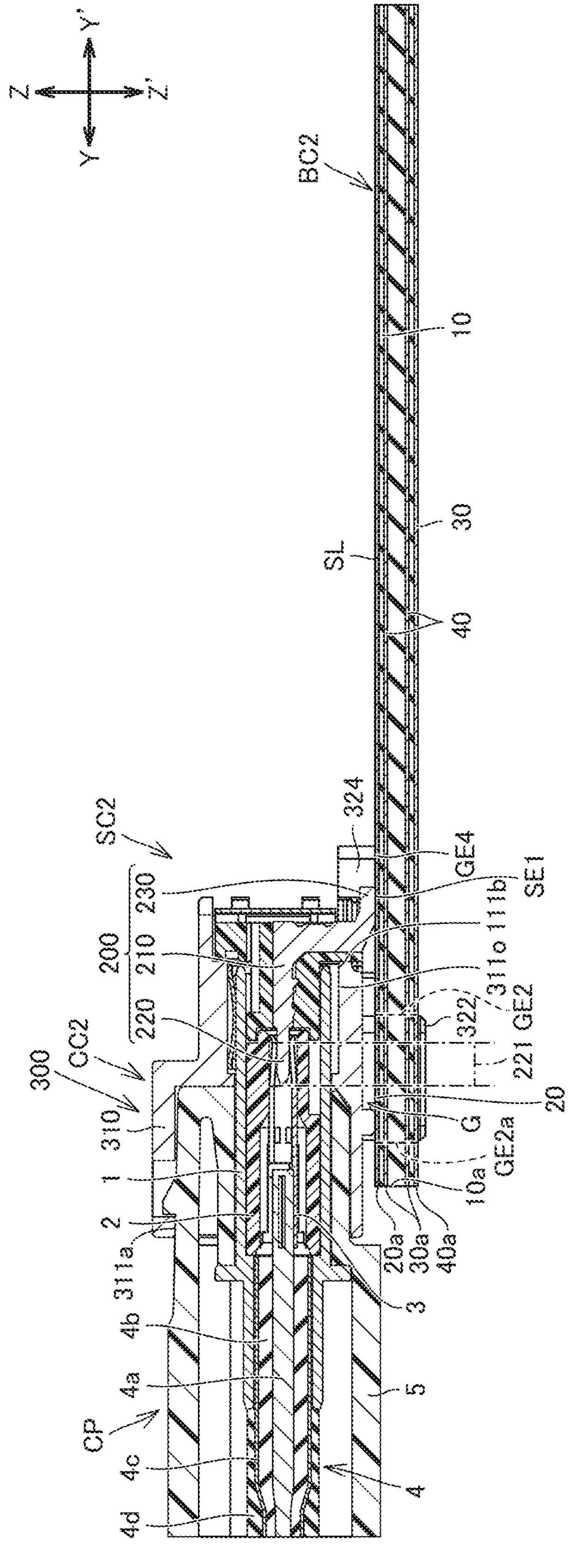
FIG. 16B is a cross-sectional view, which corresponds to FIG. 14B, illustrating a connection structure of a circuit board and a connector of a second comparative example, and the mating connector connected to the connector of the connection structure.

The connector CC2 of the connection structure SC2, configured as illustrated in FIG. 16B, has the same configuration as that of the connector C3 of the connection structure S3 of the fifth embodiment, except that the first leg 321 and the second leg 322 of the connector CC2 are respectively smaller in dimension in the Y-Y' direction than the first leg 321 and the second leg 322 of the connector C3 of the connection structure S3 of the fifth embodiment, and that the first end 321*a* of the first leg 321 and the first end 322*a* of the second leg 322 are located at positions shifted in the Y' direction by about 1.5 mm from the positions of the first end 321*a* of the first leg 321 and the first end 322*a* of the second leg 322 of the connector C3 of the connection structure S3 of the fifth embodiment. Components of the connector CC2 will be referred to using the same reference numerals as those of the corresponding components of the connector C3 of the connection structure S3 of the fifth embodiment, and overlapping descriptions will be omitted.

A circuit board BC2 of the connection structure SC2 has the same configuration as the circuit board B3 of the connection structure S3 of the fifth embodiment, except that the first ground electrode GE1 and the second ground electrode GE2 have smaller dimensions in the Y-Y' direction in accordance with the dimensions in the Y-Y' direction of the first leg 321 and the second leg 322 of the connector CC2, and that the first end GE1*a* of the first ground electrode GE1 and the first end GE2*a* of the second ground electrode GE2 are located at positions shifted in the Y' direction by about 1.5 mm relative to the positions of the first end GE1*a* of the first ground electrode GE1 and the first end GE2*a* of the second ground electrode GE2 of the circuit board B3 of the connection structure S3 of the fifth embodiment. Components of the circuit board BC2 will be referred to using the same reference numerals as those of the corresponding components of the circuit board B3 of the connection structure S3 of the fifth embodiment, and overlapping descriptions will be omitted.

A linear distance in the Y-Y' direction from each of the first end GE1*a* of the first ground electrode GE1 and the first end GE2*a* of the second ground electrode GE2 to the first end 10*a* of the board body 10 is approximately 2.5 mm. Accordingly, the first ground layer 20, the second ground layer 30, and the two third ground layers 40 each have an open stub having a dimension in the Y-Y' direction of approximately 2.5 mm from the first end GE1*a* of the first ground electrode GE1 and the first end GE2*a* of the second ground electrode GE2 to the first end 10*a* of the board body 10.

The mating connector CP has the same configuration as that used in the first simulation.

Under the condition of the third simulation, electric field intensity analysis (third simulation) was performed using the EM simulator. Also, under the conditions of the fourth simulation, electric field intensity analysis (fourth simulation) was performed using the EM simulator.

Figure 17A:
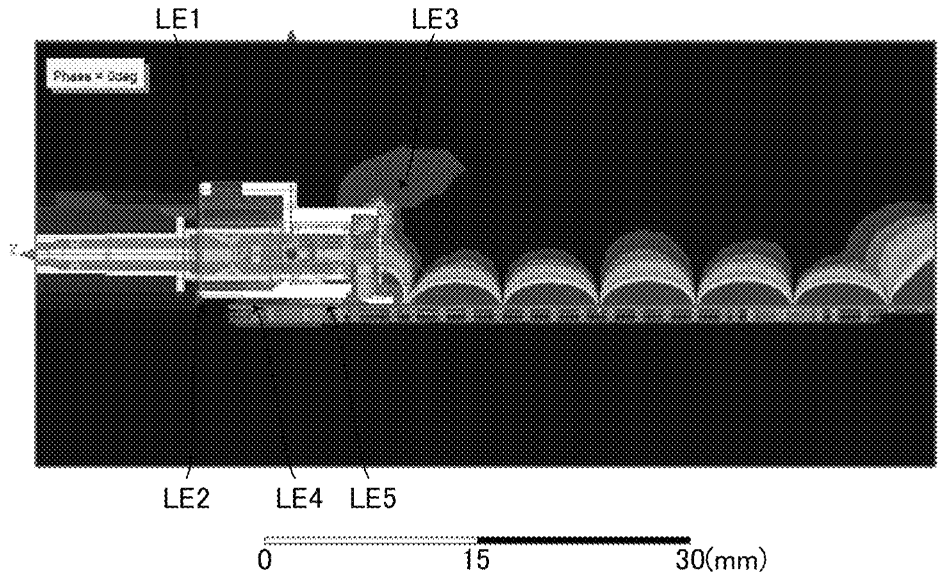
FIG. 17A shows results of electric field intensity analysis (simulation) performed on the connection structure of the fifth embodiment.
Figure 17B:
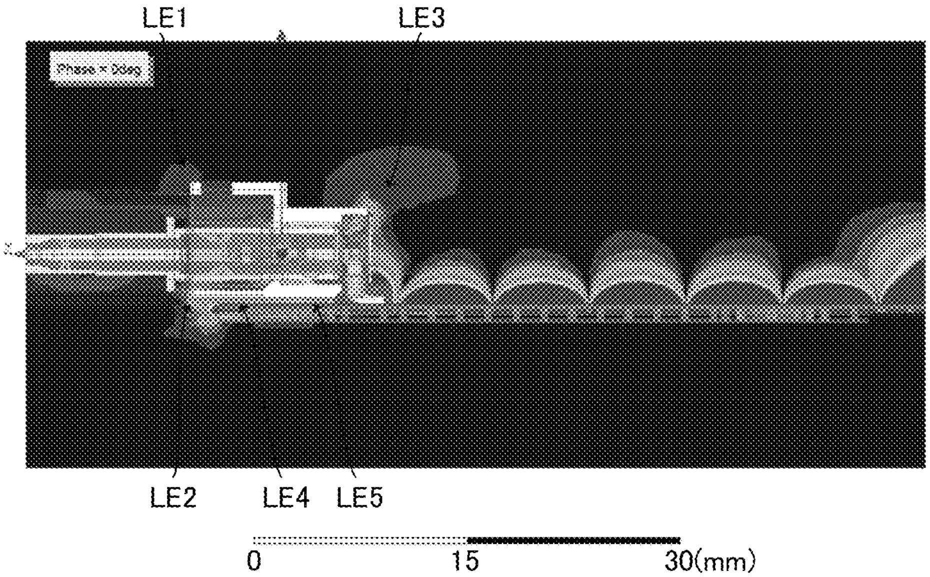
FIG. 17 shows results of electric field intensity analysis (simulation) performed on the connection structure of the second comparative example.

[Results of third and fourth simulations] FIG. 17A shows the result of electric field intensity analysis of the third simulation, and FIG. 17B shows the result of electric field intensity analysis of the fourth simulation. First, comparisons will now be made between the results of the second simulation and the results of the third simulation with reference to FIGS. 10B and 17A.

[Comparison between results of second simulation and results of the third simulation] The results of electric field intensity analysis of the second simulation indicate leakage of the electric field is observed in the areas, which are indicated by arrows LE1, LE2, and LE3, in the vicinity of the edge portions of the shell body 310 of the connector CC1. In contrast, the results of electric field intensity analysis of the third simulation indicate little leakage of the electric fields in the areas LE1 and LE2. Although the results of electric field intensity analysis of the third simulation indicate leakage of the electric field in the area LE3, the leakage of the electric field in the area LE3 is reduced, as compared with the leakage of the electric field in the area LE3 in the results of electric field intensity analysis of the second simulation (see FIG. 10B). The reasons for these are given below. The first leg 321 and the second leg 322 are disposed on opposite sides in the X-X' direction relative to the distal portion 220 and the portion on the Y-direction side of the first portion of the main body 210 of the terminal 200 such that the first end 321*a* of the first leg 321 and the first end 322*a* of the second leg 322 are located on the Y-direction side relative to the first end 220*a* of the distal portion 220 of the terminal 200, and that the second end 321*b* of the first leg 321 and the second end 322*b* of the second leg 322 are located slightly on the Y-direction side relative to the midpoint in the Y-Y' direction between the first end 220*a* of the distal portion 220 of the terminal 200 and the end on the Y-direction side of the second portion of the main body 210 of the terminal 200. The third leg 323 and the fourth leg 324 are disposed on opposite sides in the X-X' direction relative to the portion on the Y'-direction side of the first portion of the main body 210, the second portion of the main body 210, and the mounting portion 230 of the terminal 200 such that the first end 323*a* of the third leg 323 and the first end 324*a* of the fourth leg 324 are located slightly on the Y'-direction side relative to the above midpoint and located on the Y-direction side relative to the first end 230*a* of the mounting portion 230 of the terminal 200, and that the second end 323*b* of the third leg 323 and the second end 324*b* of the fourth leg 324 are located on the Y'-direction side relative to the second end 230*b* of the mounting portion 230 of the terminal 200. In other words, in the distal portion 220 and the portion on the Y-direction side of the first portion of the main body 210 of the terminal 200, the terminal 200 is substantially at the same distance in the X-X' direction to the first leg 321 and to the second leg 322, and the first leg 321 and the second leg 322 exist near the distal portion 220 and the portion on the Y-direction side of the first portion of the main body 210 of the terminal 200. Also, in the portion on the Y'-direction side of the first portion of the main body 210, the second portion of the main body 210, and the mounting portion 230 of the terminal 200, the terminal 200 is substantially at the same distance in the X-X' direction to the third leg 323 and to the fourth leg 324, and the third leg 323 and the fourth leg 324 exist near the portion on the Y'-direction side of the first portion of the main body 210, the second portion of the main body 210, and the mounting portion 230 of the terminal 200. As a result, the grounding strength of the connection structure S1 is stronger than that of the connection structure SC1. Therefore, even if high-speed signals are reflected in at least one of the following portions (at least one reflecting factor portion): a portion where the terminal 200 of the connector C3 changes in shape, a portion where the mounting portion 230 of the terminal 200 is connected to the circuit board B3, a contact point where the terminal 200 of the connector C3 is in contact with the terminal 3 of the mating connector CP, the portion 221 (open stub) from the contact point to the first end 220*a* of the distal portion 220 of the terminal 200, etc., and reflection noise resulting from the reflection of high-speed signals is radiated from the at least one reflecting factor portion to the shell body 310, the noise will easily flow from at least one of the first leg 321, the second leg 322, the third leg 323, and the fourth leg 324 of the shell body 310 to at least one of the first ground layer 20, the second ground layer 30, and the two third ground layers 40 of the circuit board BC1. Therefore, it is considered that the noise is hardly re-radiated from the edge portions of the shell body 310 to the outside.

The results of electric field intensity analysis of the second simulation also indicate leakage of the electric field is observed in the area indicated by the arrow LE4 between the shell body 310 of the connector CC1 and the circuit board BC1. In contrast, the results of electric field intensity analysis of the third simulation indicate little leakage of the electric fields in the area LE4, for the same reason as the reason why the results of electric field intensity analysis of the first simulation indicate little leakage of the electric fields in the area LE4.

The results of electric field intensity analysis of the second simulation also indicate leakage of the electric field is observed in the area indicated by the arrow LE5 between the shell body 310 of the connector CC1 and the circuit board BC1. In contrast, the results of electric field intensity analysis of the third simulation indicate little leakage of the electric fields in the area LE5 for the following reasons. There are areas where no legs exist between the first leg 321 and the third leg 323 and between the second leg 322 and the fourth leg 324 of the connector C3, but the areas where no legs exist in the connector C3 are smaller than the areas where no legs exist in the connector CC1. This is because the first leg 321, the third leg 323, the second leg 322, and the fourth leg of the connector C3 are ridges elongated in the Y-Y' direction, and the distance in the Y-Y' direction between the first leg 321 and the third leg 323 and the distance in the Y-Y' direction between the second leg 322 and the fourth leg 324 of the connector C3 are respectively smaller than the distance in the Y-Y' direction between the first front leg 371F and the first rear leg 372R and the distance in the Y-Y' direction between the second front leg 371F and the second rear leg 372R of the connector CC1. In this arrangement, even if the gap G is left between the bottom face 310*c* of the shell body 310 of the connector C3 and the circuit board B3 because of the provision of the protrusion 340 of the connector C3, the connector C3 will not be reduced in shielding effect like the connector CC1 does. It is therefore considered that noise superimposed on high-speed signals transmitted by the terminal 200 is less likely to be radiated directly from the terminal 200 to the outside of the connector C3.

[Comparison between results of first simulation and results of third simulation] Next, comparisons between the results of the first simulation and the results of the third simulation, with reference to FIGS. 10A and 17A, show no substantial differences in leakage of the electric field in the entire area including the areas LE1 to LE5 for the following reasons. there are areas where no legs exist between the first leg 321 and the third leg 323 and between the second leg 322 and the fourth leg 324 of the connector C3, but these areas are small. Except for these areas, the connector C3 and the connector C1 have the same configurations that, over the entire length in the Y-Y' direction of the terminal 200, a pair of legs, which are ridges elongated in the Y-Y' direction, are disposed on the X- and X'-direction sides relative to the terminal 200 and located substantially at the same distance in the X-X' direction from the terminal 200. It should be noted in the "pair of legs" of the connector C3, one of the legs is constituted by the first leg 321 and the third leg 323, and the other leg is constituted by the second leg 322 and the fourth leg 324. In the "pair of legs" of the connector C1, one of the legs being the first leg 321, and the other leg is the second leg 322. Other conditions of the first and third simulations are substantially the same. For the above reasons, it is considered that the leakage of the electric field in the all areas including the areas LE1 to LE5 is similarly reduced in the first and third simulations.

[Comparison between results of third simulation and results of fourth simulation] Lastly, comparisons between the results of the third simulation and the results of the fourth simulation, with reference to FIGS. 17A and 17B, show as follows. The leakage of the electric field in the areas LE1 to LE3 and LE5 is substantially the same in the two simulations, while the leakage of the electric field in the area LE4 in the results of electric field intensity analysis of the third simulation is reduced, compared to the leakage of the electric field in the area LE4 in the results of electric field intensity analysis of the fourth simulation for the following reasons. The conditions of the third and fourth simulations are substantially the same, except that the first leg 321 and the second leg 322 of the connector CC2 are respectively smaller in dimension in the Y-Y' direction than the first leg 321 and the second leg 322 of the connector C3, that the first end 321*a* of the first leg 321 and the first end 322*a* of the second leg 322 of the connector CC2 are located at positions shifted in the Y' direction by approximately 1.5 mm from the positions of the first end 321*a* of the first leg 321 and the first end 322*a* of the second leg 322, respectively, of the connector C3, that the first ground electrode GE1 and the second ground electrode GE2 of the circuit board BC2 have shorter dimensions in the Y-Y' direction in accordance with the dimensions in the Y-Y' direction of the first leg 321 and the second leg 322 of the connector CC2, that the open stub of each of the first ground layer 20, the second ground layer 30, and the third ground layers 40 of the circuit board B3 have a dimension in the Y-Y' direction of approximately 1 mm, which is shorter than the dimension in the Y-Y' direction of approximately by 1.5 mm of the open stub of each of the first ground layer 20, the second ground layer 30, and the third ground layers 40 of the circuit board BC2 of the second comparative example. This indicates that suppressed re-radiation of noise from the open stubs of the first ground layer 20, the second ground layer 30, and the third ground layers 40 in the vicinity of the area LE4, by setting the dimension in the Y-Y' direction of the open stub of each of the first ground layer 20, the second ground layer 30, and the third ground layers 40 to approximately 1 mm as in the circuit board B3. However, it is not possible to eliminate all the open stubs for the following reason. If all the open stubs were eliminated by arranging all of the first end 20*a* of the first ground layer 20, the first end 30*a* of the second ground layer 30, and the first end 40*a* of the third ground layers 40 substantially at the same position in the Y-Y' direction as, or alternatively on the Y'-direction relative to, the first end GE1*a* of the first ground electrode GE1 and the first end GE2*a* of the second ground electrode GE2, then the shielding effect would be lost in the region from the first end GE1*a* of the first ground electrode GE1 and the first end GE2*a* of the second ground electrode GE2 to the first end 10*a* of the board body 10, causing a new electric field leakage. In other words, it is required to provide at least one of the open stubs of the first ground layer 20, the second ground layer 30, and the third ground layers 40.

The connection structure S3 as described above provides the following technical features and effects.

First technical features and effects: The connection structure S3 has improved EMI characteristics for the following reasons. The first leg 321 and the second leg 322 of the shell 300 of the connector C3 are ridges elongated in the Y-Y' direction and are located on the X- and X'-direction sides relative to the distal portion 220 and the portion on the Y-direction side of the first portion of the main body 210 of the terminal 200, or alternatively relative to the distal portions 220 and the portions on the Y-direction side of the first portions of the main bodies 210 of the terminals 200, so that the first leg 321 and the second leg 322 of the shell 300 of the connector C3 are at a shorter distance to the distal portion 220 and the portion on the Y-direction side of the first portion of the main body 210 of the terminal 200, or alternatively to the distal portions 220 and the portions on the Y-direction side of the first portions of the main bodies 210 of the terminals 200. Also, the third leg 323 and the fourth leg 324 of the shell 300 of the connector C3 are ridges elongated in the Y-Y' direction and are located on the X- and X'-direction sides relative to the mounting portion 230 of the terminal 200, or alternatively relative to the mounting portions 230 of the terminals 200, so that the third leg 323 and the fourth leg 324 of the shell 300 of the connector C3 are at a short distance to the mounting portion 230 of the terminal 200, or alternatively to the mounting portions 230 of the terminals 200. Moreover, the first leg 321, the second leg 322, the third leg 323, and the fourth leg 324, which are ridges elongated in the Y-Y' direction, have larger cross-sectional areas in cross section along the Y-Y' and Z-Z' directions than the cross-sectional areas in the corresponding cross sections of the front legs and the rear legs of the connector of the conventional example. The first leg 321, the second leg 322, the third leg 323, and the fourth leg 324 of the connector C3 are connected to the at least one ground layer of the circuit board B3 via the first ground electrode GE1, the second ground electrode GE2, the third ground electrode GE3, and the fourth ground electrode GE4 of the circuit board B3, resulting in that the connection structure S3 has improved grounding strength. For this reason, even if high-speed signals transmitted through the at least one terminal 200 are reflected on the at least one terminal 200 to cause generation of noise to be radiated to the shell body 310 of the shell 300, the noise will easily flow from at least one of the first leg 321, the second leg 322, the third leg 323, and the fourth leg 324 of the connector C3, through at least one of the first ground electrode GE1, the second ground electrode GE2, the third ground electrode GE3, and the fourth ground electrode GE4 of the circuit board B3, to the at least one ground layer of the circuit board B3. This suppresses the possibility that the noise radiated to the shell body 310 of the shell 300 is re-radiated from an edge portion of the shell body 310 before flowing from at least one of the first leg 321, the second leg 322, the third leg 323, and the fourth leg 324 of the connector C3, through at least one of the first ground electrode GE1, the second ground electrode GE2, the third ground electrode GE3, and the fourth ground electrode GE4 of the circuit board B3, to the at least one ground layer of the circuit board B3.

Second technical features and effects: The connection structure S3 has improved EMC characteristics for the following reasons. Being ridges elongated in the Y-Y' direction, the first leg 321, the second leg 322, the third leg 323, and the fourth leg 324 of the connector C3 each have a larger cross-sectional area in cross section along the Y-Y' and Z-Z' directions. This reduces impedances of the first leg 321, the second leg 322, the third leg 323, and the fourth leg 324, strengthening the grounding of the connection structure S3. The connection structure S3 thus has improved EMC characteristics. Where the at least one ground layer of the circuit board B3 is a plurality of ground layers (all ground layers, or alternatively a plurality of ground layers of a number smaller than the number of all ground layers), and the plurality of ground layers are led (connected) to the first ground electrode GE1, the second ground electrode GE2, the third ground electrode GE3, and the fourth ground electrode GE4 of the circuit board B3, the first leg 321, the second leg 322, the third leg 323, and the fourth leg 324 are connected to the plurality of ground layers of the circuit board B3 via the first ground electrode GE1, the second ground electrode GE2, the third ground electrode GE3, and the fourth ground electrode GE4. This also strengthens the ground of the connection structure S3.

Third to seventh technical features and effects: The connection structure S3 provides substantially the same technical features and effects as the third to seventh technical features and effects of the connection structure S1.

Eighth technical features and effects: The connector C3 is configured such that the first leg 321 and the second leg 322 have shorter dimensions in the Y-Y' direction, and such that the third leg 323 and the fourth leg 324 are placed on, and soldered to, the third ground electrode GE3 and the fourth ground electrode GE4 of the circuit board B3. This configuration enables reduction of the amount of solder paste required for the first leg 321, the second leg 322, the third leg 323, and the fourth leg 324 of the connector C3, compared to the amount of solder paste required for the first leg 321 and the second leg 322 of the connector C1. Therefore, the connection structure S3 can reduced in cost for mounting the connector C3 on the circuit board B3.

Figure 18A:
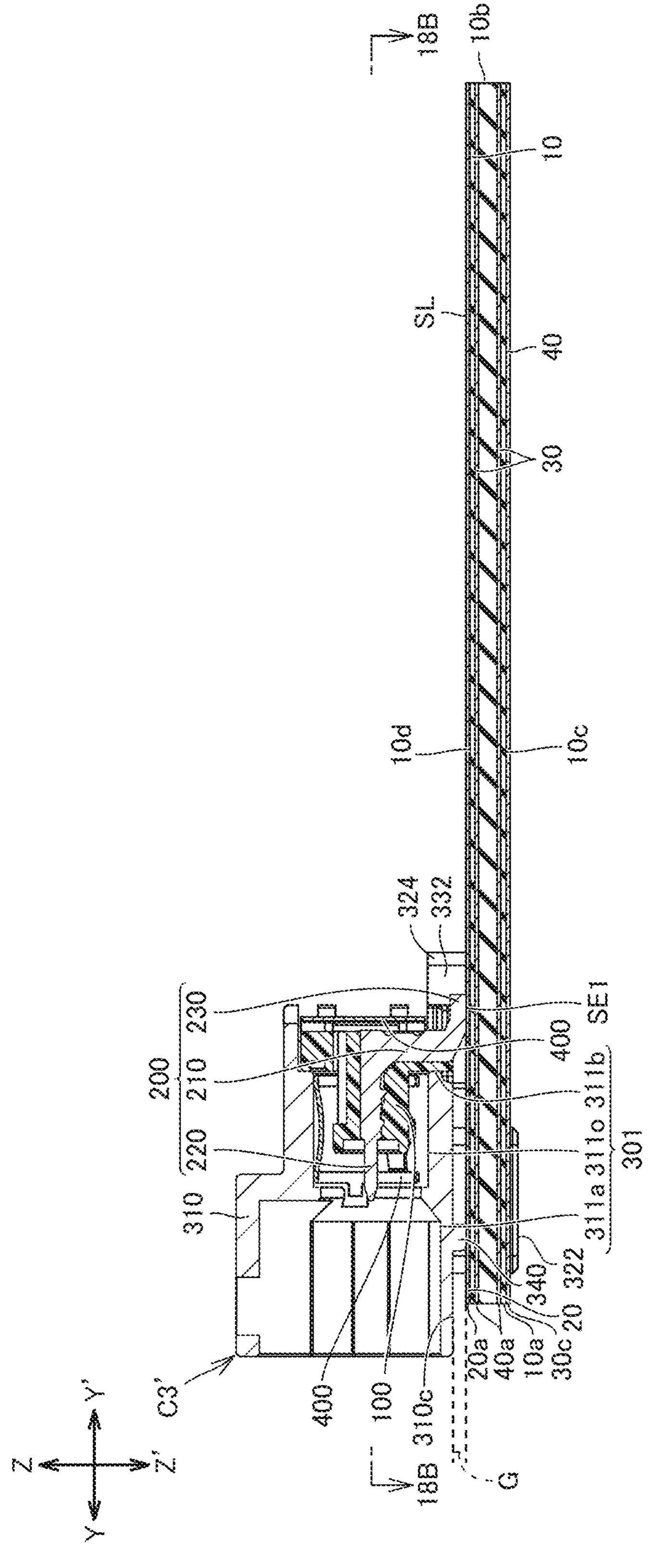
FIG. 18A is a cross-sectional view, which corresponds to FIG. 14B, of a connection structure between a circuit board and the connector according to the sixth embodiment of the invention.
Figure 18B:
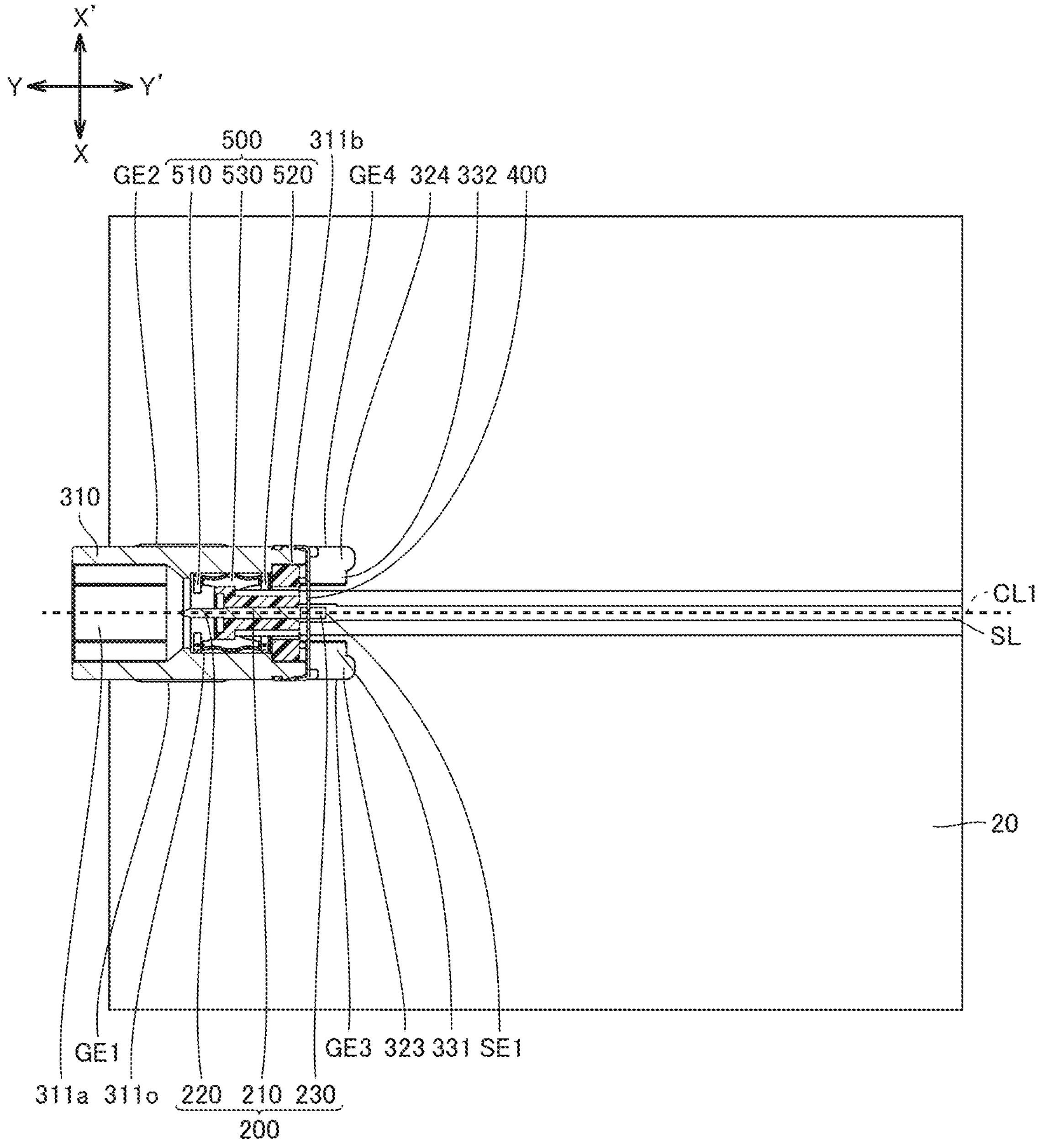
FIG. 18B is a cross-sectional view of the connection structure according to the sixth embodiment, taken along line 18B-18B in FIG. 18A.

Connection Structure S3' of Connector C3' and Circuit Board B3 According to a Plurality of Embodiments Including Sixth Embodiment and its Modification Examples A connection structure S3' according to a plurality of embodiments, including a sixth embodiment of the invention and its modification examples, will be hereinafter described with reference to FIGS. 18A to 18B. FIGS. 18A to 18B illustrate the connection structure S3' of the sixth embodiment.

FIG. 18A shows the Y-Y' and Z-Z' directions. FIG. 18B shows the Y-Y' and X-X' directions. The Y-Y', Z-Z', and X-X' directions in the connection structure S3' correspond respectively to the Y-Y', Z-Z', and X-X' directions in the description of the connector C3'.

The connection structure S3' has the same configuration as the connection structure S3, except that the connector C3', in place of the connector C3, is mounted on the circuit board B3. The connection structure S3' will be hereinafter described focusing on the differences from the connection structure S3 and omitting overlapping descriptions.

The third ground electrode GE3 of the circuit board B3 of the connection structure S3' may have a dimension in the X-X' that corresponds to the sum of the dimensions in the X-X' direction of the third leg 323 and the first wall 331 of the connector C3', and the fourth ground electrode GE4 of the circuit board B3 of the connection structure S3' may have a dimension in the X-X' that corresponds to the sum of the dimensions in the X-X' direction of the fourth leg 324 and the second wall 332 of the connector C3'. In this case, the distance in the X-X' direction between the third ground electrode GE3 and the fourth ground electrode GE4 of the circuit board B3 of the connection structure S3' corresponds to the distance in the X-X' direction between the first wall 331 and the second wall 332 of the connector C3'. The third leg 323 and the first wall 331 of the connector C3' are placed on, and electrically connected to, the third ground electrode GE3 of the circuit board B3. The fourth leg 324 and the second wall 332 of the connector C3' are placed on, and electrically connected to, the fourth ground electrode GE4 of the circuit board B3.

The third ground electrode GE3 and the fourth ground electrode GE4 of the circuit board B3 of the connection structure S3' may have the same configuration as the third ground electrode GE3 and the fourth ground electrode GE4, respectively, of the circuit board B3 of the connection structure S3. In this case, the first wall 331 and the second wall 332 of the connector C3' of the connection structure S3' are not placed on the third ground electrode GE3 and the fourth ground electrode GE4, respectively.

Where the connection structure S3' includes the first return path, the first return path of the connection structure S3' is configured similarly to the first return path of the connection structure S1'. Where the connection structure S3' includes the second return path, the second return path of the connection structure S3' is configured similarly to the second return path of the connection structure S1'. Where the connection structure S3' includes the third return path, the third return path of the connection structure S3' is configured similarly to the first return path of the connection structure S1'. Where the connection structure S3' includes the fourth return path, the fourth return path of the connection structure S3' is configured similarly to the fourth return path of the connection structure S1'.

The mating connector CP can be removably inserted into the connector C3' of the connection structure S3', in a similar manner to the connector C1 of the connection structure S1.

The connection structure S3' as described above provides substantially the same technical features and effects as the first to eighth technical features and effects of the connection structure S3.

It should be noted that the circuit board B3 or B3' may be provided with the signal electrode or electrodes SE2, in place of the signal electrode or electrodes SE1. In this case, the mounting portion 230 of the or each terminal 200 of the connector C3 or C3' may extend in the Z' direction from the third end 210*c* of the main body 210 of the terminal 200 and be received in, and electrically connected to, the or a corresponding signal electrode SE2.

The first direction of the invention may be any direction that corresponds to the axial direction of the tubular shell body of the shell of the connector. The second direction of the invention may be any direction that is substantially orthogonal to the first direction. The third direction of the invention may be any direction that is substantially orthogonal to the first and second directions.

REFERENCE SIGNS LIST

S1, S1', S2, S2', S3, S3', SC1, SC2: connection structure C1, C1', C2, C2', C3, C3', CC1, CC2: connector 100: body

200: terminal; 210: main body; 220: distal portion; 230: mounting portion

210*a*: first end of main body; 210*b*: second end of main body; 210*c*: third end of main body; 220*a*: first end of distal portion; 220*b*: second end of distal portion; 230*a*: first end of mounting portion; 230*b*: second end of mounting portion; 230*c*: third end of mounting portion; 230*d*: fourth end of mounting portion

300: shell; 310: shell body; 321: first leg; 322: second leg; 323: third leg; 324: fourth leg; 331: first wall; 332: second wall; 340: protrusion; 350: engaging portion; 360: second coupling portion

310*c*: bottom face of shell body; 310*e*: first side face of shell body; 310*f*: second side face of shell body; 311: internal space; 311*a*: first space; 3110: central space; 311*b*: second space; 321*a*: first end of first leg; 321*b*: second end of first leg; 321*c*: third end of first leg; 321*d*: fourth end of first leg; 322*a*: first end of second leg; 322*b*: second end of second leg; 322*c*: third end of second leg; 322*d*: fourth end of second leg; 323*a*: first end of third leg; 323*b*: second end of third leg; 323*c*: third end of third leg; 323*d*: fourth end of third leg; 324*a*: first end of fourth leg; 324*b*: second end of fourth leg; 324*c*: third end of fourth leg; 324*d*: fourth end of fourth leg; 331*a*: first end of first wall; 331*b*: second end of first wall; 331*c*: third end of first wall; 331*d*: fourth end of first wall; 332*a*: first end of second wall; 332*b*: second end of second wall; 332*c*: third end of second wall; 332*d*: fourth end of second wall; 340*c*: distal end of protrusion

400: shield cover

410: cover; 420: engaging arm

500: ground terminal

510: first ring; 520: second ring; 530: contact spring

B1, B2, B3, BC1, BC2: circuit board

10: board body; 20: first ground layer; 30: second ground layer; 40: third ground layer; GE1: first ground electrode; GE2: second ground electrode; GE3: third ground electrode; GE4: fourth ground electrode; SE1, SE2: signal electrode; SL: signal line

20*a*: first end of first ground layer; 30*a*: first end of second ground layer; 40*a*: first end of third ground layer; GE1*a*: first end of first ground electrode; GE1*b*: second end of first ground electrode; GE2*a*: first end of second ground electrode; GE2*b*: second end of second ground electrode; GE3*a*: first end of third ground electrode; GE3*b*: fourth end of third ground electrode; GE4*a*: first end of fourth ground electrode; GE4*b*: second end of fourth ground electrode CP: mating connector; 1: shield member; 2: inner body; 3: terminal; 4: cable; 5: housing

4*a*: inner conductor; 4*b*: inner insulator; 4*c*: outer conductor; 4*d*: outer insulator CL1: first imaginary line; CL2: third imaginary line G: gap

What is claimed is:

1. A connector comprising:

a body having insulating properties;

at least one terminal having electrical conductivity, each terminal of the at least one terminal including:

a main body partly held at least by the body, the main body including a first end on one side in a first direction, a second end on the other side in the first direction, and a third end on one side in a second direction, the second direction being substantially orthogonal to the first direction, a distal portion extending from the first end of the main body to the one side in the first direction and protruding from the body to the one side in the first direction, and a mounting portion extending from the third end of the main body to the other side in the first direction or to the one side in the second direction, the mounting portion being located outside the body; and a shell having electrical conductivity and including:

a shell body generally shaped like a tube extending in the first direction, the shell body securely accommodating the body and accommodating the main body and the distal portion of the at least one terminal, wherein the first direction is an axial direction of the shell body, a first leg being a ridge elongated in the first direction, extending from a bottom face of the shell body to the one side in the second direction, being disposed on one side in a third direction relative to the at least one terminal, being larger in dimension in the first direction than in dimension in the third direction, and being larger in dimension in the first direction than the distal portion of the at least one terminal, wherein the third direction is substantially orthogonal to the first and second directions, and a second leg being a ridge elongated in the first direction, extending from the bottom face of the shell body to the one side in the second direction, being disposed on the other side in the third direction relative to the at least one terminal, being larger in dimension in the first direction than in dimension in the third direction, and being larger in dimension in the first direction than the distal portion of the at least one terminal, wherein the distal portion of each terminal of the at least one terminal includes a first end on the one side in the first direction and a second end on the other side in the first direction, and the first leg includes a first end on the one side in the first direction and a second end on the other side in the first direction, and the second leg includes a first end on the one side in the first direction and a second end on the other side in the first direction, and the first end of the first leg and the first end of the second leg are located on the one side in the first direction relative to the first end of the distal portion of each terminal of the at least one terminal, and the second end of the first leg and the second end of the second leg are located on the other side in the first direction relative to the second end of the distal portion of each terminal of the at least one terminal.

2. The connector according to claim 1, wherein the mounting portion of each terminal of the at least one terminal includes a first end on the one side in the first direction and a second end on the other side in the first direction, and the second end of the first leg and the second end of the second leg are located on the other side in the first direction relative to, or alternatively substantially coincident in the first direction with, the second end of the mounting portion of each terminal of the at least one terminal.

3. The connector according to claim 2, wherein the mounting portion of each terminal of the at least one terminal includes a third end on the one side in the second direction, the first leg includes a third end on the one side in the second direction, the second leg includes a third end on the one side in the second direction, and the third end of the first leg and the third end of the second leg are located on the one side in the second direction relative to, or alternatively substantially coincident in the second direction with, the third end of the mounting portion of each terminal of the at least one terminal.

4. The connector according to claim 1, wherein the first leg and the second leg are positioned and shaped substantially symmetrically to each other in the third direction across a first imaginary line that serves as an axis of line symmetry, the at least one terminal is a single terminal, the first imaginary line extends in the first direction substantially through a center of the main body of the single terminal.

5. The connector according to claim 1, wherein the mounting portion of each terminal of the at least one terminal includes a third end on the one side in the second direction, the first leg includes a third end on the one side in the second direction, the second leg includes a third end on the one side in the second direction, and the third end of the first leg and the third end of the second leg are located on the one side in the second direction relative to, or alternatively substantially coincident in the second direction with, the third end of the mounting portion of each terminal of the at least one terminal.

6. The connector according to claim 5, wherein the mounting portion of each terminal of the at least one terminal further includes a fourth end on the other side in the second direction, the first leg further includes a fourth end on the other side in the second direction, the second leg further includes a fourth end on the other side in the second direction, and the fourth end of the first leg and the fourth end of the second leg are substantially coincident in the second direction with, or alternatively located on the other side in the second direction relative to, the fourth end of the mounting portion of each terminal of the at least one terminal.

7. The connector according to claim 1, wherein the mounting portion of each terminal of the at least one terminal extends from the third end of the main body to other side in the first direction, and includes a first end on the one side in the first direction and a second end on the other side in the first direction, the shell further includes:

a third leg being a ridge elongated in the first direction, extending from the shell body to the one side in the second direction, being disposed on the other side in the first direction relative to the first leg and on the one side in the third direction relative to the mounting portion of the at least one terminal, and including a first end on the one side in the first direction and a second end on the other side in the first direction, and a fourth leg being a ridge elongated in the first direction, extending from the shell body to the one side in the second direction, being disposed on the other side in the first direction relative to the second leg and on the other side in the third direction relative to the mounting portion of the at least one terminal, and including a first end on the one side in the first direction and a second end on the other side in the first direction, the first end of the third leg and the first end of the fourth leg are substantially coincident in the first direction with, or alternatively located on the one side in the first direction relative to, the first end of the mounting portion of each terminal of the at least one terminal, and the second end of the third leg and the second end of the fourth leg are substantially coincident in the first direction with, or alternatively located on the other side in the first direction relative to, the second end of the mounting portion of each terminal of the at least one terminal.

8. The connector according to claim 7, wherein the mounting portion of each terminal of the at least one terminal further includes a third end on the one side in the second direction and a fourth end on the other side in the second direction, the third leg further includes a third end on the one side in the second direction, the fourth leg further includes a third end on the one side in the second direction, and the third end of the third leg and the third end of the fourth leg are substantially coincident in the second direction with the third end of the mounting portion of each terminal of the at least one terminal.

9. The connector according to claim 8, wherein the third leg further includes a fourth end on the other side in the second direction, the fourth leg further includes a fourth end on the other side in the second direction, and the fourth end of the third leg and the fourth end of the fourth leg are substantially coincident in the second direction with, or alternatively located on the other side in the second direction relative to, the fourth end of the mounting portion of each terminal of the at least one terminal.

10. A connection structure of a circuit board and a connector comprising:

a circuit board; and the connector according to claim 7, wherein the circuit board comprises:

a board body having insulating properties and including a front face on the one side in the second direction and a back face on the other side in the second direction, at least one ground layer including at least one of a first ground layer, a second ground layer, or at least one third ground layer, the first ground layer having electrical conductivity and being provided on the front face of the board body, the second ground layer having electrical conductivity and being provided on the back face of the board body, the at least one third ground layer having electrical conductivity and being provided inside the board body, at least one signal electrode having electrical conductivity, each signal electrode of the at least one signal electrode being a surface electrode provided on the front face of the board body, a first ground electrode having electrical conductivity, a second ground electrode having electrical conductivity, wherein the first and second ground electrodes are through-hole electrodes elongated in the first direction, extend through the board body in the second direction, are spaced from each other in the third direction, are electrically connected to the at least one ground layer, and have a same potential as the at least one ground layer, a third ground electrode having electrical conductivity, wherein the third ground electrode is a surface electrode provided on the front face of the board body, is disposed in spaced relation to, and on the other side in the first direction relative to, the first ground electrode, is disposed on the one side in the third direction relative to the at least one signal electrode, is electrically connected to the at least one ground layer, and has a same potential as the at least one ground layer, and a fourth ground electrode having electrical conductivity, wherein the fourth ground electrode is a surface electrode provided on the front face of the board body, is disposed in spaced relation to, and on the other side in the first direction relative to, the second ground electrode, is disposed on the other side in the third direction relative to the at least one signal electrode, is electrically connected to the at least one ground layer, and has a same potential as the at least one ground layer, the mounting portion of each terminal of the at least one terminal of the connector extends from the third end of the main body to the other side in the first direction and is placed on, and electrically connected to, the or a corresponding signal electrode, the first leg of the connector is received in, and electrically connected to, the first ground electrode, the second leg of the connector is received in, and electrically connected to, the second ground electrode, the third leg of the connector is placed on, and electrically connected to, the third ground electrode, and the fourth leg of the connector is placed on, and electrically connected to, the fourth ground electrode.

11. The connector according to claim 1, wherein the mounting portion of each terminal of the at least one terminal includes a first end on the one side in the first direction, a second end on the other side in the first direction, a third end on the one side in the second direction, and a fourth end on the other side in the second direction, the shell further includes:

a first wall being a portion extending from the shell body to the other side in the first direction or alternatively a part of a wall on the one side in the third direction of the shell body, the first wall being located on the one side in the third direction relative to the mounting portion of the at least one terminal and including a first end on the one side in the first direction, a second end on the other side in the first direction, a third end on the one side in the second direction, and a fourth end on the other side in the second direction, and a second wall being a portion extending from the shell body to the other side in the first direction or alternatively a part of a wall on the other side in the third direction of the shell body, the second wall being located on the other side in the third direction relative to the mounting portion of the at least one terminal and including a first end on the one side in the first direction, a second end on the other side in the first direction, a third end on the one side in the second direction, and a fourth end on the other side in the second direction, the second end of the first wall and the second end of the second wall are substantially coincident in the first direction with, or alternatively located on the other side in the first direction relative to, the second end of the mounting portion of each terminal of the at least one terminal, the third end of the first wall and the third end of the second wall are substantially coincident in the second direction with the third end of the mounting portion of each terminal of the at least one terminal, and the fourth end of the first wall and the fourth end of the second wall are substantially coincident in the second direction with, or alternatively located on the other side in the second direction relative to, the fourth end of the mounting portion of each terminal of the at least one terminal.

12. The connector according to claim 1, wherein the shell further includes at least one protrusion extending from the shell body to the one side in the second direction, and each protrusion of the at least one protrusion includes a distal end on the one side in the second direction.

13. A connection structure of a circuit board and a connector comprising:

a circuit board; and the connector according to claim 1, wherein the circuit board comprises:

a board body having insulating properties and including a front face on the one side in the second direction and a back face on the other side in the second direction, at least one ground layer including at least one of a first ground layer, a second ground layer, or at least one third ground layer, the first ground layer having electrical conductivity and being provided on the front face of the board body, the second ground layer having electrical conductivity and being provided on the back face of the board body, the at least one third ground layer having electrical conductivity and being provided inside the board body, at least one signal electrode having electrical conductivity, each signal electrode of the at least one signal electrode being a surface electrode provided on the front face of the board body, a first ground electrode having electrical conductivity, and a second ground electrode having electrical conductivity, the first and second ground electrodes are through-hole electrodes elongated in the first direction, extend through the board body in the second direction, are spaced from each other in the third direction, are electrically connected to the at least one ground layer, and have a same potential as the at least one ground layer, the mounting portion of each terminal of the at least one terminal of the connector extends from the third end of the main body to the other side in the first direction and is placed on, and electrically connected to, the or a corresponding signal electrode, the first leg of the connector is received in, and electrically connected to, the first ground electrode, and the second leg of the connector is received in, and electrically connected to, the second ground electrode.

14. The connection structure according to claim 13, wherein the circuit board further comprises at least one signal line having electrical conductivity and being provided on the front or back face of the board body, each signal line of the at least one signal line is led to the or a corresponding signal electrode, and the at least one signal line and the at least one ground layer constitute a microstrip line or a coplanar line.

15. The connection structure according to claim 13, wherein the at least one ground layer extends to the one side in the first direction beyond the first and second ground electrodes, the circuit board further includes a first end on the one side in the first direction, the first ground electrode includes a first end on the one side in the first direction, the second ground electrode includes a first end on the one side in the first direction, and a linear distance in the first direction from each of the first end of the first ground electrode and the first end of the second ground electrode to the first end of the circuit board is approximately 1 mm.

16. A connection structure of a circuit board and a connector comprising:

a circuit board; and the connector according to claim 1, wherein the circuit board comprises:

a board body having insulating properties and including a front face on the one side in the second direction and a back face on the other side in the second direction, at least one ground layer including at least one of a first ground layer, a second ground layer, or at least one third ground layer, the first ground layer having electrical conductivity and being provided on the front face of the board body, the second ground layer having electrical conductivity and being provided on the back face of the board body, the at least one third ground layer having electrical conductivity and being provided inside the board body, at least one signal electrode having electrical conductivity, each signal electrode of the at least one signal electrode being a through-hole electrode extending through the circuit board in the second direction, a first ground electrode having electrical conductivity, and a second ground electrode having electrical conductivity, the first and second ground electrodes are through-hole electrodes elongated in the first direction, extend through the board body in the second direction, are spaced from each other in the third direction, are electrically connected to the at least one ground layer, and have a same potential as the at least one ground layer, the mounting portion of each terminal of the at least one terminal of the connector extends from the third end of the main body to the one side in the second direction and is received in, and electrically connected to, the or a corresponding signal electrode, the first leg of the connector is received in, and electrically connected to, the first ground electrode, and the second leg of the connector is received in, and electrically connected to, the second ground electrode.

17. The connector according to claim 1, wherein the at least one terminal is a plurality of terminals, and the shell body accommodates the main bodies and the distal portions of the plurality of terminals.

18. The connector according to claim 17, wherein the first leg and the second leg are positioned and shaped substantially symmetrically to each other in the third direction across a second imaginary line that serves as an axis of line symmetry, the second imaginary line extends in the first direction substantially through a midpoint of a linear distance in the third direction from an end on the one side in the third direction of the main body of one of the terminals at an endmost position to the one side in the third direction to an end on the other side in the third direction of the main body of another one of the terminals at an endmost position to the other side in the third direction.

19. The connector according to claim 17, wherein the mounting portion of each terminal of the plurality of terminals extends from the third end of the main body to other side in the first direction, and includes a first end on the one side in the first direction and a second end on the other side in the first direction, the shell further includes:

a third leg being a ridge elongated in the first direction, extending from the shell body to the one side in the second direction, being disposed on the other side in the first direction relative to the first leg and on the one side in the third direction relative to the mounting portions of the plurality of terminals, and including a first end on the one side in the first direction and a second end on the other side in the first direction, and a fourth leg being a ridge elongated in the first direction, extending from the shell body to the one side in the second direction, being disposed on the other side in the first direction relative to the second leg and on the other side in the third direction relative to the mounting portions of the plurality of terminals, and including a first end on the one side in the first direction and a second end on the other side in the first direction, the first end of the third leg and the first end of the fourth leg are substantially coincident in the first direction with, or alternatively located on the one side in the first direction relative to, the first ends of the mounting portions of the plurality of terminals, and the second end of the third leg and the second end of the fourth leg are substantially coincident in the first direction with, or alternatively located on the other side in the first direction relative to, the second ends of the mounting portions of the plurality of terminals.

20. The connector according to claim 17, wherein the mounting portion of each terminal of the plurality of terminals includes a first end on the one side in the first direction, a second end on the other side in the first direction, a third end on the one side in the second direction, and a fourth end on the other side in the second direction, the shell further includes:

a first wall being a portion extending from the shell body to the other side in the first direction or alternatively a part of a wall on the one side in the third direction of the shell body, the first wall being located on the one side in the third direction relative to the mounting portions of the plurality of terminals and including a first end on the one side in the first direction, a second end on the other side in the first direction, a third end on the one side in the second direction, and a fourth end on the other side in the second direction, and a second wall being a portion extending from the shell body to the other side in the first direction or alternatively a part of a wall on the other side in the third direction of the shell body, the second wall being located on the other side in the third direction relative to the mounting portions of the plurality of terminals and including a first end on the one side in the first direction, a second end on the other side in the first direction, a third end on the one side in the second direction, and a fourth end on the other side in the second direction, the second end of the first wall and the second end of the second wall are substantially coincident in the first direction with, or alternatively located on the other side in the first direction relative to, the second ends of the mounting portions of the plurality of terminals, the third end of the first wall and the third end of the second wall are substantially coincident in the second direction with the third ends of the mounting portions of the plurality of terminals, and the fourth end of the first wall and the fourth end of the second wall are substantially coincident in the second direction with, or alternatively located on the other side in the second direction relative to, the fourth ends of the mounting portions of the plurality of terminals.

* * * * *